US012750628B2

(12) United States Patent
Tsuji et al.

(10) Patent No.: US 12,750,628 B2
(45) Date of Patent: Sep. 29, 2026

(54) INFORMATION PROCESSING APPARATUS AND METHOD, AND PROGRAM

(71) Applicant: Sony Group Corporation, Tokyo (JP)

(72) Inventors: Minoru Tsuji, Chiba (JP); Toru Chinen, Kanagawa (JP); Mitsuyuki Hatanaka, Kanagawa (JP); Yuki Yamamoto, Tokyo (JP)

(73) Assignee: Sony Group Corporation, Tokyo (JP)

( * ) Notice: Subject to any disclaimer, the term of this patent is extended or adjusted under 35 U.S.C. 154(b) by 97 days.

(21) Appl. No.: 18/888,456

(22) Filed: Sep. 18, 2024

(65) Prior Publication Data

US 2025/0016518 A1 Jan. 9, 2025

Related U.S. Application Data

(63) Continuation of application No. 18/505,985, filed on Nov. 9, 2023, now Pat. No. 12,149,916, which is a (Continued)

(30) Foreign Application Priority Data

Aug. 30, 2018 (JP) ................................ 2018-160969

(51) Int. Cl.
*H04S 7/00* (2006.01)
*H04S 3/00* (2006.01)

(52) U.S. Cl.
CPC .............. *H04S 7/302* (2013.01); *H04S 3/008* (2013.01); *H04S 2400/11* (2013.01); *H04S 2400/13* (2013.01)

(58) Field of Classification Search
CPC . H04S 3/008; H04S 7/302; H04S 7/40; H04S 2400/11; H04S 2400/13;
(Continued)

(56) References Cited

U.S. PATENT DOCUMENTS

| | | | |
|---|---|---|---|
| 8,068,105 | B1 | 11/2011 | Classen |
| 11,368,806 | B2 | 6/2022 | Tsuji et al. |

(Continued)

FOREIGN PATENT DOCUMENTS

| | | | | |
|---|---|---|---|---|
| CN | 107465990 | A | 12/2017 | |
| EP | 1 182 643 | A1 | 2/2002 | |

(Continued)

OTHER PUBLICATIONS

International Search Report and English translation thereof mailed Nov. 5, 2019 in connection with International Application No. PCT/JP2019/032132.

(Continued)

*Primary Examiner* — Paul Kim
(74) *Attorney, Agent, or Firm* — Wolf, Greenfield & Sacks, P.C.

(57) ABSTRACT

The present technology relates to an information processing apparatus and method, and a program that enable more efficient edit.
The information processing apparatus includes a control unit that selects and groups a plurality of objects existing in a predetermined space, and changes the positions of the plurality of the objects while maintaining the relative positional relationship of the plurality of the grouped objects in the space. The present technology can be applied to information processing apparatuses.

18 Claims, 36 Drawing Sheets

Related U.S. Application Data continuation of application No. 17/844,483, filed on Jun. 20, 2022, now Pat. No. 11,849,301, which is a continuation of application No. 17/269,242, filed as application No. PCT/JP2019/032132 on Aug. 16, 2019, now Pat. No. 11,368,806.

(58) Field of Classification Search
CPC H04S 2420/11; G10H 1/46; G10H 2210/305; G10H 2220/111
USPC ........................................................ 381/17
See application file for complete search history.

(56) References Cited

U.S. PATENT DOCUMENTS

| | | | | |
|---|---|---|---|---|
| 11,849,301 | B2 | 12/2023 | Tsuji et al. | |
| 2001/0055398 | A1* | 12/2001 | Pachet .................. | G10K 15/00 381/98 |
| 2002/0034307 | A1 | 3/2002 | Kubota | |
| 2014/0241538 | A1 | 8/2014 | Ayres | |
| 2015/0194158 | A1 | 7/2015 | Oh et al. | |
| 2016/0050508 | A1 | 2/2016 | Redmann | |
| 2017/0064451 | A1* | 3/2017 | Park ...................... | H04R 5/027 |
| 2019/0166448 | A1 | 5/2019 | Laaksonen et al. | |
| 2021/0329397 | A1 | 10/2021 | Tsuji et al. | |
| 2022/0394415 | A1 | 12/2022 | Tsuji et al. | |
| 2024/0073639 | A1 | 2/2024 | Tsuji et al. | |

FOREIGN PATENT DOCUMENTS

| | | | |
|---|---|---|---|
| EP | 2 863 657 | A1 | 4/2015 |
| EP | 3 261 367 | A1 | 12/2017 |
| EP | 3 336 834 | A1 | 6/2018 |
| JP | H07-184300 | A | 7/1995 |
| JP | H08030284 | A | 2/1996 |
| JP | H08-140199 | A | 5/1996 |
| JP | H10301568 | A | 11/1998 |
| JP | H11352962 | A | 12/1999 |
| JP | 2002-051399 | A | 2/2002 |
| JP | 2004029720 | A | 1/2004 |
| JP | 2012108414 | A | 6/2012 |
| JP | 2015-531078 | A | 10/2015 |
| JP | 2016-518067 | A | 6/2016 |
| WO | WO 2014/021588 | A1 | 2/2014 |
| WO | WO 2014/163657 | A1 | 10/2014 |
| WO | WO 2017/220852 | A1 | 12/2017 |

OTHER PUBLICATIONS

Written Opinion and English translation thereof mailed May 11, 2019 in connection with International Application No. PCT/JP2019/032132.

International Preliminary Report on Patentability and English translation thereof mailed Mar. 2, 2021 in connection with International Application No. PCT/JP2019/032132.

[No Author Listed], Authoring for Dolby Atmos Cinema Sound Manual. Dolby Laboratories, Inc. 2013; Issue 1:131 pages.

[No Author Listed], Information Technology—High Efficiency Coding and Media Delivery in Heterogeneous environments—Part 3: 3D Audio. International Standard, ISO/IEC DIS 23008-3. Jul. 25, 2014; 433 pages.

Pachet et al., MusicSpace: a Constraint-Based Control System for Music Spatialization. Proceedings of ICMC, Oct. 27, 1999. 4 pages. [last retrieved on Aug. 24, 2021, URL: https://www.francoispachet.fr/wp-content/uploads/2021/01/pachet-99-ICMC99.pdf].

Pulkki, Virtual Sound Source Positioning Using Vector Base Amplitude Panning. J. Audio Eng. Soc., Jun. 1997;45(6):456-66.

* cited by examiner

INFORMATION PROCESSING APPARATUS AND METHOD, AND PROGRAM

CROSS-REFERENCE TO RELATED APPLICATIONS

The present application claims the benefit under 35 U.S.C. § 120 as a continuation application of U.S. application Ser. No. 18/505,985 filed on Nov. 9, 2023, which claims the benefit under 35 U.S.C. § 120 as a continuation application of Ser. No. 17/844,483 filed on Jun. 20, 2022, now U.S. Pat. No. 11,849,301, which claims the benefit under 35 U.S.C. § 120 as a continuation application of Ser. No. 17/269,242, filed on Feb. 17, 2021, now U.S. Pat. No. 11,368,806, which claims the benefit under 35 U.S.C. § 371 as a U.S. National Stage Entry of International Application No. PCT/JP2019/032132, filed in the Japanese Patent Office as a Receiving Office on Aug. 16, 2019, which claims priority to Japanese Patent Application Number JP2018-160969, filed in the Japanese Patent Office on Aug. 30, 2018, each of which applications is hereby incorporated by reference in its entirety.

TECHNICAL FIELD

The present technology relates to an information processing apparatus and method, and a program, and particularly to an information processing apparatus and method, and a program that enable more efficient edit.

BACKGROUND ART

In recent years, object-based audio technology has attracted attention.

In object-based audio, data of object audio include a waveform signal to an audio object and meta information indicating localization information of the audio object represented by a relative position from a listening position as a predetermined reference.

Then, the waveform signal of the audio object is rendered into a signal having a desired number of channels by, for example, vector based amplitude panning (VBAP) on the basis of meta information and reproduced (see, for example, Non-Patent Document 1 and Non-Patent Document 2).

In object-based audio, audio objects can be arranged in various directions in a three-dimensional space in the production of audio content.

For example, in Dolby Atoms Panner plus-in for Pro Tools (see, e.g., Non-Patent Document 3), the position of an audio object on a 3D graphics user interface can be specified. In the present technology, the sound image of the sound of an audio object can be localized in any direction in a three-dimensional space by specifying the position on the image of the virtual space displayed on the user interface as the position of the audio object.

On the other hand, the localization of the sound image with respect to the conventional two-channel stereo is adjusted by a technique called panning. For example, the proportional ratio of a predetermined audio track to the left and right two channels is changed by the user interface, whereby which position in the left and right directions to localize the sound image is determined.

CITATION LIST

Non-Patent Document

Non-Patent Document 1: ISO/IEC 23008-3 Information technology—High efficiency coding and media delivery in heterogeneous environments—Part 3: 3D audio Non-Patent Document 2: Ville Pulkki, "Virtual Sound Source Positioning Using Vector Base Amplitude Panning", Journal of AES, vol. 45, no. 6, pp. 456-466, 1997

Non-Patent Document 3: Dolby Laboratories, Inc., "Authoring for Dolby Atmos® Cinema Sound Manual", [online], [Searched on Aug. 1, 2018], Internet <https://www.dolby.com/us/en/technologies/dolby-atmos/authoring-for-dolby-atmos-cinema-sound-manual.pdf>

SUMMARY OF THE INVENTION

Problems to be Solved by the Invention

By the way, in the object-based audio, it is possible, for each audio object, to perform edit such as changing the position of the audio object in the space, i.e., the sound image localization position, and adjusting the gain of the waveform signal of the audio object.

However, since a large number of audio objects are treated in the production of actual object-based audio content, it takes time to perform edit such as position adjustment and gain adjustment of those audio objects.

For example, a work of specifying a position for each audio object in the space and determining the localization position of the sound image of each audio object has been troublesome.

Therefore, a method capable of performing efficient edit of an audio object when producing audio content is desired.

The present technology has been made in view of such a circumstance, and enables more efficient edit.

Solutions to Problems

An information processing apparatus of one aspect of the present technology includes a control unit that selects and groups a plurality of objects existing in a predetermined space, and changes the positions of the plurality of the objects while maintaining the relative positional relationship of the plurality of the grouped objects in the space.

An information processing method or a program of one aspect of the present technology includes a step of selecting and grouping a plurality of objects existing in a predetermined space, and changing the positions of the plurality of the objects while maintaining the relative positional relationship of the plurality of the grouped objects in the space.

In one aspect of the present technology, a plurality of objects existing in a predetermined space is selected and grouped, and the positions of the plurality of the objects are changed while the relative positional relationship of the plurality of the grouped objects in the space is maintained.

MODE FOR CARRYING OUT THE INVENTION

An embodiment to which the present technology is applied will be described below with reference to the drawings.

First Embodiment

<Configuration Example of Information Processing Apparatus>

The present technology is to enable more efficient edit by grouping a plurality of objects and changing the positions of the plurality of objects while maintaining the relative positional relationship of the plurality of grouped objects in a three-dimensional space.

It is to be noted that the object mentioned here may be any object as long as the object is capable of giving position information indicating a position in the space, such as an audio object that is a sound source or the like and an image object that is a subject on an image.

In the following, a case where the object is an audio object will be described as a specific example. In addition, the audio object will hereinafter be also referred to simply as an object.

Figure 1:
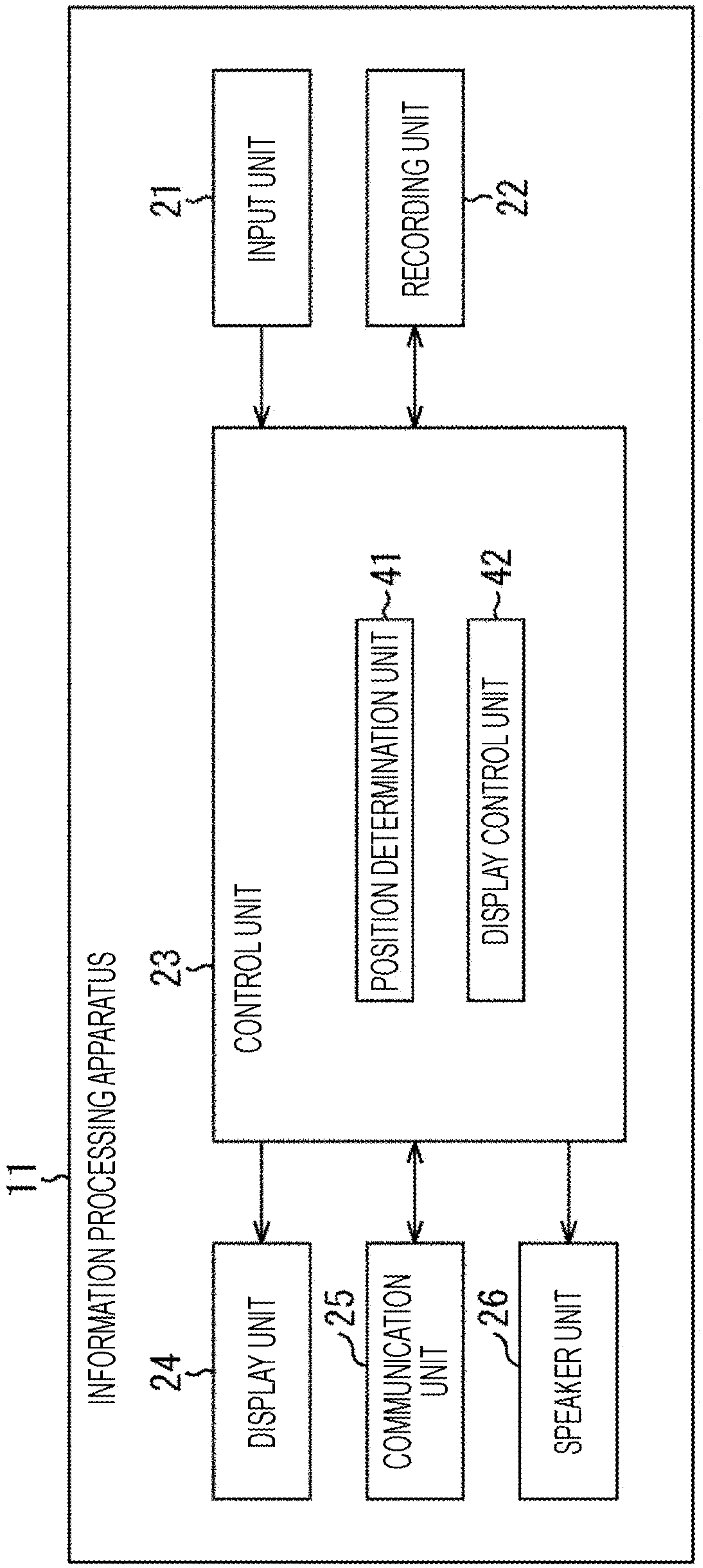
FIG. 1 is a diagram showing a configuration example of an information processing apparatus.

FIG. 1 is a diagram showing a configuration example of an information processing apparatus according to an embodiment to which the present technology is applied.

An information processing apparatus 11 shown in FIG. 1 has an input unit 21, a recording unit 22, a control unit 23, a display unit 24, a communication unit 25, and a speaker unit 26.

The input unit 21 includes, for example, a switch, a button, a mouse, a keyboard, and a touch panel provided superimposed on the display unit 24, and supplies to the control unit 23 a signal corresponding to an input operation by a user who is a creator of the content.

The recording unit 22 includes, for example, a nonvolatile memory such as a hard disk, records various data such as data of audio content supplied from the control unit 23, and supplies recorded data to the control unit 23. It is to be noted that the recording unit 22 may be a removable recording medium attachable to and detachable from the information processing apparatus 11.

The control unit 23 is implemented by, for example, a processor or the like, and controls the operation of the entire information processing apparatus 11. The control unit 23 has a position determination unit 41 and a display control unit 42.

The position determination unit 41 determines the position of each object in the space, i.e., the sound image localization position of the sound of each object, on the basis of the signal supplied from the input unit 21. The display control unit 42 controls the display unit 24 to control the display of an image or the like on the display unit 24.

The display unit 24 includes, for example, a liquid crystal display panel and the like, and displays various images and the like under the control of the display control unit 42.

The communication unit 25 includes, for example, a communication interface and the like, and communicates with an external device via a wired or wireless communication network such as the Internet. For example, the communication unit 25 receives data transmitted from an external device and supplies the data to the control unit 23, or transmits data supplied from the control unit 23 to an external device.

The speaker unit 26 includes speakers of respective channels of a speaker system having a predetermined channel configuration, for example, and reproduces (outputs) the sound of the content on the basis of the audio signal supplied from the control unit 23.

<Regarding Grouping of Objects>

The information processing apparatus 11 can function as an editing apparatus that realizes edit of object-based audio content including object data of at least a plurality of objects.

It is to be noted that the data of audio content may include data that are not object data, specifically, channel audio data including audio signals of respective channels.

In addition, of course, the audio content may be single content such as music not accompanied by a video or the like, but it is assumed here that corresponding video content also exists in the audio content. That is, it is assumed that the audio signal of the audio content is an audio signal accompanying video data including a still image or a moving image (video), i.e., video data of video content. For example, in a case where the video content is a live video, the audio content corresponding to the video content is, for example, the voice of the live video.

Each object data included in the data of the audio content includes an audio signal that is a waveform signal of the sound of the object and meta information of the object.

In addition, the meta information includes object position information indicating the position of the object in a reproduction space that is a three-dimensional space, for example, gain information indicating the gain of the audio signal of the object, and priority information indicating the priority of the object.

Furthermore, in this embodiment, it is assumed that the object position information indicating the position of the object is expressed by coordinates of a polar coordinate system with reference to the position (hereinafter also referred to as listening position) of a listener who listens to the sound of the audio content in the reproduction space.

That is, the object position information includes a horizontal angle, a vertical angle, and a radius. It is to be noted that here, an example in which the object position information is expressed by polar coordinates will be described, but the object position information is not limited to this, and may be anything such as absolute position information expressed by absolute coordinates.

The horizontal angle is an angle in a horizontal direction (azimuth) indicating the position of the object in the horizontal direction (left and right direction) as viewed from the listening position, and the vertical angle is an angle in a vertical direction (elevation) indicating the position of the object in the vertical direction (up and down direction) as viewed from the listening position. In addition, the radius is a distance (radius) from the listening position to the object. Hereinafter, the coordinates as the object position information are expressed as (azimuth, elevation, radius).

For example, when the audio content is reproduced, rendering based on the audio signal of each object is performed by VBAP or the like so that the sound image of the sound of the object is localized at a position indicated by the object position information.

In addition, when audio content is edited, basically one object data, i.e., the audio signal of one object is treated as one audio track. On the other hand, for channel audio data, a plurality of audio signals constituting the channel audio data is treated as one audio track. It is to be noted that hereinafter, the audio track will be also referred to simply as a track.

Normally, data of audio content includes object data of a large number such as tens or hundreds of objects.

In the information processing apparatus 11, therefore, a plurality of objects can be grouped so that the audio content can be edited more efficiently. That is, a plurality of selected objects can be grouped so that a plurality of objects selected from among a plurality of objects existing in the reproduction space can be treated as one group.

In the information processing apparatus 11, for a plurality of grouped objects, i.e., a plurality of objects belonging to the same group, the object position information is changed while the relative positional relationship of those objects is maintained in the reproduction space.

By doing so, when editing the audio content, the information processing apparatus 11 can edit the object position information in units of group, i.e., specify (change) the sound image localization position of the object. In this case, the number of operations of specifying the object position information can be significantly reduced as compared with the case where the object position information is edited for each object. Therefore, the information processing apparatus 11 can edit audio content more efficiently and easily.

It is to be noted that here, an example in which the object position information is edited in units of group will be described, but the priority information and the gain information may also be edited in units of group.

In such a case, for example, when the priority information of a predetermined object is specified, the priority information of all other objects belonging to the same group as that of the predetermined object is also changed to the same value as that of the priority information of the predetermined object. It is to be noted that the priority information of the objects belonging to the same group may be changed while the relative relationship of the priorities of those objects is maintained.

In addition, for example, when the gain information of a predetermined object is specified, the gain information of all other objects belonging to the same group as that of the predetermined object is also changed. At this time, the gain information of all the objects belonging to the group is changed while the relative magnitude relationship of the gain information of those objects is maintained.

Hereinafter, the grouping of objects at the time of editing of audio content and the specification (change) of the object position information of the grouped objects will be described more specifically.

For example, at the time of editing of audio content, the display control unit 42 causes the display unit 24 to display an edit screen on which the time waveform of the audio signal of each track is displayed, as a display screen of the content production tool. In addition, the display control unit 42 also causes the display unit 24 to display a point of view (POV) image, which is a point of view shot from the listening position or a position in the vicinity of the listening position, as a display screen of the content production tool. It is to be noted that the edit screen and the POV image may be displayed on different windows from each other or may be displayed on the same window.

The edit screen is a screen (image) for specifying or changing object position information, gain information, or priority information for each track of audio content, for example. In addition, the POV image is an image of a 3D graphic imitating the reproduction space, i.e., an image of the reproduction space viewed from the listening position of the listener or a position in the vicinity of the listener.

It is to be noted that in order to simplify the description, it is assumed here that the audio content including the object data of an object to which the position in the reproduction space, i.e., the object position information, is given in advance is edited.

Figure 2:
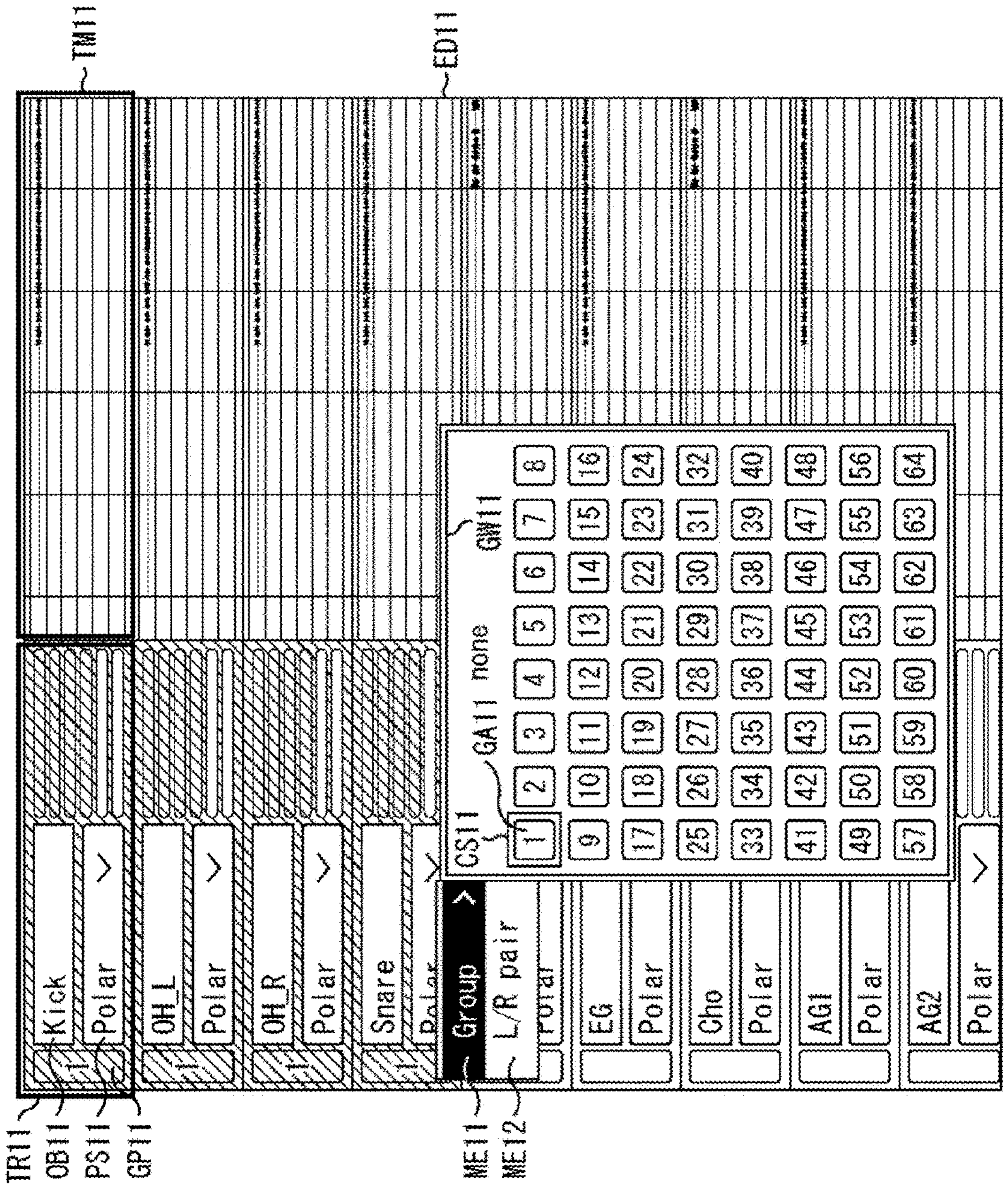
FIG. 2 is a view showing an example of an edit screen.

As an example, the display control unit 42 causes the display unit 24 to display an edit screen ED11 shown in FIG. 2.

In this example, the edit screen ED11 is provided, for each track, with a track area where information regarding the track is displayed and a timeline area where the time waveform of an audio signal, the object position information, the gain information, and the priority information regarding the track are displayed.

Specifically, in the edit screen ED11, for example, an area TR11 on the left side in the figure is a track area for one track, and an area TM11 provided adjacent to the area TR11 on the right side in the figure is a timeline area for a track corresponding to the area TR11.

In addition, each track area is provided with a group display area, an object name display area, and a coordinate system selection area.

The group display area is an area in which information indicating a track, i.e., a group, to which an object corresponding to the track belongs, is displayed.

For example, in the area TR11, an area GP11 on the left side in the figure in the area TR11 is a group display area, and the character (numeral) "1" in the area GP11 indicates information indicating the group, to which the object (track) belongs, i.e., a group ID. By viewing the group ID displayed in the group display area, the user can instantly grasp the group, to which the object belongs.

It is to be noted that the information indicating the group, i.e., the information for identifying the group, is not limited to the group ID represented by a numeral, but may be any other information such as a character or color information.

Furthermore, in the edit screen ED11, the track areas of the objects (tracks) belonging to the same group are displayed in the same color. For example, the color representing the group is defined in advance for each group, and when the input unit 21 is operated and the group of objects is selected (specified) by the user, the display control unit 42 causes the track area of the object to be displayed in the color representing the group selected for the object.

In the example of FIG. 2, in the edit screen ED11, the four track areas in the upper side of the figure are displayed in the same color, and the user can instantly grasp that the four objects (tracks) corresponding to these track areas belong to the same group. It is to be noted that a color defined for a group including a plurality of objects, i.e., a color representing the group will hereinafter be also referred to as a group color.

The object name display area is an area in which an object name indicating the name (title) of the object given to a track, i.e., an object corresponding to the track, is displayed.

For example, in the area TR11, an area OB11 is an object name display area, and in this example, the character "Kick" displayed in the area OB11 is the object name. This object name "Kick" represents a bass drum constituting a drum (drum kit), i.e., a so-called kick. Therefore, by viewing the object name "Kick", the user can instantly grasp that the object is a kick.

It is to be noted that hereinafter, in a case where it is desired to clarify what kind of object name the object is, the object whose object name is "Kick" is described by adding the object name after the word object, e.g., the object "Kick".

In the edit screen ED11, the group ID of the objects whose object names "OH_L", "OH_R", and "Snare" are displayed in the object name display area is "1", which is the same as the group ID of the object "Kick".

The object "OH_L" is an object of sound picked up by an overhead microphone provided on the left side over the drum player's head. In addition, the object "OH_R" is an object of sound picked up by an overhead microphone provided on the right side over the drum player's head, and the object "Snare" is a snare drum constituting the drum.

Since the respective objects whose object names are "Kick", "OH_L", "OH_R", and "Snare" constitute the drum, those objects are brought into the same group whose group ID is "1".

Normally, the relative positional relationship of objects constituting a drum (drum kit) such as a kick and a snare drum is not changed. Therefore, if those objects are brought into the same group and the object position information is changed while maintaining the relative positional relationship, only by changing the object position information of one object, the object position information of the other objects can be appropriately changed.

The coordinate system selection area is an area for selecting the coordinate system of the object position information at the time of editing. For example, in the coordinate system selection area, any coordinate system can be selected from among a plurality of coordinate systems by a drop-down list format.

In the area TR11, an area PS11 is a coordinate system selection area, and in this example, the character "Polar" indicating a polar coordinate system that is the selected coordinate system is displayed in the area PS11.

It is to be noted that an example in which a polar coordinate system is selected will be described here. However, for example, on the edit screen ED11, the object position information may be edited with the coordinates of the coordinate system selected in the coordinate system selection area and then the object position information may be converted into coordinates expressed in the polar coordinate system to be the object position information of the meta information, or the coordinates of the coordinate system selected in the coordinate system selection area may be the object position information of the meta information as it is.

In addition, in a case where a group of objects corresponding to a track is specified (selected), for example, the user operates the input unit 21 to display a group selection window GW11.

Specifically, for example, in a case where a group is to be specified, by specifying a group display area of a desired track by using a pointer, a cursor, or the like, the user selects a target track and displays a menu for grouping.

In the example of FIG. 2, a menu including a menu item ME11 on which the character "Group" is displayed and a menu item ME12 on which the character "L/R pair" is displayed is displayed as a menu for grouping.

The menu item ME11 is selected when the group selection window GW11 for specifying the group ID of an object corresponding to a track in a selected state by the pointer, the cursor, or the like is displayed. On the other hand, the menu item ME12 is selected (operated) when an object corresponding to a track in a selected state by the pointer, the cursor, or the like is set as an L/R pair described later.

Here, since the menu item ME11 is selected, the group selection window GW11 is displayed superimposed on the edit screen ED11.

A plurality of group icons representing selectable groups and a cursor CS11 for selecting one of those group icons are displayed on the group selection window GW11.

In this example, the group icon has a quadrangular shape, and a group ID is displayed in the group icon. For example, a group icon GA11 represents a group whose group ID is "1", and the group ID "1" is displayed in the group icon GA11. In addition, each group icon is displayed in a group color.

The user moves the cursor CS11 by operating the input unit 21, and selects a group, to which the object corresponding to the track belongs, by selecting a desired group icon.

Figure 3:
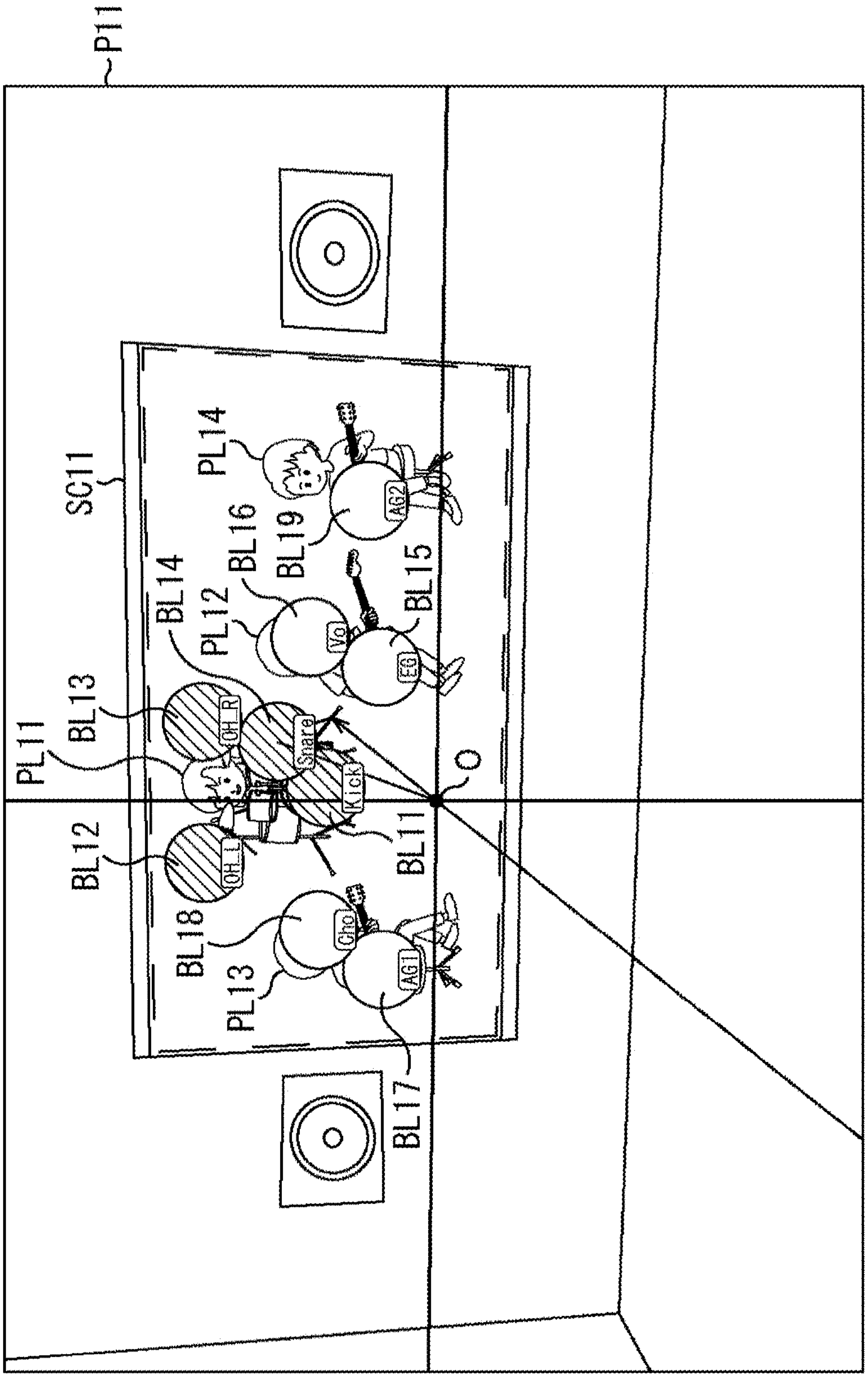
FIG. 3 is a view showing an example of a POV image.

In addition, the display unit 24 displays the image shown in FIG. 3 as a POV image corresponding to the edit screen ED11, for example.

In the example shown in FIG. 3, a POV image P11 is displayed in a predetermined window. In the POV image P11, a wall and the like of a room that is a reproduction space viewed from slightly behind a listening position O is displayed, and a screen SC11 on which a video of a video content is superimposed and displayed is arranged at a position in front of the listener in the room. In the POV image P11, the reproduction space viewed from the vicinity of the actual listening position O is reproduced almost as it is.

A drum, an electric guitar, an acoustic guitar, and players of those musical instruments are displayed on the screen SC11 as subjects in the video of the video content.

In particular, in this example, a drum player PL11, an electric guitar player PL12, a first acoustic guitar player PL13, and a second acoustic guitar player PL14 are displayed on the screen SC11 as the players of the respective musical instruments.

In addition, object balls BL11 to BL19, which are marks representing objects, more specifically, marks representing the positions of objects, are also displayed on the POV image P11. In this example, those object balls BL11 to BL19 are positioned on the screen SC11.

A character indicating the object name of the object corresponding to the object ball is also displayed on each object ball.

Specifically, for example, the object name "Kick" is displayed on the object ball BL11, and the object ball BL11 represents an object corresponding to the track of the area TR11 in FIG. 2, more specifically, a position of the object in the reproduction space. The object ball BL11 is displayed at a position indicated by the object position information of the object "Kick" on the POV image P11.

In addition, the object name "OH_L" is displayed on the object ball BL12, and it is understood that the object ball BL12 represents the object "OH_L".

Similarly, the object name "OH_R" is displayed on the object ball BL13, and the object name "Snare" is displayed on the object ball BL14.

In the POV image P11, the object balls of objects belonging to the same group are displayed in the same color. In other words, the object balls of the grouped objects are displayed in the group color of the group, to which the objects belong.

Here, in the edit screen ED11 shown in FIG. 2, the object balls BL11 to BL14 of the respective objects belonging to the group indicated by the group ID "1" and having the object names "Kick", "OH_L", "OH_R", and "Snare" are displayed in the same color. In particular, for these objects, the object balls BL11 to BL14 and the track area on the edit screen ED11 are displayed in the group color of the group indicated by the group ID "1".

Therefore, the user can easily grasp which objects belong to the same group in the edit screen ED11 and the POV image P11. In addition, the user can also easily grasp which object ball corresponds to which track between the edit screen ED11 and the POV image P11.

Furthermore, in FIG. 3, the object balls BL15 to BL19 of the objects not specifically grouped, i.e., not belonging to the group, are displayed in a color defined in advance, i.e., a color different from any group color.

The user can specify the localization position of the sound image by operating the input unit 21 while viewing the edit screen ED11 and the POV image P11, inputting the coordinates of the object position information for each track, and directly operating the position of the object ball to move the object ball. By doing this, the user can easily determine (specify) an appropriate localization position of the sound image.

It is to be noted that in FIG. 3, by operating the input unit 21, the user can change the line-of-sight direction in the POV image P11 to any direction. In this case, the display control unit 42 causes the image of the reproduction space in the changed line-of-sight direction to be displayed as the POV image P11.

At this time, in a case where the viewpoint position of the POV image P11 is set to a position in the vicinity of the listening position O, the listening position O is always displayed in the near-side area of the POV image P11. Due to this, even in a case where the viewpoint position is different from the listening position O, the user viewing the POV image P11 can easily grasp which position the image is set as the viewpoint position for the displayed POV image P11.

Furthermore, in the example of FIG. 3, speakers are displayed on the front left side and the front right side of the listening position O on the POV image P11. These speakers are assumed by the user to be speakers of respective channels constituting the speaker system used at the time of audio content reproduction.

In addition, in this embodiment, an example in which the group selection window GW11 is displayed on the edit screen ED11, and the objects are grouped by specifying the group ID for each track has been described.

However, through the user operation of the input unit 21, the group selection window may be displayed with one or more object balls selected on the POV image P11, and the objects may be grouped by specifying the group ID.

Furthermore, a plurality of groups may be grouped so as to form a large group made up of the plurality of groups. In such a case, for example, by changing the object position information of the object in units of large group, each piece of object position information can be simultaneously changed while the relative positional relationship of the plurality of objects belonging to the large group is maintained.

Such a large group is particularly useful when it is desired to change the object position information of each object while the relative positional relationship of the objects of a plurality of groups is temporarily maintained. In this case, when the large group is no longer needed, the large group can be ungrouped and subsequent edit can be performed in units of individual group.

<Explanation of Grouping Processing>

Next, the operation performed by the information processing apparatus 11 when the objects explained above are grouped will be described. That is, the grouping processing by the information processing apparatus 11 will be described below with reference to the flowchart of FIG. 4. It is to be noted that it is assumed that the edit screen is already displayed on the display unit 24 at the time point when the grouping processing is started.

In step S11, the control unit 23 receives specification of objects and groups to be grouped by an input operation to the input unit 21.

For example, the user operates the input unit 21 to specify (select) a group display area of a track corresponding to a desired object to be grouped from the edit screen ED11 shown in FIG. 2, thereby specifying objects to be grouped. The control unit 23 specifies the specified object by a signal supplied from the input unit 21.

In addition, in the group selection window GW11 displayed by specifying the group display area, the user specifies a group by moving the cursor CS11 to specify a group icon.

At this time, the display control unit 42 of the control unit 23 causes the display unit 24 to display the group selection window GW11 on the basis of the signal supplied from the input unit 21, and the control unit 23 specifies the group specified on the basis of the signal supplied from the input unit 21.

In step S12, the control unit 23 groups the objects so that the object specified in step S11 belongs to the group specified in step S11, and the control unit 23 generates group information.

For example, the group information is information indicating which object belongs to which group, and including a group ID and information indicating an object belonging to the group indicated by the group ID. It is to be noted that the information indicating the object may be an object ID or the like for identifying the object itself, or may be information indicating a track such as a track ID for indirectly identifying the object.

The control unit 23 supplies the generated group information to the recording unit 22 as needed to cause the recording unit 22 to record the group information. It is to be noted that in a case where the group information has already been recorded in the recording unit 22, the control unit 23 updates the group information of the specified group so that information indicating the newly specified object is added to the group information.

By generating the group information in this manner, the objects are grouped.

In step S13, the display control unit 42 updates the display of the edit screen and the POV image already displayed on the display unit 24 on the basis of the newly generated or updated group information.

For example, the display control unit 42 controls the display unit 24 to cause the display unit 24 to display, in the group color of the group, the track area of an object belonging to the same group in each track area of the edit screen ED11 as shown in FIG. 2.

Similarly, the display control unit 42 controls the display unit 24 to cause the display unit 24 to display, among the respective object balls in the POV image P11 as shown in FIG. 3, the object ball of an object belonging to the same group in the group color of the group. This makes it possible to easily discriminate objects belonging to the same group, i.e., highly relevant objects.

When the objects are grouped as described above and the display of the edit screen and the POV image is updated accordingly, the grouping processing ends.

As described above, the information processing apparatus 11 groups the objects so that the object specified by the input operation to the input unit 21 belongs to the specified group.

By performing such grouping, the object position information and the like can be edited in units of group, and the editing can be performed more efficiently.

<Regarding Edit of Object Position Information>

When the objects are grouped, the information processing apparatus 11 becomes able to edit information regarding the objects such as object position information in units of group.

Specifically, for example, for a plurality of grouped objects, it is possible to change the object position information of each object while maintaining the relative positional relationship of the plurality of objects.

Figure 5:
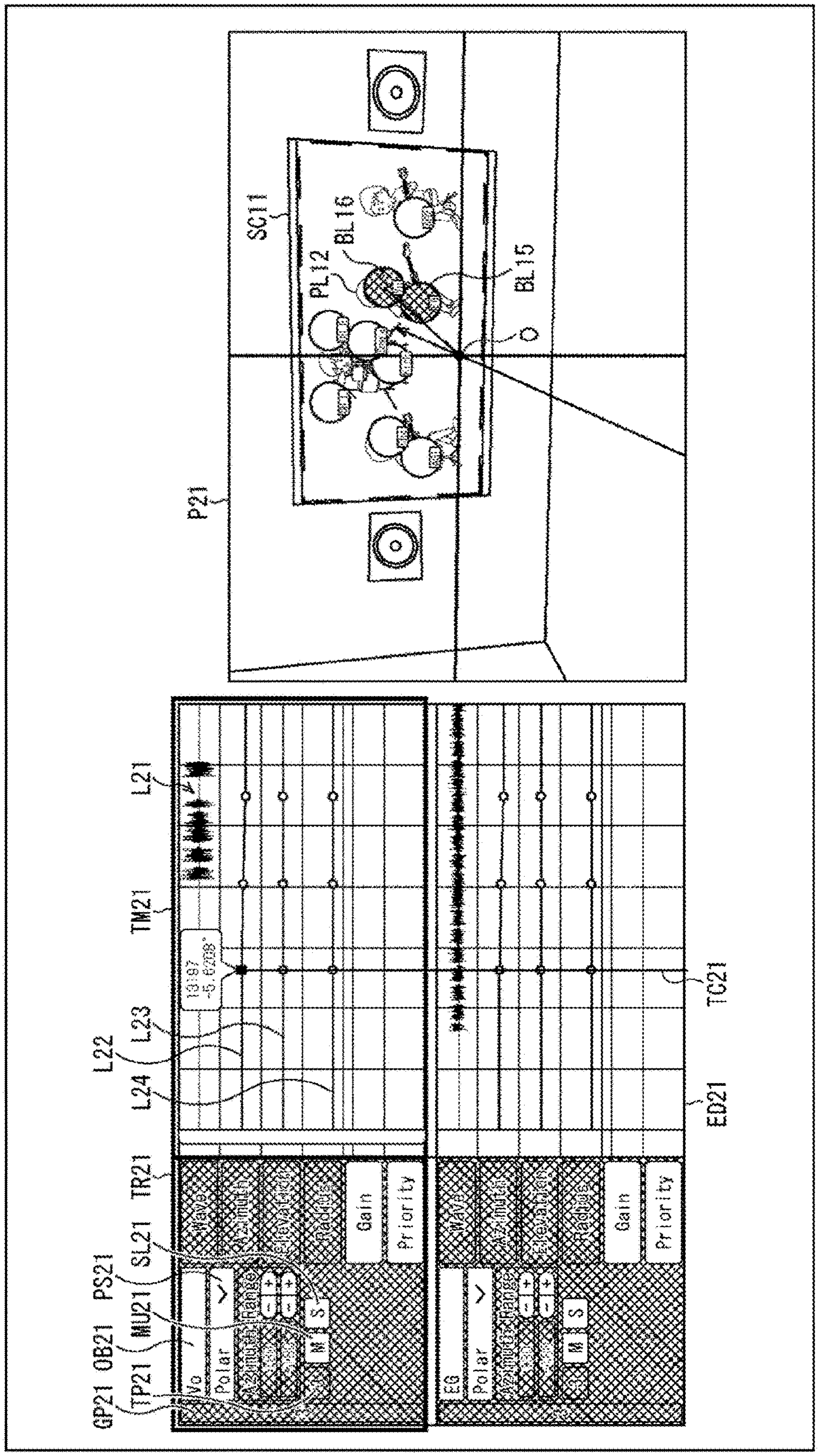
FIG. 5 is a view explaining movement of grouped objects.

For example, it is assumed that the edit screen and the POV image shown in FIG. 5 are displayed on the display unit 24. It is to be noted that in FIG. 5, parts corresponding to those in FIG. 3 are given the same reference numerals, and description thereof will be omitted as appropriate.

In the example shown in FIG. 5, an edit screen ED21 and a POV image P21 are displayed on the display unit 24. It is to be noted that here, only a part of the edit screen ED21 is illustrated for better viewability of the drawing.

In the edit screen ED21, a track area and a timeline area are provided for each track similarly to the case shown in FIG. 2.

That is, here, the track area and the timeline area are each displayed for the track of the object of vocal whose object name is "Vo" and for the track of the object of an electric guitar whose object name is "EG".

For example, an area TR21 is a track area for the track of the object of the vocal, and an area TM21 is a timeline area for the track of the object of the vocal.

In this example, in addition to an area GP21, which is a group display area, an area OB21, which is an object name display area, and an area PS21, which is a coordinate system selection area, a track color display area TP21, a mute button MU21, and a solo button SL21 are displayed in the area TR21.

Here, the track color display area TP21 is an area where a track color number is displayed. The track color number is information indicating a track color that can be given to each track and is a color for identifying the track.

As will be described later, in the information processing apparatus 11, it is possible to select whether the object balls on the POV image are displayed in the group color or displayed in the track color.

Therefore, the user can specify the track color for each track by operating the input unit 21 to operate the track color display area on the edit screen ED21. That is, for example, the user causes a track color selection window similar to the group selection window GW11 shown in FIG. 2 to be displayed, and selects a track color number from the track color selection window, thereby selecting the track color of the track.

For example, the numeral "3" written in the track color display area TP21 indicates a track color number, and the track color display area TP21 is displayed in the track color indicated by the track color number.

It is to be noted that any track color can be selected for each track, and for example, different track colors from each other can be selected (specified) for tracks corresponding to two objects belonging to the same group. In addition, for example, it is also possible to select the same track color for tracks corresponding to two objects belonging to different groups from each other.

The mute button MU21 is a button to be operated when mute setting described later is performed, and the solo button SL21 is a button to be operated when solo setting described later is performed.

In addition, in the area TM21, which is a timeline area for the track of the object of the vocal, for example, a time waveform L21 of the track, i.e., an audio signal of the object and polygonal lines L22 to L24 representing the horizontal angle, the vertical angle, and the radius of time series of the object are displayed.

In particular, the points on the polygonal line L22, the polygonal line L23, and the polygonal line L24 represent edit points at which the horizontal angle, the vertical angle, and the radius, respectively, of the object position information at a certain time point (timing) can be specified. The edit point may be a time point defined in advance, or may be a time point specified by the user. Alternatively, the user may be able to delete the edit point.

Furthermore, at the time of editing each track, the user can reproduce the sound of the rendered audio content and perform edit while listening to the reproduced sound, and a reproduction cursor TC21 indicating the reproduction position of the sound of the audio content, i.e., the time point during reproduction, is also displayed on the edit screen ED21. In the POV image P21, the object ball of each object is displayed on the basis of the object position information at a time point (timing) indicated by the reproduction cursor TC21.

In the example shown in FIG. 5, the same group ID "3" is displayed in the group display area of the track corresponding to each object of the vocal and the electric guitar, thereby indicating that those objects belong to the same group.

Therefore, in the POV image P21, an object ball BL15 of the object of the electric guitar and an object ball BL16 of the object of the vocal are displayed in the same group color.

In addition, in the example shown in FIG. 5, the reproduction cursor TC21 is positioned at the time point “13197”.

It is assumed that at this time point, the object position information of the object of the vocal is the coordinates (azimuth, elevation, radius)=(−5.62078, 1.36393, 1), and the object position information of the object of the electric guitar is the coordinates (−3.57278, −3.79667, 1).

Figure 6:
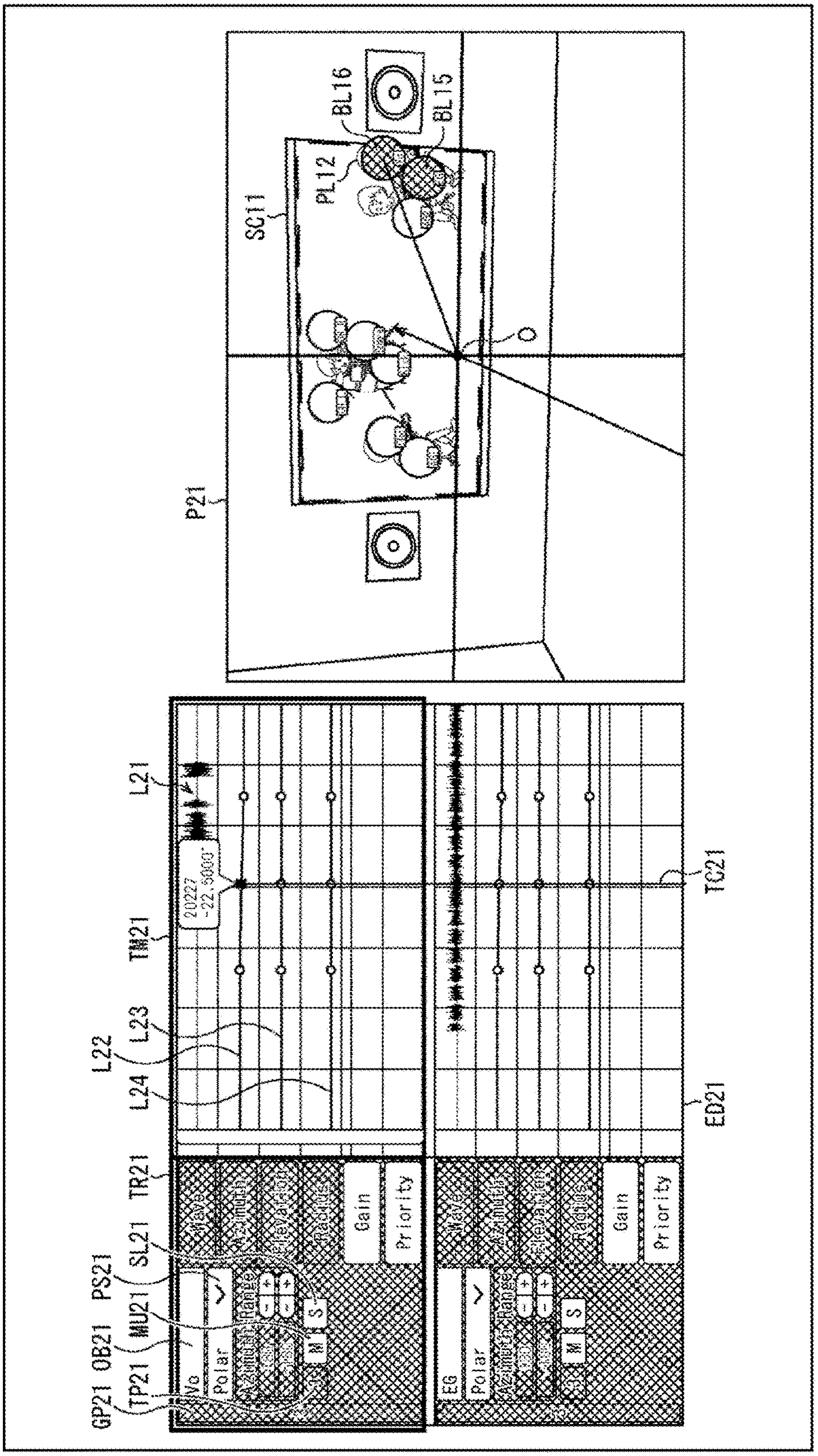
FIG. 6 is a view explaining movement of grouped objects.

It is assumed that from such a state shown in FIG. 5, the user has operated the input unit 21 as shown in FIG. 6, for example, and has changed the object position information of the object of the vocal at the time point “20227”. It is to be noted that in FIG. 6, parts corresponding to those in FIG. 5 are given the same reference numerals, and description thereof will be omitted as appropriate.

For example, the user instructs change of the object position information by operating the input unit 21 to move the position of the edit point or move the object ball, or by directly inputting the changed object position information. That is, the changed object position information is input.

In the example of FIG. 6, it is assumed that the user has specified the coordinates (−22.5, 1.36393, 1) as changed object position information of the object of the vocal at the time point “20227”.

Then, in accordance with the signal supplied from the input unit 21 in response to the user operation, the position determination unit 41 determines the object position information at the time point “20227” of the object of the vocal to the coordinates (−22.5, 1.36393, 1) specified by the user.

At the same time, by referring to the group information recorded in the recording unit 22, the position determination unit 41 specifies another object belonging to the same group as that of the object of the vocal whose object position information has been changed. Here, it is specified that the object of the electric guitar is an object of the same group as that of the object of the vocal.

The position determination unit 41 changes (determines) the object position information of the object of the electric guitar belonging to the same group thus specified so that the relative positional relationship with the object of the vocal is maintained. At this time, the object position information of the object of the electric guitar is determined on the basis of the coordinates (−22.5, 1.36393, 1), which are the changed object position information of the object of the vocal.

Therefore, in this example, the object position information of the object of the electric guitar at the time point “20227” is the coordinates (−20.452, −3.79667, 1).

When the object position information of the objects thus grouped is changed (determined), the display control unit 42 controls the display unit 24 to cause the display unit 24 to move the object balls of those objects to the positions indicated by the changed object position information.

In the example shown in FIG. 6, the object ball BL16 of the object of the vocal and the object ball BL15 of the object of the electric guitar belonging to the same group are moved to the right in the figure while the relative positional relationship of those objects is maintained.

Figure 7:
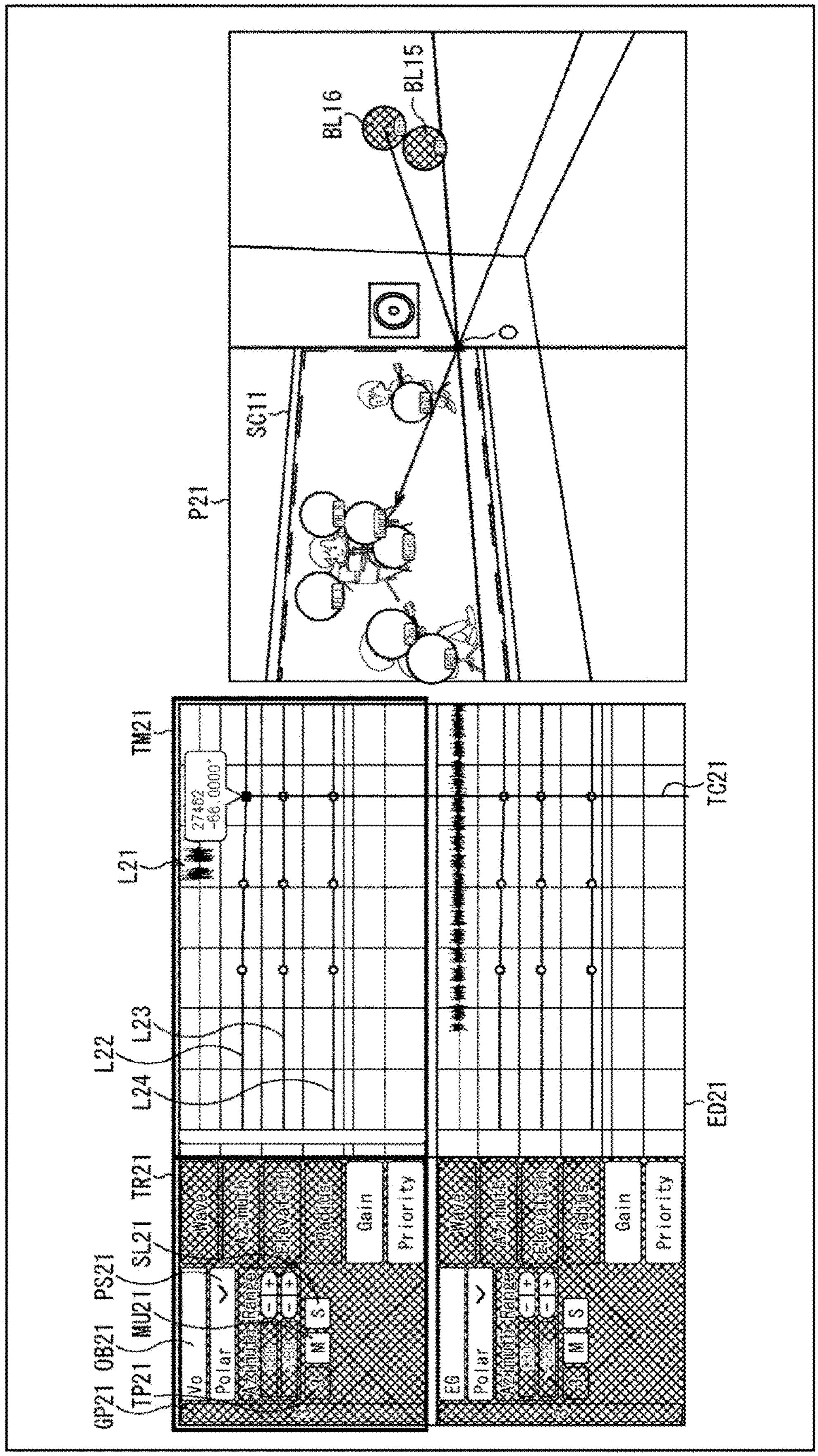
FIG. 7 is a view explaining movement of grouped objects.

Furthermore, it is assumed that from the state shown in FIG. 6, the user has operated the input unit 21 as shown in FIG. 7, for example, and has changed the object position information of the object of the vocal at the time point “27462”. It is to be noted that in FIG. 7, parts corresponding to those in FIG. 5 are given the same reference numerals, and description thereof will be omitted as appropriate.

In the example of FIG. 7, it is assumed that the user has specified the coordinates (−56, 1.36393, 1) as changed object position information of the object of the vocal at the time point “27462”.

Then, in accordance with the signal supplied from the input unit 21 in response to the user operation, the position determination unit 41 determines the object position information at the time point “27462” of the object of the vocal to the coordinates (−56, 1.36393, 1) specified by the user.

At the same time, the position determination unit 41 changes (determines) the object position information of the object of the electric guitar belonging to the same group as that of the vocal object so that the relative positional relationship with the object of the vocal is maintained.

Therefore, in this example, the object position information of the object of the electric guitar at the time point “27462” is the coordinates (−53.952, −3.79667, 1).

When the object position information of the objects thus grouped is changed, the display control unit 42 controls the display unit 24 to cause the display unit 24 to move the object balls of those objects to the positions indicated by the changed object position information.

In the example shown in FIG. 7, the object ball BL16 of the object of the vocal and the object ball BL15 of the object of the electric guitar belonging to the same group are moved to the further right in the figure than in the case of FIG. 6 while the relative positional relationship of those objects is maintained.

In the examples of FIGS. 6 and 7, the user is required to input the changed object position information of the object of the vocal, but the input of the changed object position information and the like is not required for the object of the electric guitar belonging to the same group as that of the object of the vocal.

That is, only by changing the object position information of one object, the object position information of all the other objects belonging to the same group as that of the object is also changed collectively automatically without any instruction from the user’s viewpoint. In other words, the user does not have to do the work of inputting and changing the object position information of all the objects one by one. Moreover, the object position information can be appropriately changed while the relative positional relationship of the objects is maintained.

As described above, by changing the object position information of all the objects belonging to the same group while maintaining their relative positional relationship, it is possible to edit the object position information more efficiently and easily.

It is to be noted that in FIGS. 6 and 7, an example in which when the object position information of the object of the vocal is changed, the object position information of the object of the electric guitar belonging to the same group is changed in accordance with the change is explained.

However, inversely, when the object position information of the object of the electric guitar is changed by the user, the object position information of the object of the vocal is changed in accordance with the change.

<Explanation of Object Movement Processing>

The processing performed in a case where the object position information is changed to move the position of the object in the reproduction space as described with reference to FIGS. 5 to 7 will be described here. That is, the object movement processing by the information processing apparatus 11 will be described below with reference to the flowchart of FIG. 8. It is to be noted that when this object movement processing is started, at least the edit screen is displayed on the display unit 24.

In step S41, the control unit 23 receives the specification of the object of the change target of the object position information and the changed object position information of the object.

For example, the user specifies a change target object by operating the input unit 21 to select a track area or the like on the edit screen, and the control unit 23 specifies the specified object on the basis of the signal supplied from the input unit 21.

In addition, for example, the user specifies the changed object position information by operating the input unit 21 to perform input such as moving the positions of the edit points of the horizontal angle, the vertical angle, and the radius constituting the object position information displayed in the timeline area of the edit screen.

In step S42, by referring to the group information recorded in the recording unit 22, the control unit 23 specifies an object belonging to the same group as that of the object specified in step S41.

In step S43, the position determination unit 41 changes (updates) the object position information of the specified object on the basis of the signal supplied from the input unit 21 in accordance with the operation of specifying the changed object position information.

In addition, the position determination unit 41 also changes the object position information of all the other objects belonging to the same group specified in step S42 in accordance with the change of the object position information of the specified object. At this time, the object position information is changed so that the relative positional relationship of all the objects belonging to the group is maintained (held).

In step S44, the display control unit 42 controls the display unit 24 to update the display of the edit screen and the POV image displayed on the display unit 24 in accordance with the change of the object position information in step S43, and the object movement processing ends.

For example, the display control unit 42 updates the display of the positions of the horizontal angle, the vertical angle, and the radius constituting the object position information in the timeline area of the edit screen, and moves the position of the object ball on the POV image. When the object position information is changed in this manner, the object is moved in the reproduction space.

As described above, when changing the object position information of one object, the information processing apparatus 11 changes the object position information of not only the object but also all the other objects belonging to the same group as that of the object. At this time, the information processing apparatus 11 changes the object position information of all the objects belonging to the same group so that the relative positional relationship of those objects is maintained before and after the change.

Thus, by simultaneously changing the object position information of the objects belonging to the same group while maintaining the relative positional relationship of those objects, it is possible to perform edit more efficiently.

<Regarding L/R Pair>

By the way, in a case where two paired objects are grouped, it is sometimes desired to arrange the positions of those two objects in the reproduction space symmetrically with respect to a reference plane serving as a predetermined reference. The reference plane mentioned here is, for example, a median plane including a straight line parallel to the direction of the front viewed from the listening position O.

For example, regarding the reverb component, i.e., the ambience or the like, there are many demands that it is desired to make the two ambiences objects to be paired with each other and arrange those objects symmetrically with respect to the reference plane.

Therefore, it may also be possible to specify two objects desired to be arranged symmetrically with respect to the reference plane as objects constituting an L/R pair.

The two objects in an L/R pair constitute one group. Then, in a case where the change of the object position information of one of those two objects is instructed, not only the object position information of one object but also the object position information of the other object is changed so as to be symmetrical with respect to the reference plane in the reproduction space.

Figure 9:
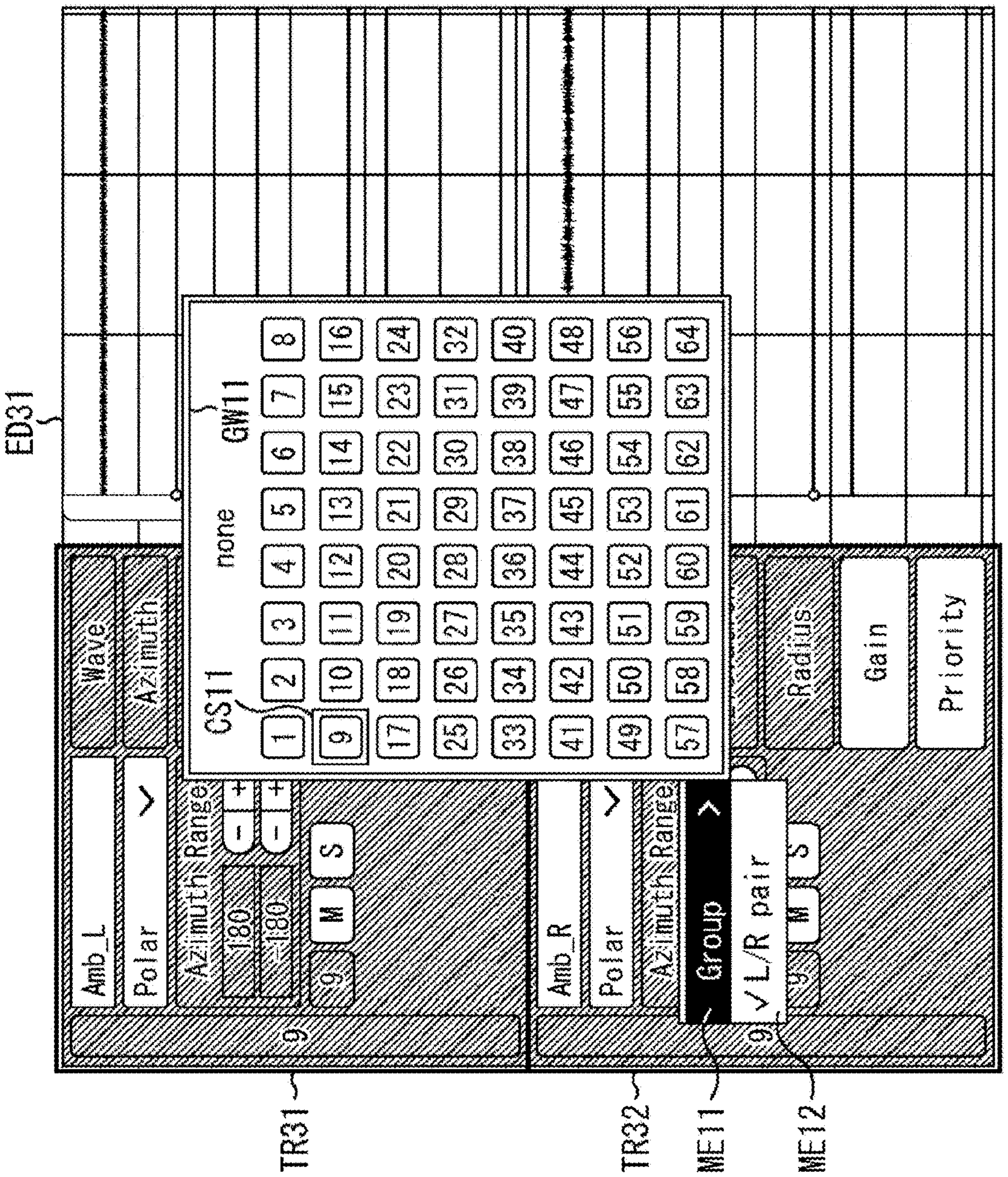
FIG. 9 is a view explaining an L/R pair.

Specifically, for example, in a case where an object to be grouped is specified as an object constituting an L/R pair, the user performs an operation of specifying the menu item ME12 as shown in FIG. 9. It is to be noted that in FIG. 9, parts corresponding to those in FIG. 2 are given the same reference numerals, and description thereof will be omitted as appropriate.

FIG. 9 shows a part of an edit screen ED31 displayed on the display unit 24, and in this example, the edit screen ED31 displays a track area and a timeline area for each of the two tracks.

For example, an area TR31 is a track area of a track corresponding to an object, whose object name is "Amb_L", of the ambience arranged on the front left side as viewed from the listening position O. Similarly, an area TR32 is a track area of a track corresponding to an object, whose object name is "Amb_R", of the ambience arranged on the front right side as viewed from the listening position O.

Furthermore, in FIG. 9, the menu item ME11, the menu item ME12, and the group selection window GW11 are displayed in a state where the track corresponding to the area TR32, i.e., the object "Amb_R" is selected (specified).

In this state, when the user operates the input unit 21 to operate the menu item ME12 for specification as an L/R pair, a check mark is displayed on the left side of the figure of the character "L/R pair" in the menu item ME12. Thus, the object "Amb_R" becomes an object constituting the L/R pair.

In addition, in the group selection window GW11, a group icon whose group ID is "9" is specified (selected) by the cursor CS11 here. Therefore, the object "Amb_R" belongs to the group whose group ID is "9" and becomes an object constituting the L/R pair.

In the example of FIG. 9, the group ID "9" is displayed in the group display area in the area TR31 also for the track corresponding to the object "Amb_L".

Therefore, it can be understood that the object "Amb_L" and the object "Amb_R" belong to the group whose group ID is "9" and are objects constituting the L/R pair.

In a case where it is possible to thus specify not only a group, to which each object belongs but also whether or not each object is in an L/R pair, an L/R pair flag that is information indicating whether or not each object is an object constituting an L/R pair is only required also to be included in the group information.

In such a case, for example, the group information includes a group ID, information indicating an object belonging to the group, and an L/R pair flag.

For example, the value "1" of an L/R pair flag indicates that the two objects belonging to the group are in an L/R pair, and the value "0" of an L/R pair flag indicates that a plurality of objects belonging to the group is not in an L/R pair.

In particular, the group corresponding to group information including an L/R pair flag whose value is "1" is always composed of two objects. In other words, it is possible to specify two objects as an L/R pair only in a case where the two objects constitute one group. Therefore, it can be said that being an L/R pair indicates one characteristic of the group.

Figure 10:
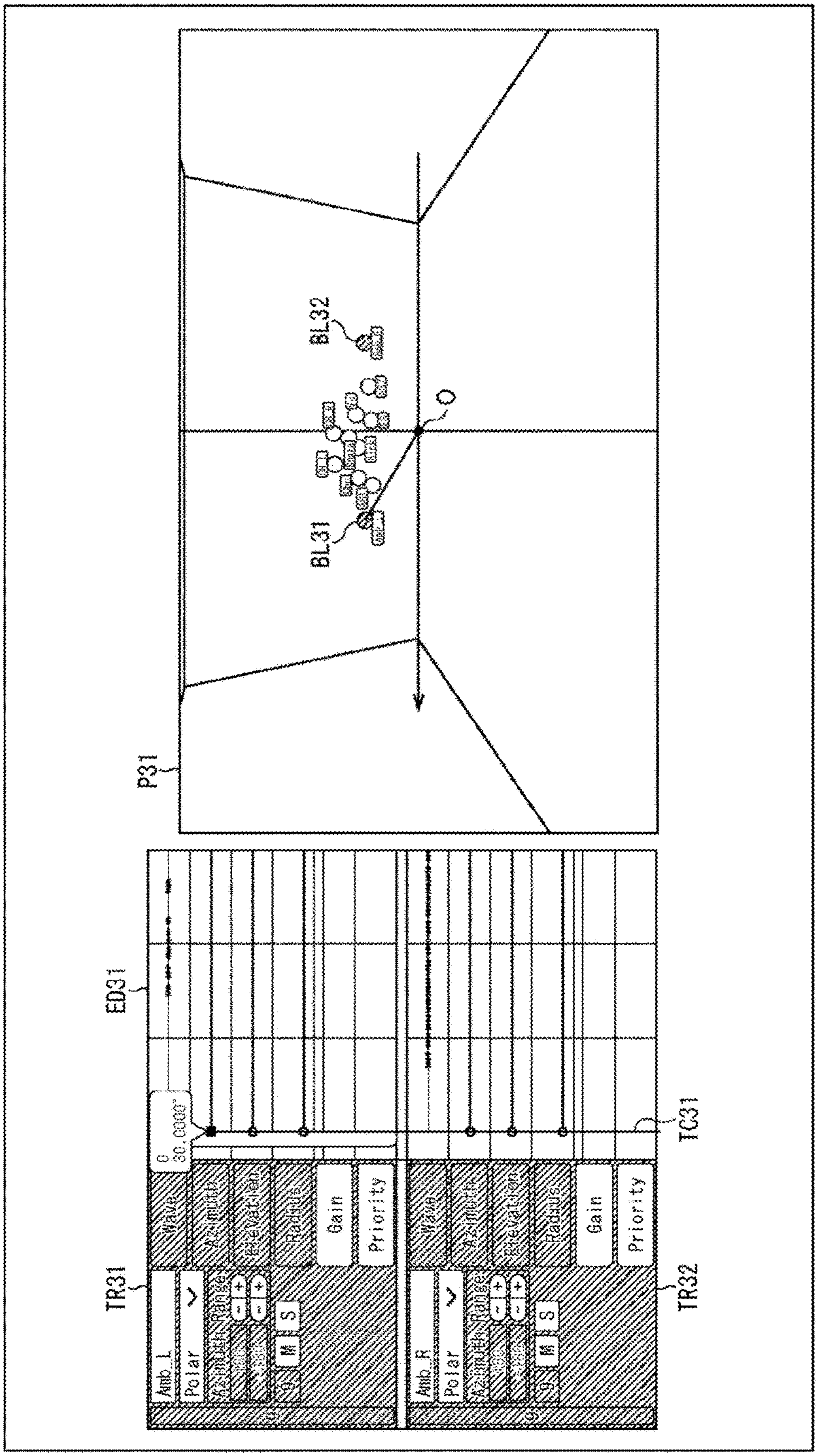
FIG. 10 is a view explaining an L/R pair.
Figure 11:
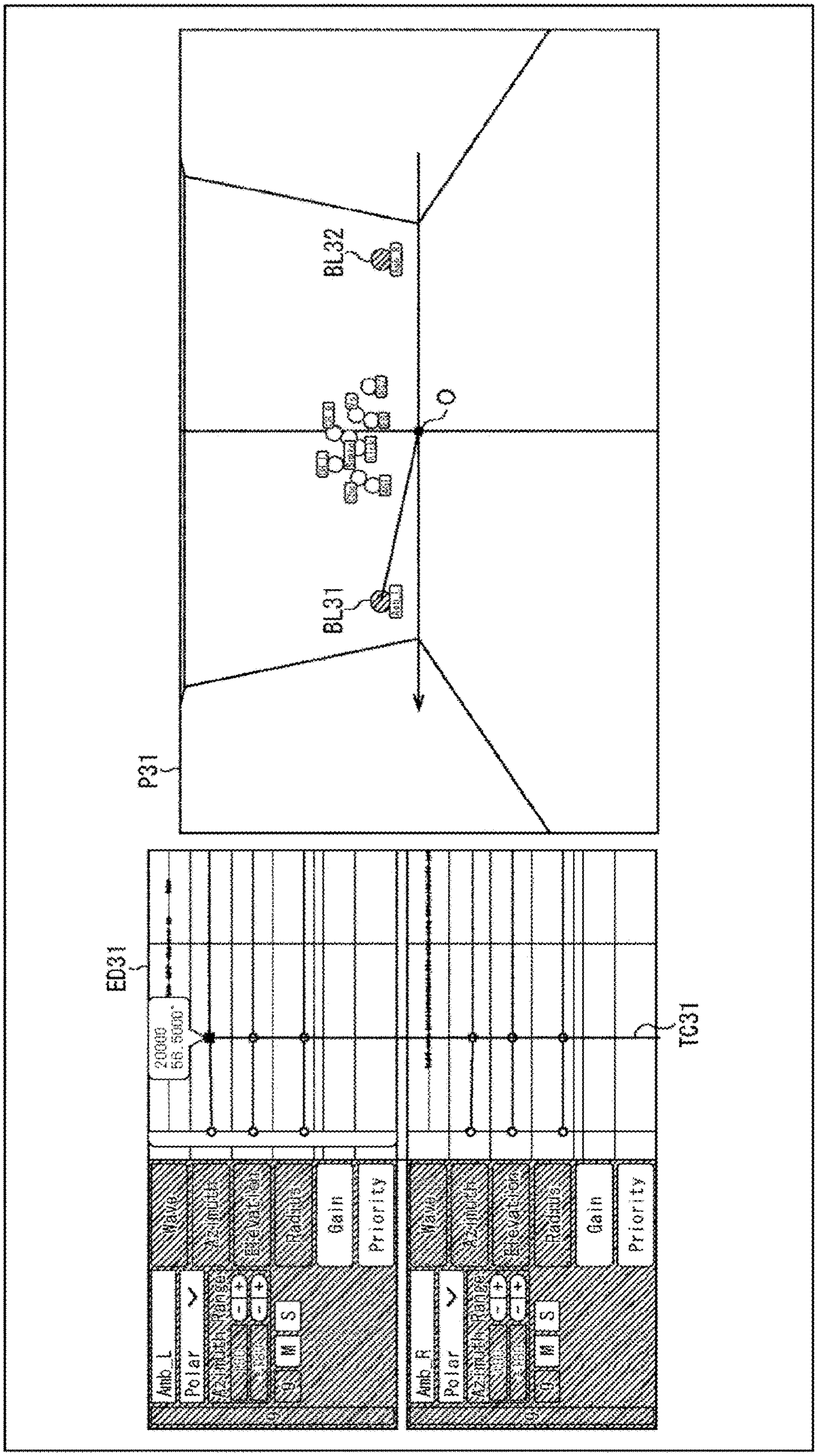
FIG. 11 is a view explaining an L/R pair.
Figure 12:
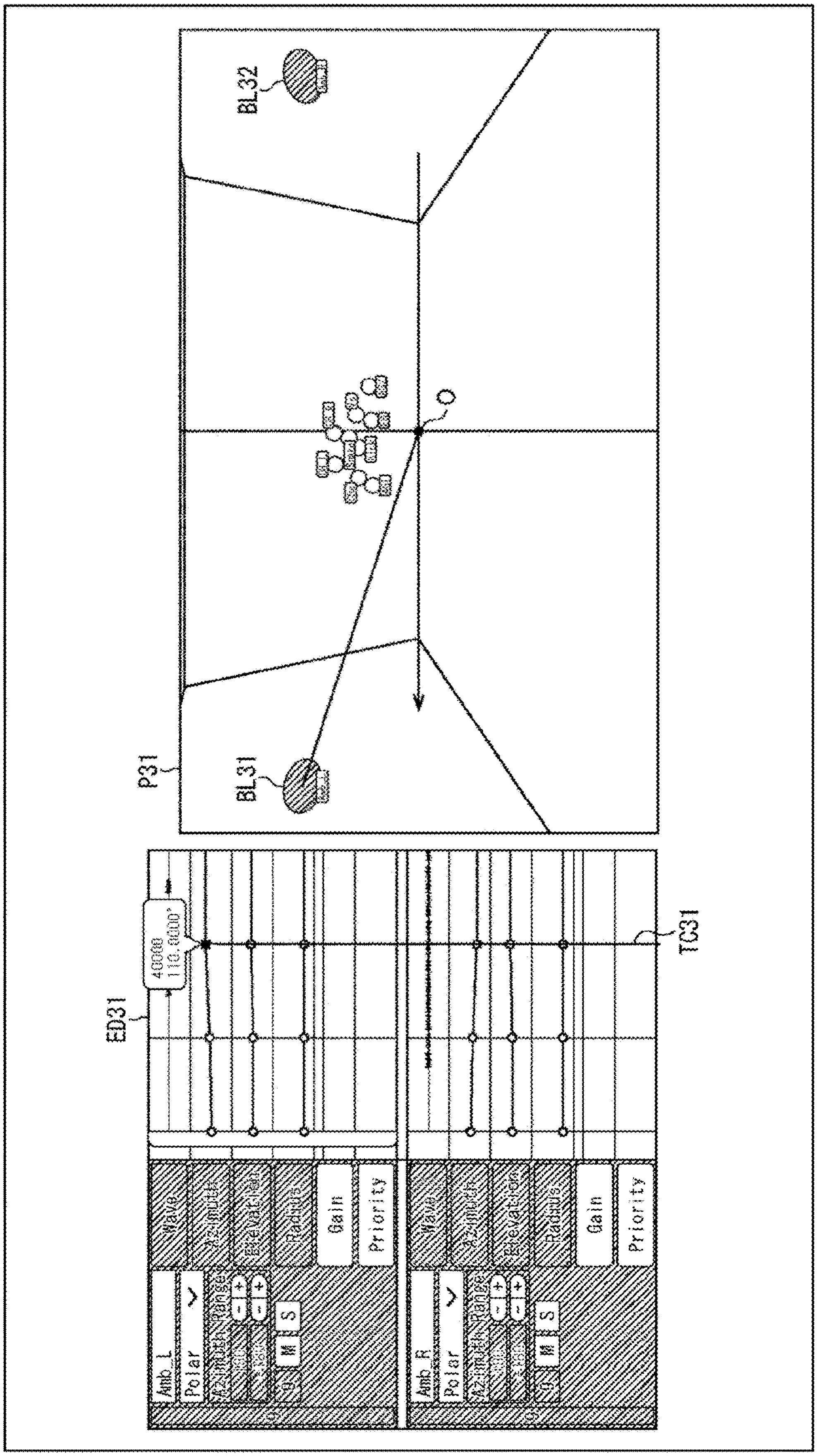
FIG. 12 is a view explaining an L/R pair.

As described above, in a case where the object "Amb_L" and the object "Amb_R" are made into an L/R pair, the object position information of these objects is changed, for example, as shown in FIGS. 10 to 12, in accordance with the user operation. It is to be noted that in FIGS. 10 to 12, parts corresponding to those in FIG. 9 are given the same reference numerals, and description thereof will be omitted as appropriate.

For example, in the example shown in FIG. 10, the edit screen ED31 and a POV image P31 are displayed on the display unit 24.

In the edit screen ED31, the area TR31, which is a track area of the object "Amb_L", and the area TR32, which is a track area of the object "Amb_R", are displayed in the group color of the group whose group ID is "9" to which those objects belong. In addition, in the timeline area on the edit screen ED31, a reproduction cursor TC31 is positioned at the time point "0".

In such a state, it is assumed that the user has operated the input unit 21 and has specified the coordinates (30, 0, 1) as the object position information of the object "Amb_L" at the time point "0".

Then, the position determination unit 41 determines the object position information of the object "Amb_L" at the time point "0" to the coordinates (30, 0, 1). At the same time, the position determination unit 41 determines the object position information of the object "Amb_R" at the time point "0" so that the position of the object "Amb_R" in the reproduction space becomes symmetrical with the position of the object "Amb_L" with respect to the reference plane. In other words, the object position information of the object "Amb_R" is changed.

Here, the object position information of the object "Amb_R" at the time point "0" is the coordinates (−30, 0, 1).

When the object position information of the object "Amb_L" and the object "Amb_R" belonging to the same group and being in an L/R pair is determined in this manner, the display control unit 42 updates the display of the POV image P31 on the basis of the determined object position information.

Here, an object ball BL31 of the object "Amb_L" is displayed at a position corresponding to the coordinates (30, 0, 1) on the POV image P31.

The object name "Amb_L" is displayed on the object ball BL31, and the object ball BL31 is displayed in a group color of the group whose group ID is "9".

On the other hand, an object ball BL32 of the object "Amb_R" is displayed at a position corresponding to the coordinates (−30, 0, 1) on the POV image P31.

The object name "Amb_R" is displayed on the object ball BL32, and the object ball BL32 is displayed in a group color of the group whose group ID is "9".

In particular, here, a plane including the listening position O and a straight line parallel to the depth direction in the figure is used as a reference plane, and the object ball BL31 and the object ball BL32 are arranged at positions symmetrical with respect to the reference plane.

In addition, it is assumed that from the state shown in FIG. 10, the user has operated the input unit 21 as shown in FIG. 11 and has specified the coordinates (56.5, 0, 1) as the object position information of the object "Amb_L" at the time point "20000".

Then, the position determination unit 41 sets the object position information of the object "Amb_R" at the time point "20000" to the coordinates (−56.5, 0, 1) in accordance with the coordinates (56.5, 0, 1) as the object position information of the object "Amb_L".

Then, the display control unit 42 controls the display unit 24 on the basis of the coordinates (56.5, 0, 1) and the coordinates (−56.5, 0, 1) as the changed object position information, and updates the display of the POV image P31.

Thus, the object ball BL31 is moved to the position corresponding to the coordinates (56.5, 0, 1) on the POV image P31, and the object ball BL32 is moved to the position corresponding to the coordinates (−56.5, 0, 1) on the POV image P31. The object ball BL31 and the object ball BL32 are in a state of being arranged at positions symmetrically with respect to the reference plane, similarly to the case of FIG. 10, even after the movement.

Furthermore, it is assumed that from the state shown in FIG. 11, the user has operated the input unit 21 as shown in FIG. 12 and has specified the coordinates (110, 25, 1) as the object position information of the object "Amb_L" at the time point "40000".

Then, the position determination unit 41 sets the object position information of the object "Amb_R" at the time point "40000" to the coordinates (−110, 25, 1) in accordance with the coordinates (110, 25, 1) as the object position information of the object "Amb_L".

Then, the display control unit 42 controls the display unit 24 on the basis of the coordinates (110, 25, 1) and the coordinates (−110, 25, 1) as the changed object position information, and updates the display of the POV image P31.

Thus, the object ball BL31 is moved to the position corresponding to the coordinates (110,25,1) on the POV image P31, and the object ball BL32 is moved to the position corresponding to the coordinates (−110,25,1) on the POV image P31. The object ball BL31 and the object ball BL32 are in a state of being arranged at positions symmetrically with respect to the reference plane, similarly to the case of FIGS. 10 and 11, even after the movement.

It is to be noted that an example in which when the object position information of the object "Amb_L" of the object "Amb_L" and the object "Amb_R", which are in the L/R pair, is specified, the object position information of the object "Amb_R" is changed accordingly has been described here. However, inversely, when the object position information of the object "Amb_R" is specified, the position determination unit 41 changes the object position information of the object "Amb_L" accordingly.

In a case where the number of objects belonging to the group is two as described above, the user can specify those two objects as the L/R pair. In other words, the L/R pair can be set as a characteristic of the group.

If the setting of the L/R pair is performed, only by changing the object position information of one object of the L/R pair, the object position information of the other object is also changed automatically without any particular instruction from the viewpoint of the user. Moreover, since the two objects in the L/R pair are arranged at positions symmetrical with respect to the reference plane, the user can easily set the symmetrical sound image positions.

<Explanation of Grouping Processing>

The grouping processing performed by the information processing apparatus 11 in a case where the L/R pair can be specified as described above will be described here. That is, the grouping processing by the information processing apparatus 11 will be described below with reference to the flowchart of FIG. 13.

Figure 4:
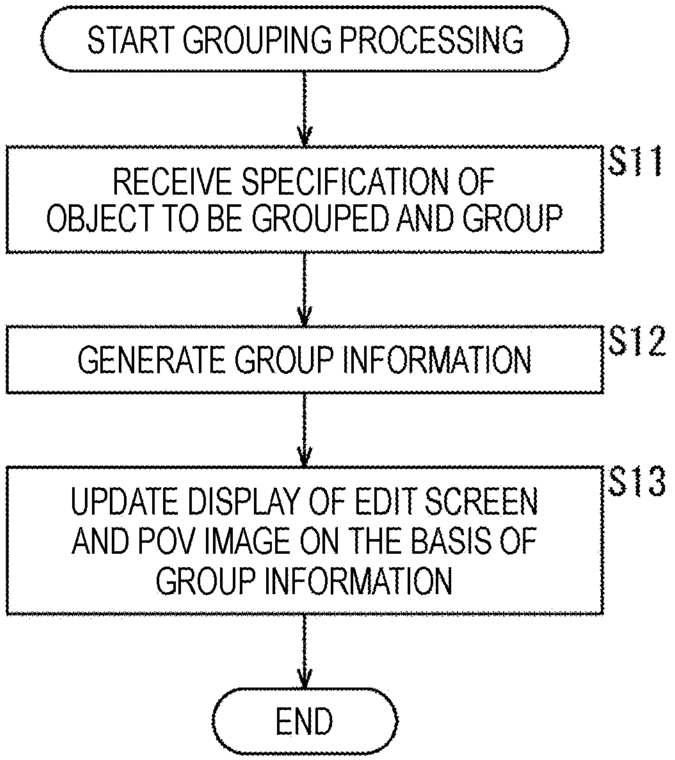
FIG. 4 is a flowchart explaining grouping processing.

When the grouping processing is started, the processing of step S71 is performed, and the processing of step S71 is similar to the processing of step S11 in FIG. 4, and hence the description thereof will be omitted. However, in step S71, the user specifies the L/R pair by operating the menu item for specification as an L/R pair on the edit screen as appropriate.

In step S72, the control unit 23 determines, on the basis of the signal supplied from the input unit 21, whether or not the number of objects specified as objects to be grouped is two.

In a case where it is determined in step S72 that not two, i.e., three or more objects are grouped, then the processing proceeds to step S75.

On the other hand, in a case where it is determined in step S72 that two objects are to be grouped, the control unit 23 determines in step S73 whether or not the two objects to be grouped are in an L/R pair. For example, when two objects are grouped, in a case where the menu item ME12 shown in FIG. 9 has been operated and an L/R pair has been specified, they are determined to be in an L/R pair.

In a case where the two objects are determined to be in an L/R pair in step S73, the control unit 23 sets in step S74 the value of the L/R pair flag of the group, to which the two objects to be grouped belong to "1". That is, an L/R pair flag whose value is "1" is generated.

After the processing of step S74 is performed, the processing proceeds to step S76.

On the other hand, in a case where it is determined in step S73 that the two objects are not in an L/R pair, the processing then proceeds to step S75.

In a case where it is determined in step S73 that the objects are not in an L/R pair or it is determined in step S72 that the number of the specified objects is not two, the processing of step S75 is performed.

In step S75, the control unit 23 sets the value of the L/R pair flag of the group, to which the plurality of objects to be grouped belongs to "0". That is, an L/R pair flag whose value is "0" is generated.

After the processing of step S75 is performed, the processing proceeds to step S76.

After the L/R pair flag is generated in step S74 or step S75, the processing of step S76 and step S77 is performed, and the grouping processing ends.

It is to be noted that the processing of step S76 and step S77 is similar to the processing of step S12 and step S13 in FIG. 4, and hence the description thereof will be omitted. However, in step S76, the control unit 23 generates, in accordance with the specification operation by the user in step S71, group information including a group ID, information indicating an object belonging to the group, and the L/R pair flag generated in step S74 or step S75.

As described above, the information processing apparatus 11 performs grouping in accordance with the input operation to the input unit 21, and generates group information including the L/R pair flag.

By performing grouping in this manner, the object position information or the like can be edited more efficiently in units of group. Moreover, as for the object pair that is an L/R pair, only by specifying the position of one of the objects, the user can arrange the objects at symmetrical positions.

Figure 8:
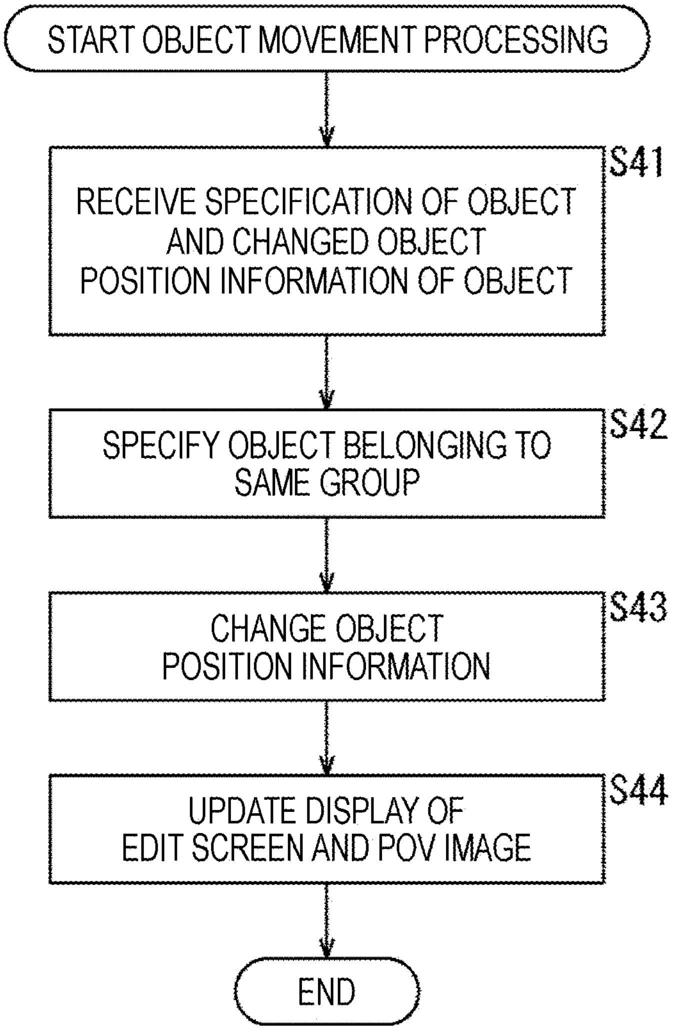
FIG. 8 is a flowchart explaining object movement processing.
Figure 13:
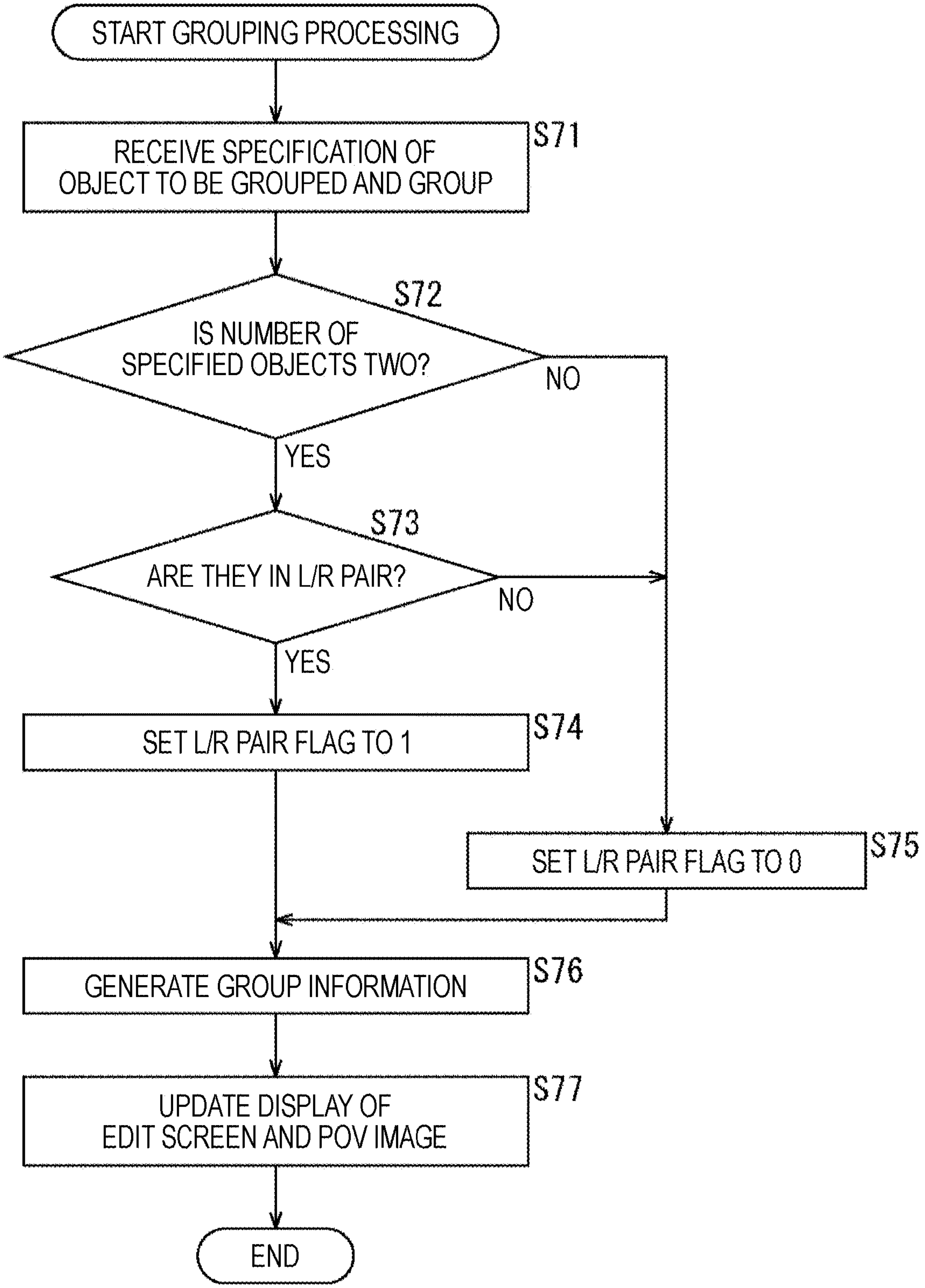
FIG. 13 is a flowchart explaining grouping processing.

In addition, even in a case where the grouping processing described with reference to FIG. 13 is performed, when the change of the object position information is instructed, similar processing to the object movement processing described with reference to FIG. 8 is performed basically.

However, in this case, when the objects are objects constituting an L/R pair, the object position information of the two objects is changed so that the two objects that are in the L/R pair in step S43 become symmetrical with respect to the reference plane. That is, the object position information of the two objects is changed while the two objects maintain the relationship symmetrical with respect to the reference plane. Therefore, also in this case, the user can perform edit more efficiently and easily.

<Regarding Simultaneous Edit of Object Position Information at Plurality of Time Points>

By the way, on the edit screen, the user can specify (change) the horizontal angle, the vertical angle, and the radius constituting object position information for each time point, i.e., for each edit point.

Furthermore, in a case where the object position information is changed, the information processing apparatus 11 can select a plurality of edit points by specifying a change range including a plurality of edit points arranged in the time direction, and offset (change) the positions (coordinate values) of the plurality of edit points simultaneously by a predetermined change amount.

Hereinafter, a change amount by which the coordinate values of a plurality of edit points included in a specified change range, i.e., the horizontal angle, the vertical angle, and the radius are changed simultaneously by one operation will be specifically referred to as an offset amount. In addition, an edit point included in the change range is also specifically referred to as a selection edit point.

A specific example of a case in which a plurality of edit points at different time points from each other are simultaneously selected by specifying a change range, and the coordinate values of those selection edit points are changed by the offset amount will be described here with reference to FIGS. 14 to 17. It is to be noted that in FIGS. 14 to 17, parts corresponding to each other are given the same reference numerals, and description thereof will be omitted as appropriate.

Figure 14:
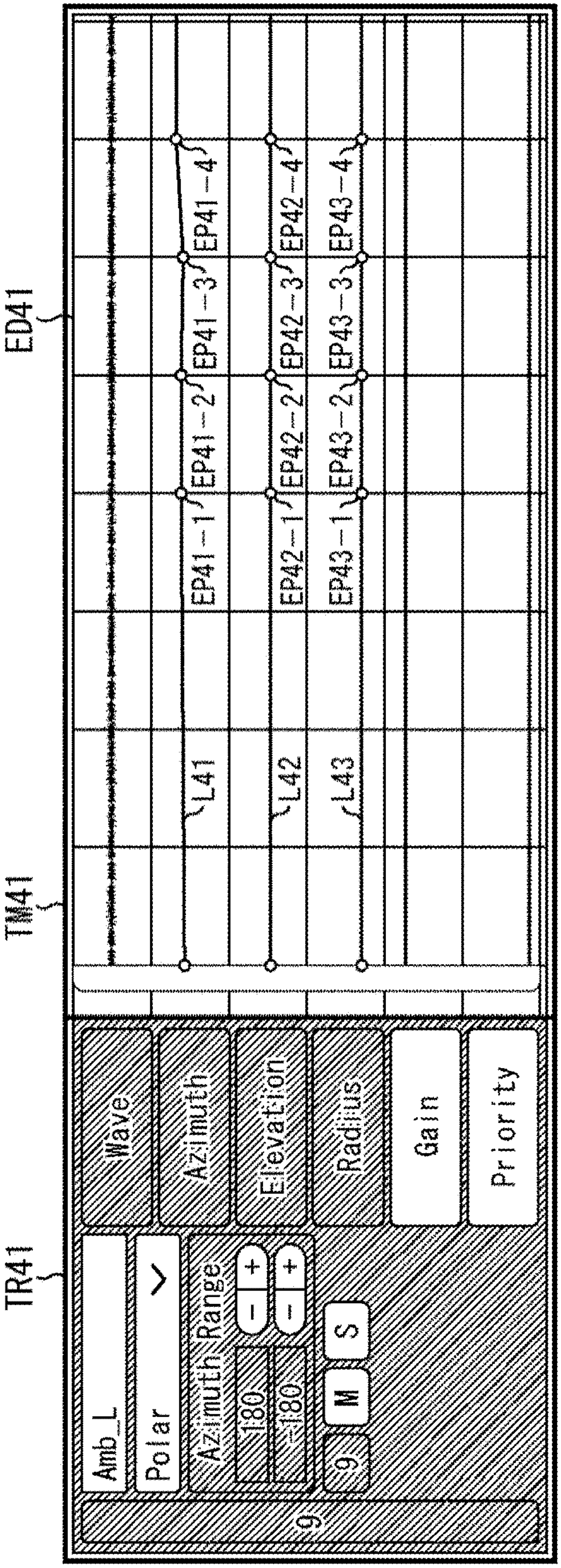
FIG. 14 is a view explaining a change in object position information in units of offset amount.

First, as shown in FIG. 14, for example, it is assumed that an area TR41, which is a track area, and an area TM41, which is a timeline area, are displayed for a track of the object "Amb_L" on an edit screen ED41 displayed on the display unit 24.

In FIG. 14, polygonal lines L41, L42, and L43 in the area TM41, which is the timeline area, represent the horizontal angle, the vertical angle, and the radius of time series of the object "Amb_L".

In particular, here, edit points EP41-1 to EP41-4 indicating the horizontal angles at the time point "20000", the time point "25000", the time point "30000", and the time point "35000", respectively, are provided on the polygonal line L41 indicating the horizontal angle constituting the object position information. It is to be noted that the edit points EP41-1 to EP41-4 will hereinafter be also referred to simply as the edit point EP41 in a case where it is not necessary to distinguish them from one another.

Similarly, edit points EP42-1 to EP42-4 indicating the vertical angles at the time point "20000", the time point "25000", the time point "30000", and the time point "35000", respectively, are provided on the polygonal line L42. It is to be noted that the edit points EP42-1 to EP42-4 will hereinafter be also referred to simply as the edit point EP42 in a case where it is not necessary to distinguish them from one another.

Furthermore, edit points EP43-1 to EP43-4 indicating the radii at the time point "20000", the time point "25000", the time point "30000", and the time point "35000", respectively, are provided on the polygonal line L43. It is to be noted that the edit points EP43-1 to EP43-4 will hereinafter be also referred to simply as the edit point EP43 in a case where it is not necessary to distinguish them from one another.

Now, let the coordinates as the object position information at the respective time points of the time point "20000", the time point "25000", the time point "30000", and the time point "35000" for the object "Amb_L" be (azimuth, elevation, radius)=(56.5, 0, 1), (65.0, 0, 1), (35.0, 0, 1), and (90.0, 0, 1), respectively.

Figure 15:
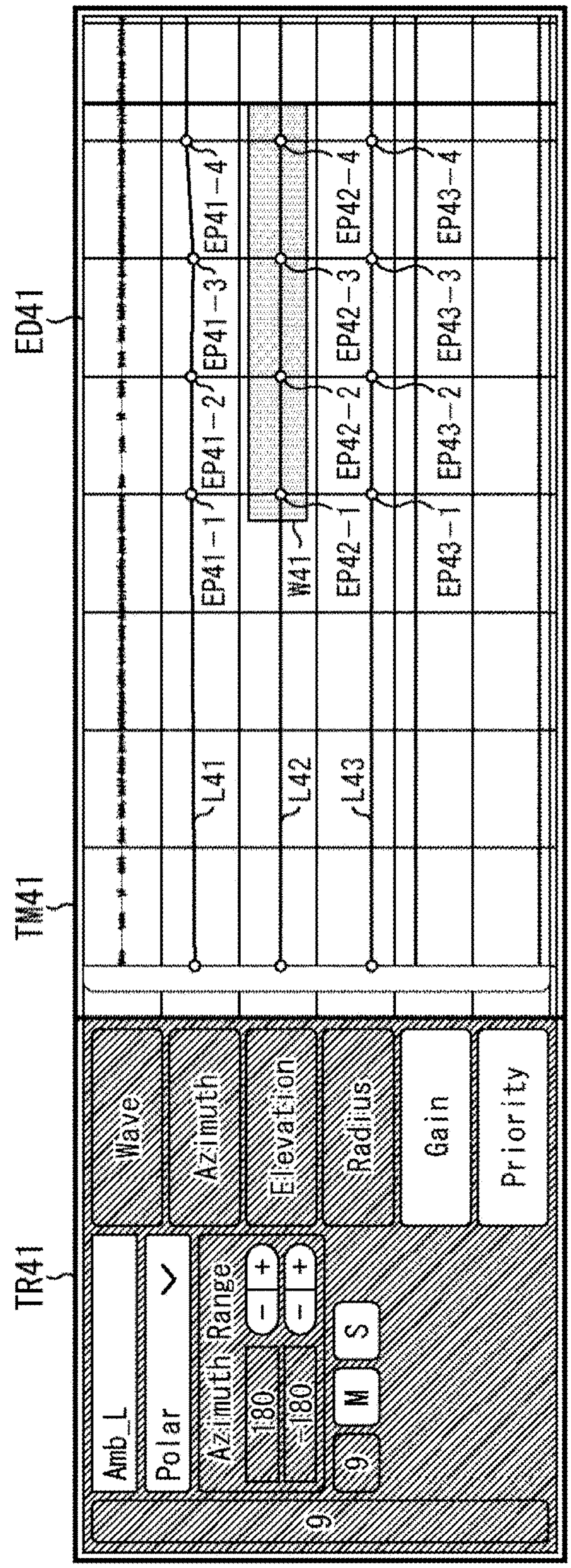
FIG. 15 is a view explaining a change in object position information in units of offset amount.

In such a state, when the user selects a range including a plurality of edit points as a change range by operating the input unit 21 to perform an operation such as range selection with the mouse as the input unit 21, for example, a frame W41 indicating the change range as shown in FIG. 15 is displayed.

In this example, the range including the four edit points EP42-1 to EP42-4 on the polygonal line L42 is surrounded by the frame W41, and the range surrounded by the frame W41 is specified as the change range.

It is to be noted that a range including only one edit point EP42 can be specified as a change range, or a range including edit points of different types (coordinate components) from each other such as the horizontal angle and the vertical angle can be specified as a change range. That is, for example, a range including a plurality of edit points EP41, EP42, and EP43 can be specified as a change range.

In addition, for example, when the edit point at a predetermined time point is included in the change range, the edit point of another coordinate component at the same time point as the edit point may be selected as being included in the change range.

In addition, the method of specifying the change range, i.e., specifying the edit point to be included in the change range, may be any method in which, for example, by operating the mouse while pressing the control key of the keyboard, each edit point is specified by clicking or the like with a pointer.

Figure 16:
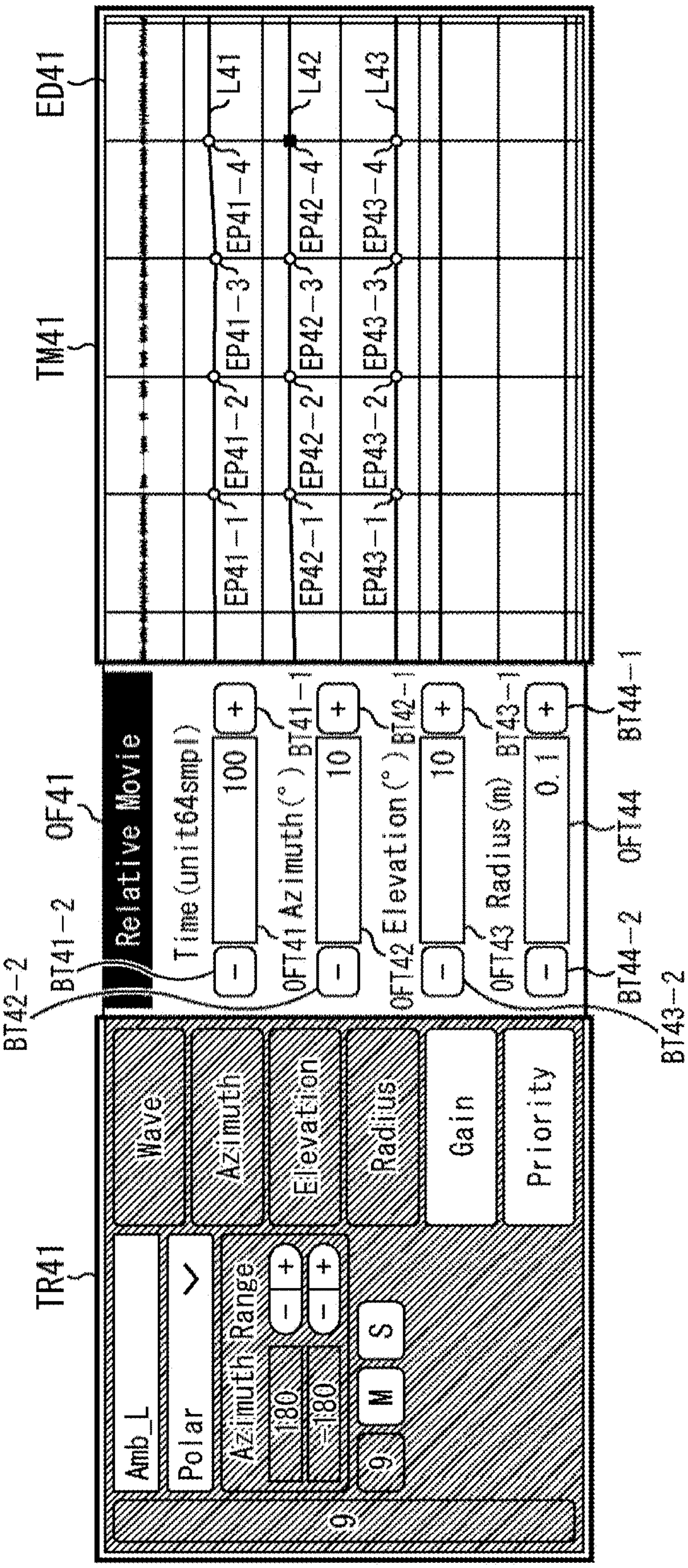
FIG. 16 is a view explaining a change in object position information in units of offset amount.

When the change range is specified, the display control unit 42 controls the display unit 24 to cause the display unit 24 to display an offset screen OF41 shown in FIG. 16, for example, on the edit screen ED41.

In the example shown in FIG. 16, the offset screen OF41 is displayed superimposed on the area TM41, which is the timeline area of the edit screen ED41.

The offset screen OF41 is provided with an offset display area OFT41 indicating an offset amount when the position of the selection edit point in the time direction is moved, i.e., the time point of the selection edit point is changed. The character "100" indicating the offset amount of the time point of the selection edit point (hereinafter also referred to as a time offset amount in particular) is displayed in the offset display area OFT41.

In addition, both ends of the offset display area OFT41 on the offset screen OF41 are provided with a button BT41-1 and a button BT41-2 for moving the position of the selection edit point in the time direction by the time offset amount "100".

For example, each time the user operates the input unit 21 to press the button BT41-1 once, the position of the selection edit point in the time direction is moved by the time offset amount "100" in the future direction. That is, the time point of the object position information increases by the time offset amount "100".

Conversely, for example, each time the user operates the input unit 21 to press the button BT41-2 once, the position of the selection edit point in the time direction is moved by the time offset amount "100" in the past direction. That is, the time point of the object position information decreases by the time offset amount "100". It is to be noted that the buttons BT41-1 and BT41-2 will hereinafter be also referred to simply as the button BT41 in a case where it is not necessary to distinguish them from each other.

The offset screen OF41 is provided with an offset display area OFT42 indicating an offset amount when the horizontal angle indicated by the selection edit point is changed, i.e., the position of the selection edit point is moved. The character "10" indicating the offset amount of the horizontal angle (hereinafter also referred to as a horizontal angle offset amount in particular) is displayed in the offset display area OFT42.

Both ends of the offset display area OFT42 on the offset screen OF41 are provided with a button BT42-1 and a button BT42-2 for moving the horizontal angle, which is the value of the selection edit point, i.e., the position of the selection edit point in the up and down direction by the horizontal angle offset amount "10".

For example, each time the user operates the input unit 21 to press the button BT42-1 once, the position of the selection edit point is moved by the horizontal angle offset amount "10" in the upward direction of the figure. That is, the horizontal angle of the object position information increases by the horizontal angle offset amount "10".

Conversely, for example, each time the user operates the input unit 21 to press the button BT42-2 once, the position of the selection edit point is moved by the horizontal angle offset amount "10" in the downward direction of the figure. That is, the horizontal angle of the object position information decreases by the horizontal angle offset amount "10". It is to be noted that, hereinafter, the buttons BT42-1 and BT42-2 will be also referred to simply as the button BT42 in a case where it is not necessary to distinguish them from each other.

The offset screen OF41 is provided with an offset display area OFT43 indicating an offset amount when the vertical angle indicated by the selection edit point is changed, i.e., the position of the selection edit point is moved. The character "10" indicating the offset amount of the vertical angle (hereinafter also referred to as a vertical angle offset amount in particular) is displayed in the offset display area OFT43.

Both ends of the offset display area OFT43 on the offset screen OF41 are provided with a button BT43-1 and a button BT43-2 for moving the vertical angle, which is the value of the selection edit point, i.e., the position of the selection edit point in the up and down direction by the vertical angle offset amount "10".

For example, each time the user operates the input unit 21 to press the button BT43-1 once, the position of the selection edit point is moved by the vertical angle offset amount "10" in the upward direction of the figure.

That is, the vertical angle of the object position information increases by the vertical angle offset amount "10".

Conversely, for example, each time the user operates the input unit 21 to press the button BT43-2 once, the position of the selection edit point is moved by the vertical angle offset amount "10" in the downward direction of the figure. That is, the vertical angle of the object position information decreases by the vertical angle offset amount "10". It is to be noted that the buttons BT43-1 and BT43-2 will hereinafter be also referred to simply as the button BT43 in a case where it is not necessary to distinguish them from each other.

The offset screen OF41 is provided with an offset display area OFT44 indicating an offset amount when the radius indicated by the selection edit point is changed, i.e., the position of the selection edit point is moved. The character "0.1" indicating the offset amount of the radius (hereinafter also referred to as a radius offset amount in particular) is displayed in the offset display area OFT44.

Both ends of the offset display area OFT44 on the offset screen OF41 are provided with a button BT44-1 and a button BT44-2 for moving the radius, which is the value of the selection edit point, i.e., the position of the selection edit point in the up and down direction by the radius offset amount "0.1".

For example, each time the user operates the input unit 21 to press the button BT44-1 once, the position of the selection edit point is moved by the radius offset amount "0.1" in the upward direction of the figure. That is, the radius of the object position information increases by the radius offset amount "0.1".

Conversely, for example, each time the user operates the input unit 21 to press the button BT44-2 once, the position of the selection edit point is moved by the radius offset amount "0.1" in the downward direction of the figure. That is, the radius of the object position information decreases by the radius offset amount "0.1". It is to be noted that, hereinafter, the buttons BT44-1 and BT44-2 will be also referred to simply as the button BT44 in a case where it is not necessary to distinguish them from each other.

In addition, the numerical value in the offset display area OFT41 to the offset display area OFT44, i.e., the offset amount may be able to be changed to any value by the user operation of the input unit 21.

As described above, when the range surrounded by the frame W41 is specified as the change range and the offset screen OF41 is displayed, the user, by operating the input unit 21, operates the button BT41, the button BT42, the button BT43, and the button BT44 provided on the offset screen OF41.

This allows the user to instruct change in units of offset amount for each component of the object position information. That is, the user can perform an operation on the user interface that is the offset screen OF41 and move the selection edit point relative to another edit point.

For example, it is assumed that the user has operated the button BT43-1 five times in the state shown in FIG. 15, i.e., in the state where the coordinates of the time point "20000", the time point "25000", the time point "30000", and the time point "35000" as the object position information are (56.5, 0, 1), (65.0, 0, 1), (35.0, 0, 1), and (90.0, 0, 1). That is, it is assumed that the user has performed an operation of increasing the vertical angle indicated by the four edit points EP42, which are the selection edit points, by 50 degrees.

When such an operation is performed, the position determination unit 41 increases, by 50, the vertical angle of the object position information of the time point "20000", the time point "25000", the time point "30000", and the time point "35000" of the object "Amb_L" corresponding to the selection edit point on the basis of the signal supplied from the input unit 21.

Due to this, the coordinates of the time point "20000", the time point "25000", the time point "30000", and the time point "35000" of the object "Amb_L" as the object position information are changed to (56.5, 50, 1), (65.0, 50, 1), (35.0, 50, 1), and (90.0, 50, 1).

In this example, only by operating the button BT43, the user can simultaneously change the object position information at the four time points by the vertical angle offset amount.

When the object position information is changed in this manner, the display control unit 42 controls the display unit 24 to update the display of the edit screen ED41. That is, as shown in FIG. 16, the display control unit 42 updates the display of the edit screen ED41 so that the edit points EP42-1 to EP42-4 move upward in the figure as compared with the case shown in FIG. 15.

Furthermore, it is assumed that the user has operated the button BT41-1 ten times in this state. That is, it is assumed that the user has performed an operation of increasing the time point of the selection edit point by 1000.

When such an operation is performed, the position determination unit 41 increases, by 1000, the time point of the object position information of the object "Amb_L" corresponding to the selection edit point on the basis of the signal supplied from the input unit 21.

That is, the object position information of the object "Amb_L", which has been of the time point "20000", the time point "25000", the time point "30000", and the time point "35000", is changed to the object position information of the time point "21000", the time point "26000", the time point "31000", and the time point "36000".

As a result, the coordinates at the time point "21000", the time point "26000", the time point "31000", and the time point "36000" of the object "Amb_L" as the object position information become (56.5, 50, 1), (65.0, 50, 1), (35.0, 50, 1), and (90.0, 50, 1).

At the same time, edit points do no longer exist at the time point "20000", the time point "25000", the time point "30000", and the time point "35000", at which there have been edit points so far, and the object position information at those time points is obtained by interpolation processing described later.

It is to be noted that only the edit point EP42 of the vertical angle is the selection edit point here, but in a case where the time point of the edit point is changed, the time point of the object position information is changed with the edit point EP41 and the edit point EP43 at the same time point as that of the edit point EP42 also being selection edit points.

Figure 17:
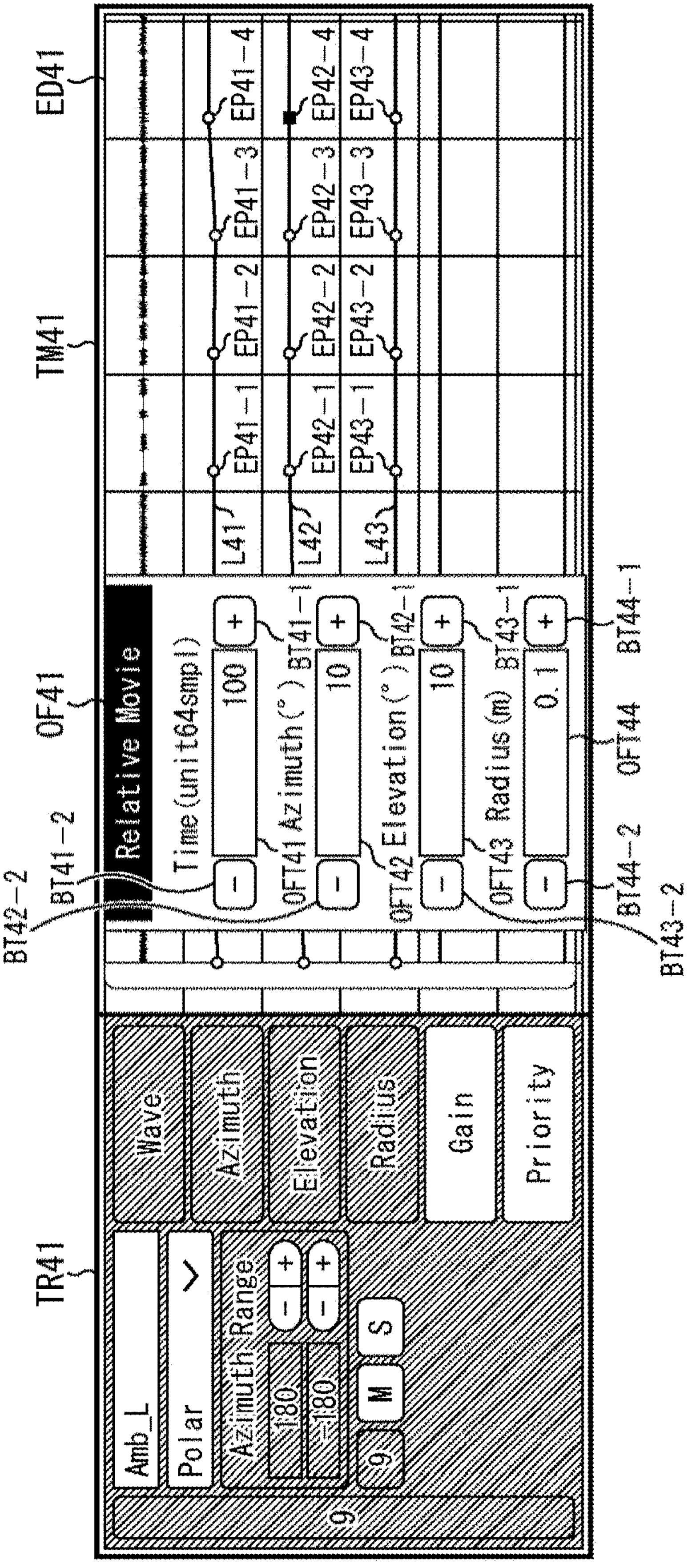
FIG. 17 is a view explaining a change in object position information in units of offset amount.

When the object position information is changed in this manner, the display control unit 42 controls the display unit 24 to update the display of the edit screen ED41. That is, as shown in FIG. 17, the display control unit 42 updates the display of the edit screen ED41 so that the edit points EP41 to EP43 move rightward in the figure as compared with the case shown in FIG. 16.

By making it possible to collectively change the plurality of edit points included in the change range by the offset amount as described above, edit can be performed more easily and efficiently than in a case where the plurality of pieces of object position information at different time points are edited one by one.

It is to be noted that in a case where the object position information at a plurality of time points of one object is changed collectively by the offset amount, when there is another object belonging to the same group as that of the object, the object position information at a plurality of time points of the other object is also changed.

For example, it is assumed that the object "Amb_L" and the object "Amb_R" belong to the same group, and the change of the object position information of a time point A1 and a time point A2 of the object "Amb_L" has been instructed by an operation to the offset screen OF41.

In this case, the position determination unit 41 changes the object position information of the time point A1 and the time point A2 of the object "Amb_L" and the object "Amb_R" in units of offset amount while maintaining the relative positional relationship between the object "Amb_L" and the object "Amb_R".

<Explanation of Offset Movement Processing>

Figure 18:
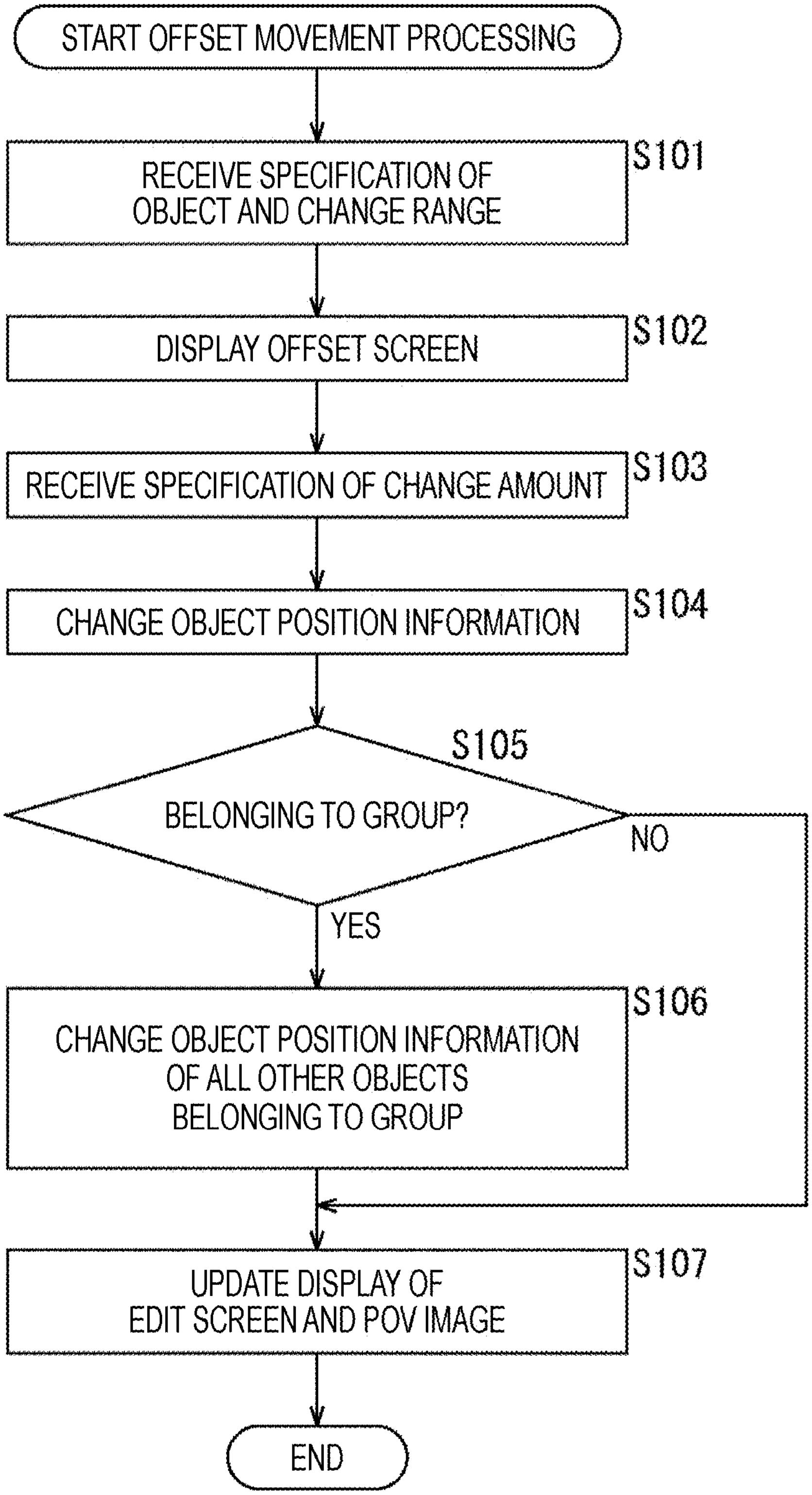
FIG. 18 is a flowchart explaining offset movement processing.

Next, the operation of the information processing apparatus 11 when the object position information at a plurality of different time points is collectively and simultaneously changed by the operation to the offset screen described above will be described. That is, the offset movement processing by the information processing apparatus 11 will be described below with reference to the flowchart of FIG. 18.

In step S101, the control unit 23 receives the object of the change target of the object position information and the specification of the change range of the object.

For example, the user operates the input unit 21 to directly specify one or more edit points displayed in the timeline area of the edit screen, or to specify an area including one or more edit points, thereby specifying a change range. On the basis of the signal supplied from the input unit 21, the control unit 23 specifies the object specified as the change target and the change range specified for the object, i.e., the selection edit point for simultaneously changing the coordinate value.

In step S102, the display control unit 42 controls the display unit 24 to cause the offset screen to be superimposed and displayed on the timeline area of the edit screen displayed on the display unit 24. Due to this, the offset screen OF41 shown in FIG. 16, for example, is displayed.

In step S103, the control unit 23 receives a change operation of the position of the selection edit point by an operation on the offset screen, i.e., an input of a change amount of the coordinate value.

When the offset screen is displayed, the user operates the input unit 21 to input a change amount for changing the selection edit point in units of offset amount. For example, in the example shown in FIG. 16, the user instruct the change of the coordinate value by operating the button BT41, the button BT42, the button BT43, and the button BT44.

In step S104, on the basis of the signal supplied from the input unit 21, the position determination unit 41 simultaneously changes, in units of offset amount, the value of the selection edit point included in the change range of the specified object, i.e., the object position information. In step S104, the object position information at each of one or more time points is changed simultaneously by the change amount specified by the user in units of offset amount.

For example, in the state shown in FIG. 15, in a case where the button BT43-1 shown in FIG. 16 is operated only once by the user, the position determination unit 41 increases, by 10 degrees, the vertical angle constituting the object position information at the time point corresponding to the selection edit point.

In step S105, the control unit 23 determines whether or not the object of the change target belongs to the group on the basis of the object of the change target in the object position information and the group information recorded in the recording unit 22. In other words, it is determined whether or not there is another object belonging to the same group as that of the object of the change target.

In a case where it is determined in step S105 that no object belongs to the group, i.e., there is no other object belonging to the same group, the processing proceeds to step S107.

On the other hand, in a case where it is determined in step S105 that the object belongs to the group, i.e., there is another object belonging to the same group, the processing proceeds to step S106.

In step S106, the position determination unit 41 changes the object position information of all other objects belonging to the same group as that of the object of the change target. At this time, the position determination unit 41 changes the object position information of the other objects in units of offset amount in accordance with the change of the object position information of the object of the change target so that the relative positional relationship of all the objects belonging to the group in the reproduction space is maintained. It is to be noted that in a case where the object of the change target is an object of an L/R pair, the object position information of the other object to be in the L/R pair with respect to the object of the change target is changed so that the two objects to be in the L/R pair are symmetrical with respect to the reference plane.

After the object position information of the other object is changed, the processing proceeds to step S107.

After it is determined in step S105 that the object does not belong to the group, or the processing of step S106 is performed, the processing of step S107 is performed and the offset movement processing ends. It is to be noted that the processing of step S107 is similar to the processing of step S44 in FIG. 8, and hence the description thereof will be omitted.

As described above, the information processing apparatus 11 simultaneously changes, in units of offset amount, the object position information corresponding to one or more edit points included in the change range. By doing so, the number of user operations can be reduced as compared with the case where the position of the edit point, i.e., the coordinate value, is changed one by one, and the edit can be performed more efficiently and easily.

<Regarding Interpolation Processing of Object Position Information>

By the way, the information processing apparatus 11 holds object position information, i.e., meta information for the time point at which the edit point exists basically, and does not hold meta information for the time point at which the edit point does not exist.

However, at the time of rendering audio content, object position information for all time points is required. Therefore, in the information processing apparatus 11, object position information at a time point at which an edit point does not exist is obtained by interpolation processing at the time of rendering the audio content or at the time of outputting the audio content.

Figure 19:
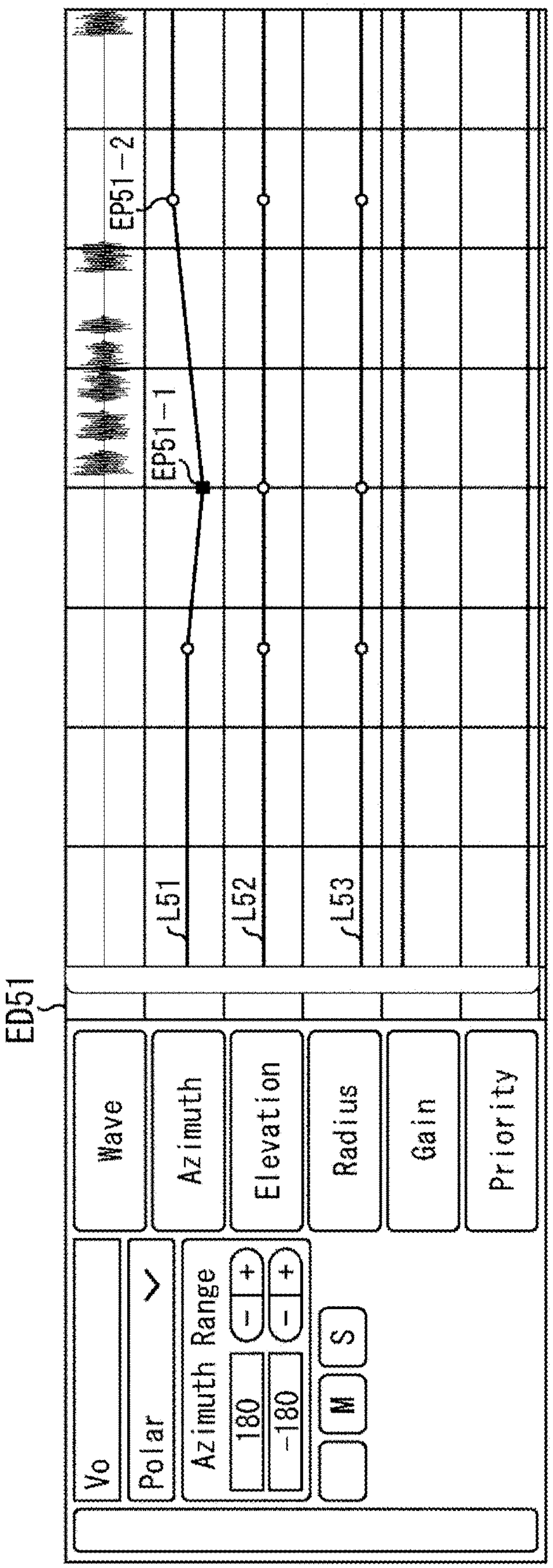
FIG. 19 is a view explaining interpolation processing of object position information.

For example, as shown in FIG. 19, it is common to select two adjacent edit points and obtain the coordinate value at each time point between those edit points by linear interpolation.

In FIG. 19, an edit screen ED51 displays polygonal lines L51 to L53 representing the horizontal angle, the vertical angle, and the radius constituting the object position information of time series for the track of the object whose object name is "Vo".

Focusing on the horizontal angle of time series indicated by the polygonal line L51 for example, the horizontal angle (object position information) at a time point at which an edit point EP51-1 exists and the horizontal angle at a time point at which an edit point EP51-2 exists adjacent to the edit point EP51-1 are held by the information processing apparatus 11.

On the other hand, the horizontal angle of a time point existing between those edit points EP51-1 and EP51-2 are not held, and hence the horizontal angles of those time points are obtained by linear interpolation based on the coordinate values of those time points at the edit point EP51-1 and the coordinate values of those time points at the edit point EP51-2. It is to be noted that the edit points EP51-1 and EP51-2 will hereinafter be also referred to simply as the edit point EP51 in a case where it is not necessary to distinguish them from each other.

It is assumed that in a case where linear interpolation is performed, the horizontal angle of the object changes at a constant speed between the two edit points EP51, i.e., the object moves in the horizontal angle direction at a constant angular speed. In other words, a linear change of the horizontal angle indicates that the object is moving in the horizontal angle direction at a constant angular speed.

However, since the object does not always move at a constant angular speed, it is convenient to be able to select a method of interpolation processing (interpolation method) of the object position information from among a plurality of interpolation methods in accordance with the movement pattern of the object.

Therefore, in the information processing apparatus 11, it is possible to select an interpolation method for each section between edit points adjacent to each other for each component constituting the object position information.

Figure 20:
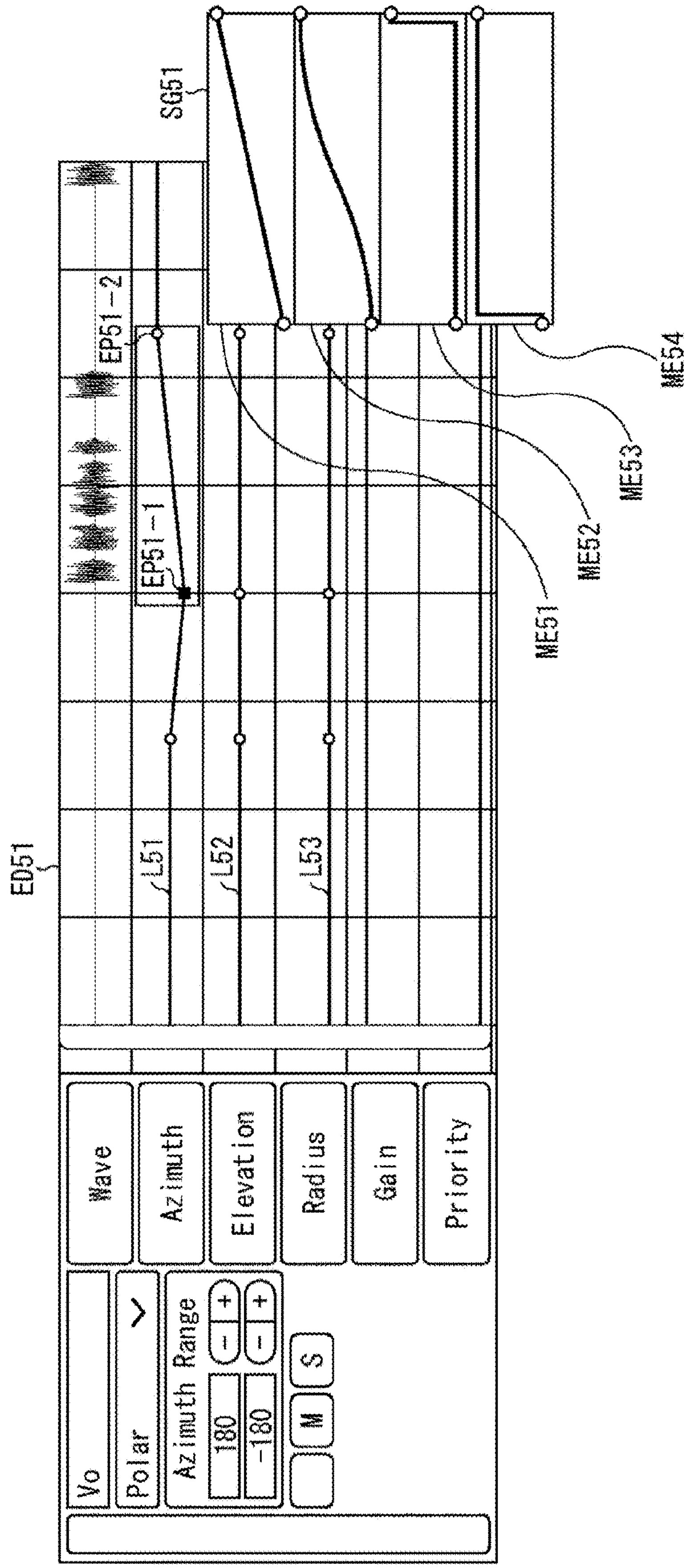
FIG. 20 is a view explaining interpolation processing of object position information.

Specifically, for example, as shown in FIG. 20, the user can display an interpolation method selection screen SG51 by operating the input unit 21 to select a section between two edit points adjacent to each other in the timeline area of the edit screen ED51.

It is to be noted that in FIG. 20, parts corresponding to those in FIG. 19 are given the same reference numerals, and description thereof will be omitted as appropriate. The operation for displaying the interpolation method selection screen SG51 may be any operation such as a click operation.

In the example of FIG. 20, a section between the edit points EP51-1 and EP51-2 is specified, and in the interpolation method selection screen SG51, it is possible to select the interpolation method of the horizontal angle in the section.

Specifically, the interpolation method selection screen SG51 is provided with menu items ME51 to ME54 to be operated when each of four different interpolation methods is specified as an interpolation method, and the user specifies the interpolation method by specifying any of these menu items.

For example, the menu item ME51 indicates linear interpolation, and the menu item ME52 indicates cosine interpolation, which is interpolation using a cosine function.

In addition, the menu item ME53 indicates an interpolation method that realizes a rectangular coordinate value change in which the same coordinate value continues from the start to immediately before the end of the section of the interpolation target and the coordinate value rapidly changes immediately before the end of the section. The menu item ME54 indicates an interpolation method that realizes a rectangular coordinate value change in which the coordinate value rapidly changes immediately after the start of the section of the interpolation target and thereafter the same coordinate value continues until the end of the section.

In each menu item, a straight line, a curved line, or a polygonal line representing a change in coordinate value when interpolation processing is performed by an interpolation method corresponding to the menu item is drawn, and the user can intuitively grasp the interpolation method only by viewing the menu item. For example, a cosine curve is drawn in the menu item ME52 indicating cosine interpolation, and the user can intuitively grasp that the interpolation method is cosine interpolation.

It is to be noted that the method of interpolation processing (interpolation method) is not limited to the method described with reference to FIG. 20, and may be any other method such as an interpolation method using another quadratic function or the like.

In addition, as shown in FIG. 20, when the user selects (specifies) the menu item ME52 by operating the input unit 21 in a state where a section between the edit points EP51-1 and EP51-2 is specified, the position determination unit 41 performs cosine interpolation in accordance with the signal supplied from the input unit 21.

That is, on the basis of the horizontal angle indicated by the edit point EP51-1 and the horizontal angle indicated by the edit point EP51-2, the position determination unit 41 obtains the horizontal angle at each time point between those edit points EP51-1 and EP51-2 by cosine interpolation using a cosine function. It is to be noted that although an example in which cosine interpolation is performed only for the horizontal angle of the object position information has been described, cosine interpolation may be performed for the vertical angle and the radius simultaneously with the horizontal angle in a section where cosine interpolation is performed. That is, in a case where one interpolation method such as cosine interpolation is specified for one section, interpolation may be performed by the specified interpolation method for the horizontal angle, the vertical angle, and the radius of the object position information in the section.

Figure 21:
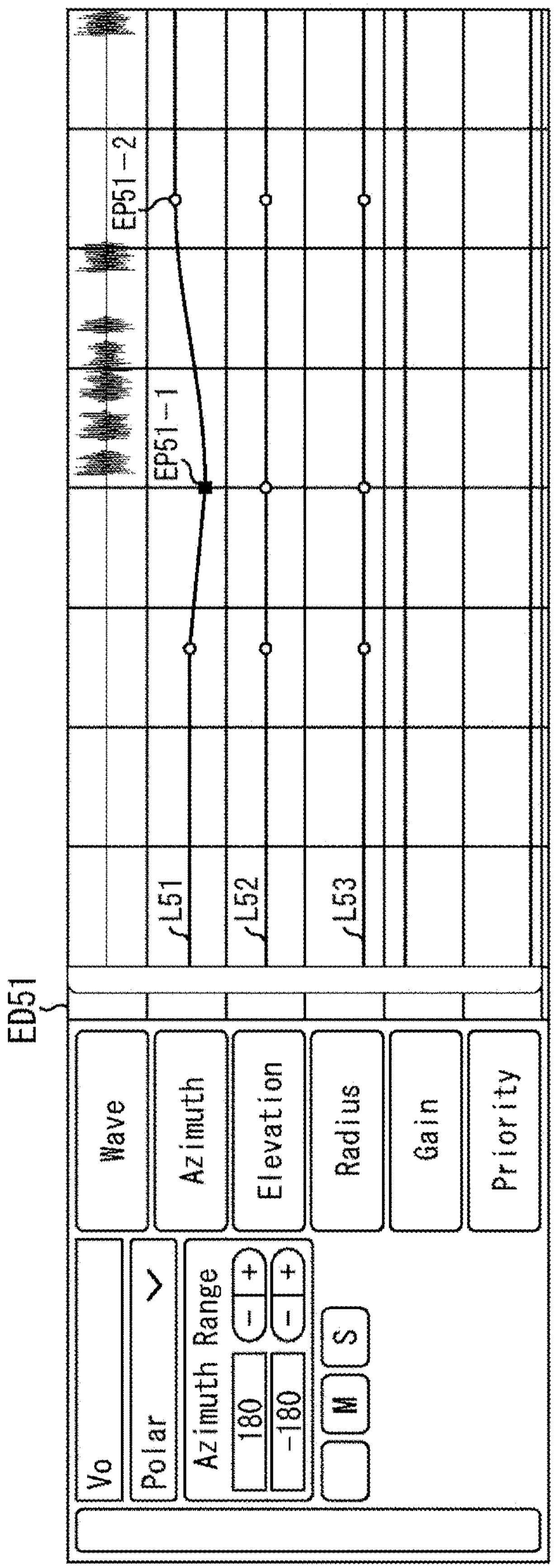
FIG. 21 is a view explaining interpolation processing of object position information.

When cosine interpolation is performed as the interpolation processing as described above, the display of the edit screen ED51 is updated as shown in FIG. 21, for example. It is to be noted that in FIG. 21, parts corresponding to those in FIG. 19 are given the same reference numerals, and description thereof will be omitted as appropriate.

In the example shown in FIG. 21, the section between the edit point EP51-1 and the edit point EP51-2 where the cosine interpolation has been performed is not drawn as a straight line but as a cosine curve.

It is to be noted that in a case where no particular interpolation method is specified, the coordinate value between edit points can be interpolated by an interpolation method defined by the initial setting, e.g., linear interpolation or the like.

In addition, in this case, in a section where another interpolation method different from the initial setting has been selected, a line (straight line, curved line, and polygonal line) connecting two adjacent edit points may be displayed in a color different from that of the line in the section where the linear interpolation defined by the initial setting has been performed. Other than that, a line connecting edit points may be displayed in a different color for each selected interpolation method. By doing so, the user can instantly discriminate which interpolation method has been specified and the like.

<Explanation of Interpolation Method Selection Processing>

Figure 22:
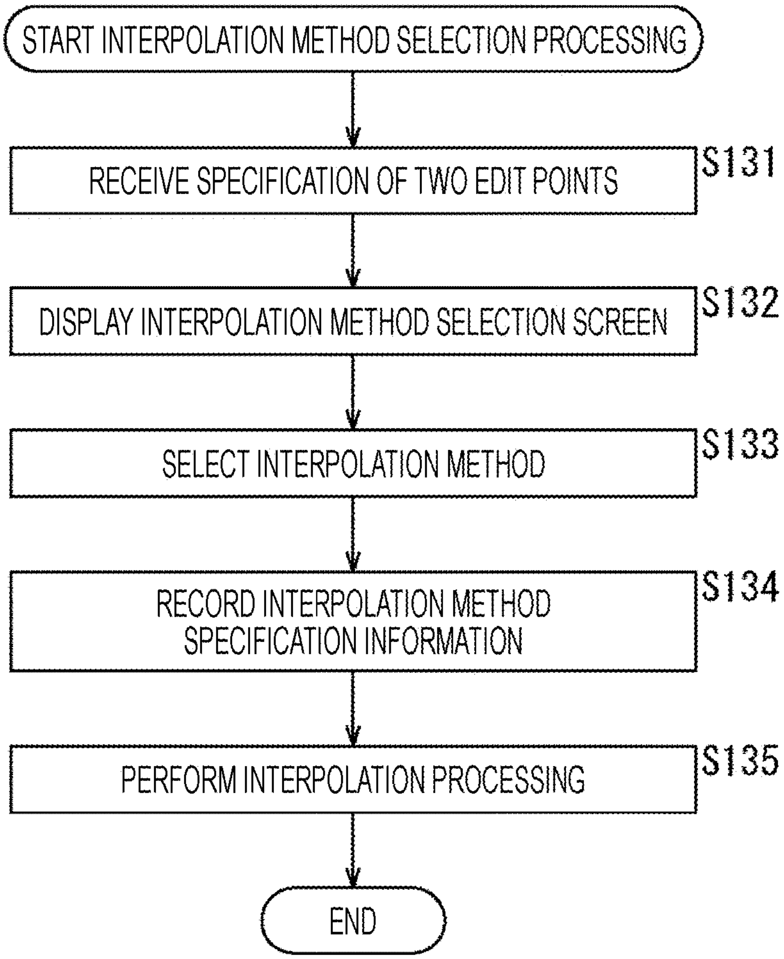
FIG. 22 is a flowchart explaining interpolation method selection processing.

Subsequently, the operation of the information processing apparatus 11 when the user selects the interpolation method for the section between edit points will be described. That is, the interpolation method selection processing performed by the information processing apparatus 11 will be described below with reference to the flowchart of FIG. 22. It is to be noted that when this interpolation method selection processing is started, the edit screen is displayed on the display unit 24.

In step S131, the control unit 23 receives specification of two edit points displayed on the timeline area of the edit screen.

For example, in a case of selecting an interpolation method for a desired section, the user specifies the section of the selection target of the interpolation method by operating the input unit 21 to specify two edit points. On the basis of the signal supplied from the input unit 21 in response to the user operation, the control unit 23 specifies edit points to be a start position and an end position of the section of the selection target of the interpolation method.

In step S132, the display control unit 42 controls the display unit 24 to cause the display unit 24 to superimpose and display the interpolation method selection screen on the timeline area of the edit screen. Thus the interpolation method selection screen SG51 shown in FIG. 20, for example, is displayed.

When the interpolation method selection screen is displayed, the user specifies the interpolation method by operating the input unit 21 to select (specify) a desired menu item on the interpolation method selection screen.

In step S133, on the basis of the signal supplied from the input unit 21 in response to the user operation, the control unit 23 selects the interpolation method for the section between the two edit points specified in step S131, and generates interpolation method specification information indicating the selection result. The control unit 23 supplies to the recording unit 22 the interpolation method specification information thus generated.

In step S134, the recording unit 22 records the interpolation method specification information supplied from the control unit 23 as a part of data of audio content.

In addition, when the interpolation method specification information is generated, the display control unit 42 controls the display unit 24 to update the display of the edit screen. Due to this, as shown in FIG. 21, for example, a line in the section of the processing target, i.e., a line connecting two edit points, is displayed in a shape and color corresponding to the interpolation method indicated by the interpolation method specification information.

In addition, interpolation processing of the object position information, more specifically, each component of the horizontal angle, the vertical angle, and the radius constituting the object position information, is performed at an appropriate timing such as at the time of rendering the audio content.

That is, in step S135, the position determination unit 41 performs interpolation processing for each time point at which the object position information is not held, and generates object position information for all the objects.

At this time, on the basis of the held object position information at the other time point, the position determination unit 41 performs interpolation processing for each component of the object position information by the interpolation method indicated by the interpolation method specification information recorded in the recording unit 22.

When the object position information at each time point is obtained by the interpolation processing, the interpolation method selection processing ends. Thereafter, as appropriate, the data of the audio content are output, and rendering is performed on the basis of the data of the audio content.

As described above, the information processing apparatus 11 generates and records the interpolation method specification information indicating the interpolation method specified for each section for each component constituting the object position information. Then, the information processing apparatus 11 performs interpolation processing by the interpolation method indicated by the interpolation method specification information to obtain the object position information at each time point. By doing this, the movement (motion) of the object can be expressed more accurately. That is, the degree of freedom in the expression of the movement of the object can be increased, and various sound image expressions become possible.

<Regarding Display in Track Color>

By the way, in the example shown in FIG. 5, it has been explained that the track area of the edit screen ED21 is provided with the track color display area of each track.

A track color number is displayed in the track color display area, and each track color display area is displayed in a track color defined in advance for the track color number.

In addition, as described above, in the information processing apparatus 11, it is possible to select whether the object ball on the POV image is displayed in the group color or the track color.

For example, in a case of setting where the object ball on the POV image is displayed in the track color, the display control unit 42 controls the display by the display unit 24 so that the object ball is displayed in the track color at the timing of updating the display of the POV image, such as step S13 in FIG. 4 and step S44 in FIG. 8.

If the track color can be individually specified for the object, i.e., the track in this manner, the user can easily discriminate each track by viewing the track color. In particular, even in a case where the number of objects constituting the audio content is large, the user can easily discriminate which object ball corresponds to which track.

In addition, in FIG. 5, an example in which a track color display area and a group display area are displayed in each track area has been explained. However, in a case of setting where the object ball is displayed in the track color, the track color display area may be displayed in the track area, meanwhile the group display area may not be displayed.

Figure 23:
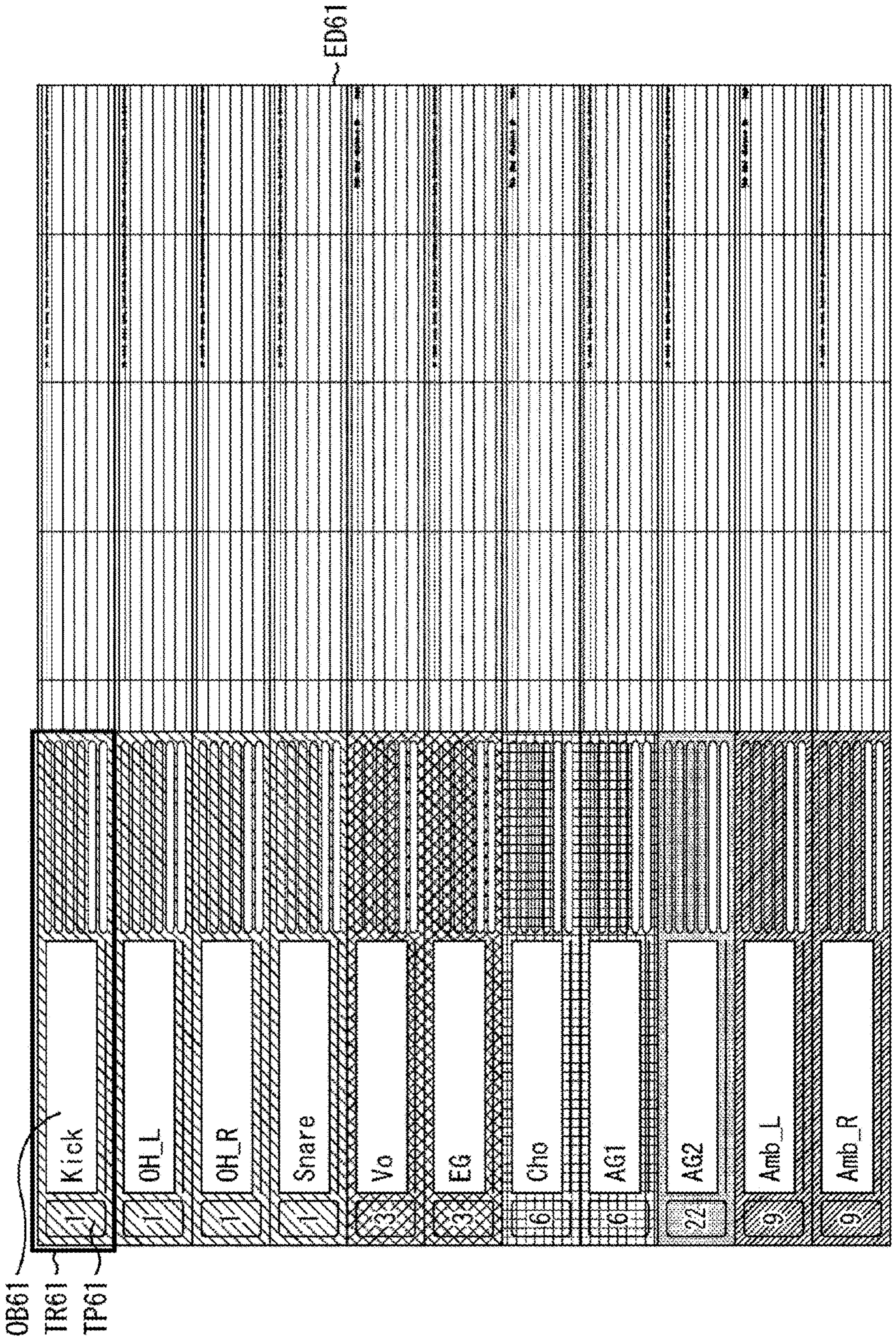
FIG. 23 is a view showing an example of an edit screen.

In such a case, an edit screen ED61 shown in FIG. 23, for example, is displayed on the display unit 24.

In the example shown in FIG. 23, a track area of 11 tracks and a timeline area of those tracks are displayed on the edit screen ED61.

In particular, the track area and the timeline area of each of the 11 objects whose object names are "Kick", "OH_L", "OH_R", "Snare", "Vo", "EG", "Cho", "AG1", "AG2", "Amb_L", and "Amb_R" are displayed.

The track area of each object is provided with a track color display area, and a track color number is displayed in the track color display area. In addition, each track color display area is displayed in a track color defined in advance for the track color number.

Specifically, for example, an area TR61 is a track area of the track of the object "Kick". Then, an area OB61, which is an object name display area, and a track color display area TP61 are provided in the area TR61. The object name "Kick" is displayed in the area OB61, and the track color number "1" is displayed in the track color display area TP61. Then, the entire area TR61 including the track color display area TP61 is displayed in the track color defined for the track color number "1".

In FIG. 23, the track color number "1" is specified for the four objects, more specifically, the tracks of the four objects constituting the drum whose object names are "Kick", "OH_L", "OH_R", and "Snare". In addition, the track color number "3" is specified for the object "Vo", which corresponds to the vocal by the electric guitar player, and the object "EG" of the electric guitar.

The track color number "6" is specified for the object "Cho", which corresponds to the chorus by the acoustic guitar player, and the object "AG1" of the acoustic guitar.

Similarly, the track color number "22" is specified for the object "AG2" of the other acoustic guitar. Furthermore, the track color number "9" is specified for the object "Amb_L" and the object "Amb_R", which correspond to the ambience.

Figure 24:
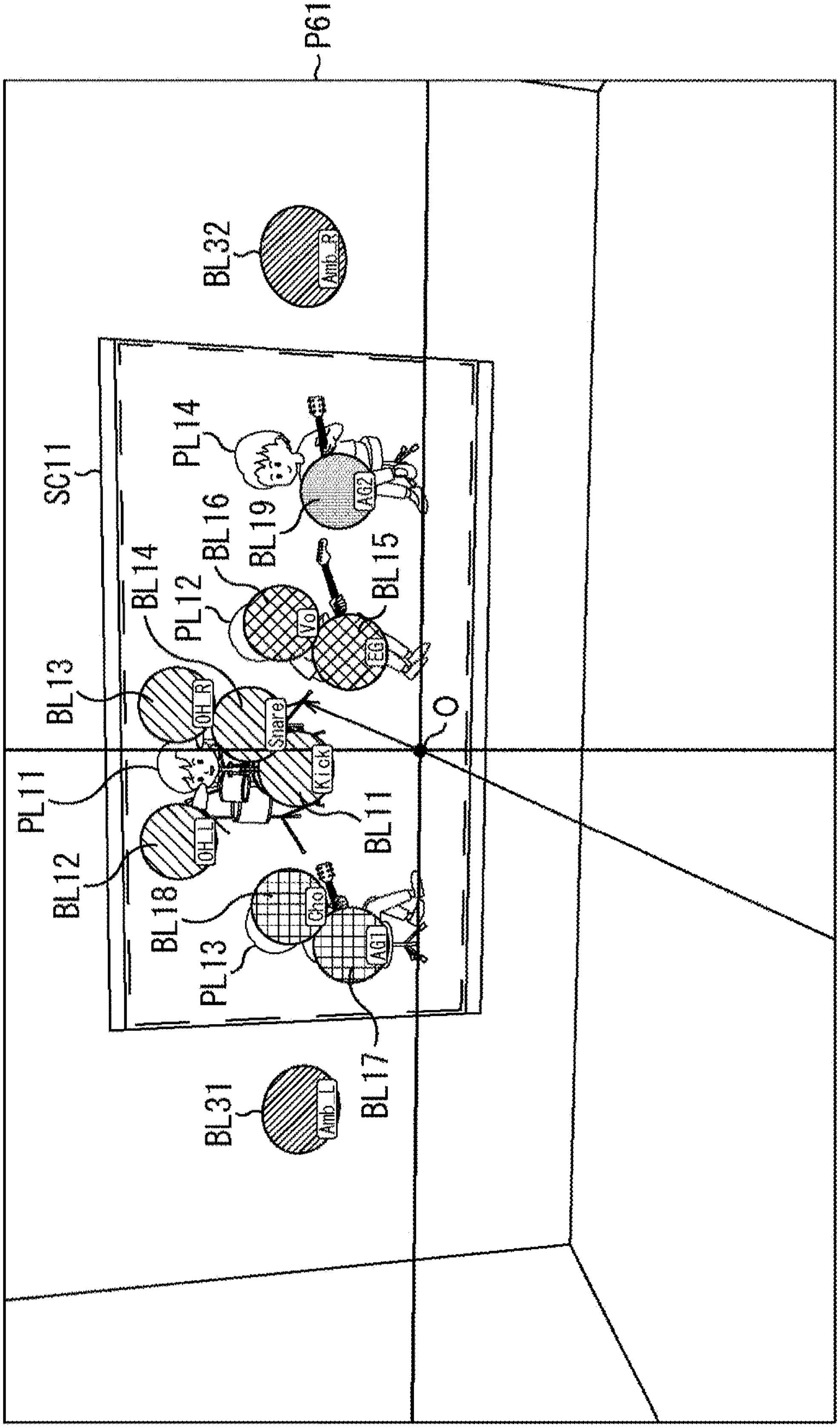
FIG. 24 is a view showing an example of a POV image.

In a case where the edit screen ED61 as shown in FIG. 23 is displayed, the POV image P61 shown in FIG. 24, for example, is displayed on the display unit 24. It is to be noted that in FIG. 24, parts corresponding to those in FIG. 3 or 10 are given the same reference numerals, and description thereof will be omitted as appropriate.

In FIG. 24, the object balls BL11 to BL14 of the respective objects constituting the drum whose object names are "Kick", "OH_L", "OH_R", and "Snare" are displayed with the track color "blue", which corresponds to the track color number "1".

In addition, the object ball BL15 of the object "EG" and the object ball BL16 of the object "Vo" are displayed in the track color "orange", which corresponds to the track color number "3".

The object ball BL17 of the object "AG1" and the object ball BL18 of the object "Cho" are displayed in the track color "green", which corresponds to the track color number "6", and the object ball BL19 of the object "AG2" is displayed in the track color "navy blue", which corresponds to the track color number "22".

Furthermore, the object ball BL31 of the object "Amb_L" and the object ball BL32 of the object "Amb_R" are displayed in the track color "purple", which corresponds to the track color number "9".

In a case of displaying the POV image P61, on the basis of the track color number specified (selected) for the track of each object, the display control unit 42 displays the object ball of each object in the track color defined for the track color number.

By displaying the object ball of each object in the track color in this manner, it is possible to easily discriminate which object ball corresponds to which object (track) even in a case where the number of objects is large.

It is to be noted that although an example in which the object ball is displayed in the group color or the track color has been explained above, the object ball may be displayed in the group color and the track color.

In such a case, for example, the display control unit 42 causes the center part of the object ball to be displayed in the track color, and causes the remaining part, i.e., the part outside the part of the object ball displayed in the track color, to be displayed in the group color. This allows the user to instantly discriminate which track the object corresponds to each object ball is of, and which group the object belongs to.

Other than that, the object ball may be displayed not only in a color such as the group color or the track color but also in a display format defined for information for identifying a track corresponding to a group or track color number or a combination thereof. Specifically, for example, the object ball may be displayed in a shape defined for the group.

<Regarding Mute Setting and Solo Setting>

In addition, as shown in FIG. 5, the edit screen is provided with the mute button for performing mute setting and the solo button for performing solo setting.

The mute setting is to mute the sound of the specified object, i.e., not to reproduce (output) the sound of the object when the audio content is reproduced at the time of editing the audio content. Hereinafter, in particular, specification as an object to be muted is also referred to as turning on the mute setting, and the state in which the mute setting is turned on is also referred to as a mute state.

In the information processing apparatus 11, the object ball of the object in the mute state is hidden on the POV image. That is, the mute setting for the object is reflected also on the object ball on the POV image. It is to be noted that at the time of outputting the data of the audio content, the object data of the object in the mute state may not be included in the data of the audio content.

On the other hand, the solo setting is to reproduce (output) only the sound of the specified object and to mute the sound of the other objects when the audio content is reproduced at the time of editing the audio content. Hereinafter, in particular, specification as an object for reproducing the sound is also referred to as turning on the solo setting, and the state in which the solo setting is turned on is also referred to as a solo state.

In the information processing apparatus 11, the object ball of the object in the solo state is displayed on the POV image, and the other objects not in the solo state are hidden. That is, the solo setting for the object is reflected also on the object ball on the POV image. It is to be noted that at the time of outputting the data of the audio content, only the object data of the object in the solo state may be included in the data of the audio content.

In addition, when one of the mute setting and the solo setting is performed, the other setting is invalidated. That is, for example, when the mute setting is performed, the solo setting is canceled, and conversely, when the solo setting is performed, the mute setting is canceled.

Usability can be improved by performing the mute setting and the solo setting in this manner, hiding the object ball of the muted object in which the sound is not reproduced, and causing only the object ball of the object in which the sound is reproduced to be displayed on the POV image.

That is, the muted object should be an object to which the user is not currently paying attention, and the unmuted object should be the object to which the user is paying attention.

Therefore, by displaying only the object ball of the unmuted object on the POV image, the user can easily grasp the transition of the position of the object to which the user is paying attention, for example. This can improve the usability of the content production tool.

A specific example of the mute setting and the solo setting will be described here with reference to FIGS. 25 to 27. It is to be noted that in FIGS. 25 to 27, parts corresponding to those in FIG. 5 or 24 are given the same reference numerals, and description thereof will be omitted as appropriate. In addition, it is to be noted that in FIGS. 25 to 27, parts corresponding to each other are given the same reference numerals, and description thereof will be omitted as appropriate.

Figure 25:
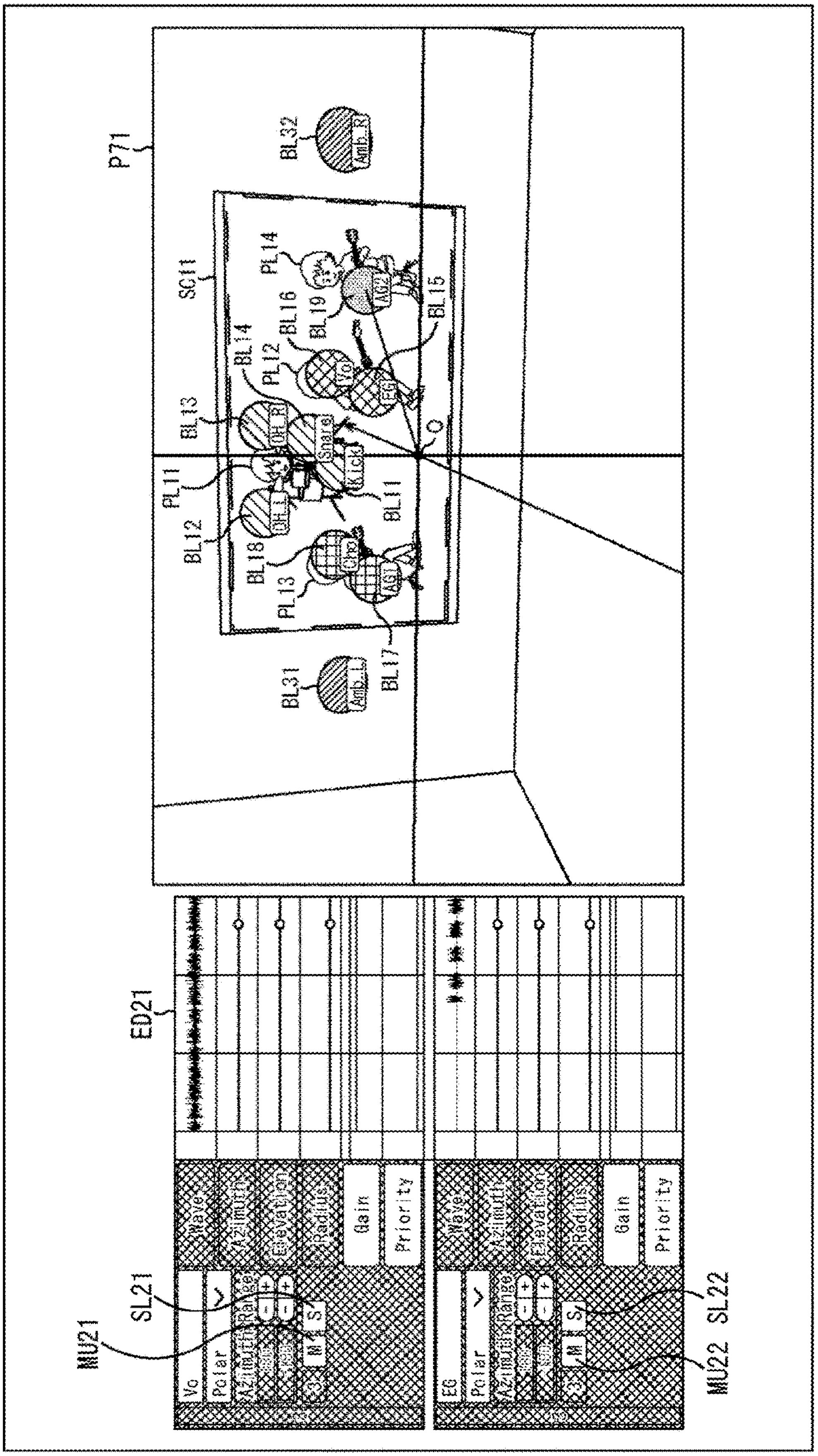
FIG. 25 is a view explaining mute setting and solo setting.

For example, in a state where neither solo setting nor mute setting has been performed, the object balls corresponding to all the tracks are displayed on a POV image P71 as shown in FIG. 25. It is to be noted that in FIG. 25, only a part of the edit screen ED21 is displayed.

In the example shown in FIG. 25, the mute buttons for tracks of all the objects, including the mute button MU21 for the track of the object "Vo" and a mute button MU22 for the track of the object "EG", are in a state of not being operated. That is, none of the objects is in the mute state.

At the same time, the solo buttons for the tracks of all the objects, including the solo button SL21 for the track of the object "Vo" and a solo button SL22 for the track of the object "EG", are in a state of not being operated. That is, the setting of the solo state has been performed for none of the objects.

In such a state, the object balls of all the objects are displayed in the POV image P71.

Here, the object balls BL11 to BL19, the object ball BL31, and the object ball BL32 of the respective objects whose object names are "Kick", "OH_L", "OH_R", "Snare", "EG", "Vo", "AG1", "Cho", "AG2", "Amb_L", and "Amb_R" are displayed in the POV image P71.

In such a state, it is assumed that the mute setting of the object "Vo" and the object "EG" has been turned on by the user operating the input unit 21 to operate the mute button MU21 and the mute button MU22 on the edit screen ED21 by clicking or the like. That is, it is assumed that the object "Vo" and the object "EG" are brought into the mute state.

Figure 26:
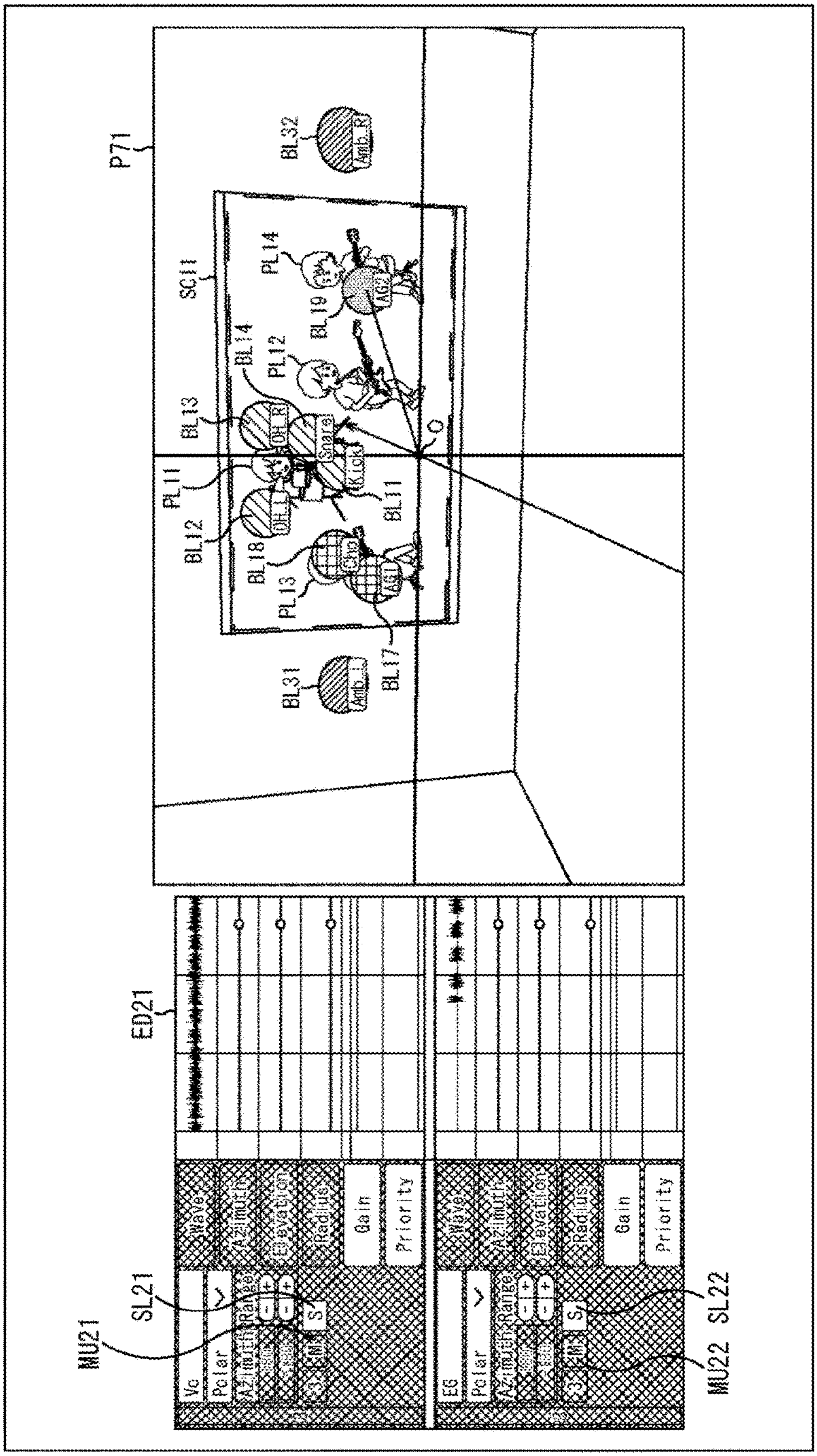
FIG. 26 is a view explaining mute setting and solo setting.

Then, as shown in FIG. 26, for example, the operated mute button MU21 and mute button MU22 are displayed on the edit screen ED21 in a color different from that before the operation.

For example, when the mute setting is performed, the mute button of the object for which the mute setting is not turned on is displayed in the same color as that before the mute setting is performed, and the mute button of the object for which the mute setting is turned on is displayed in a different color from that before the mute setting is performed.

In the example of FIG. 26, the mute settings of the object "Vo" and the object "EG" is turned on, and the mute setting of the other objects is not turned on. Therefore, the display control unit 42 controls the display unit 24 to update the display of the POV image P71 so that the POV image P71 shown on the right side of FIG. 26 is displayed on the display unit 24.

That is, in the example of FIG. 26, the object ball BL15 of the object "EG" and the object ball BL16 of the object "Vo", which have been displayed so far in the POV image P71 but are in the mute state, are in a state of not being displayed, i.e., hidden.

On the other hand, the object balls of the other objects not in the mute state, i.e., the object balls BL11 to BL14, the object balls BL17 to BL19, the object ball BL31, and the object ball BL32 remain displayed in the POV image P71.

In addition, in the state shown in FIG. 25, for example, it is assumed that the solo setting of the object "Vo" and the object "EG" has been turned on by the user operating the input unit 21 to operate the solo button SL21 and the solo button SL22 on the edit screen ED21 by clicking or the like. That is, it is assumed that the object "Vo" and the object "EG" are brought into the solo state.

Figure 27:
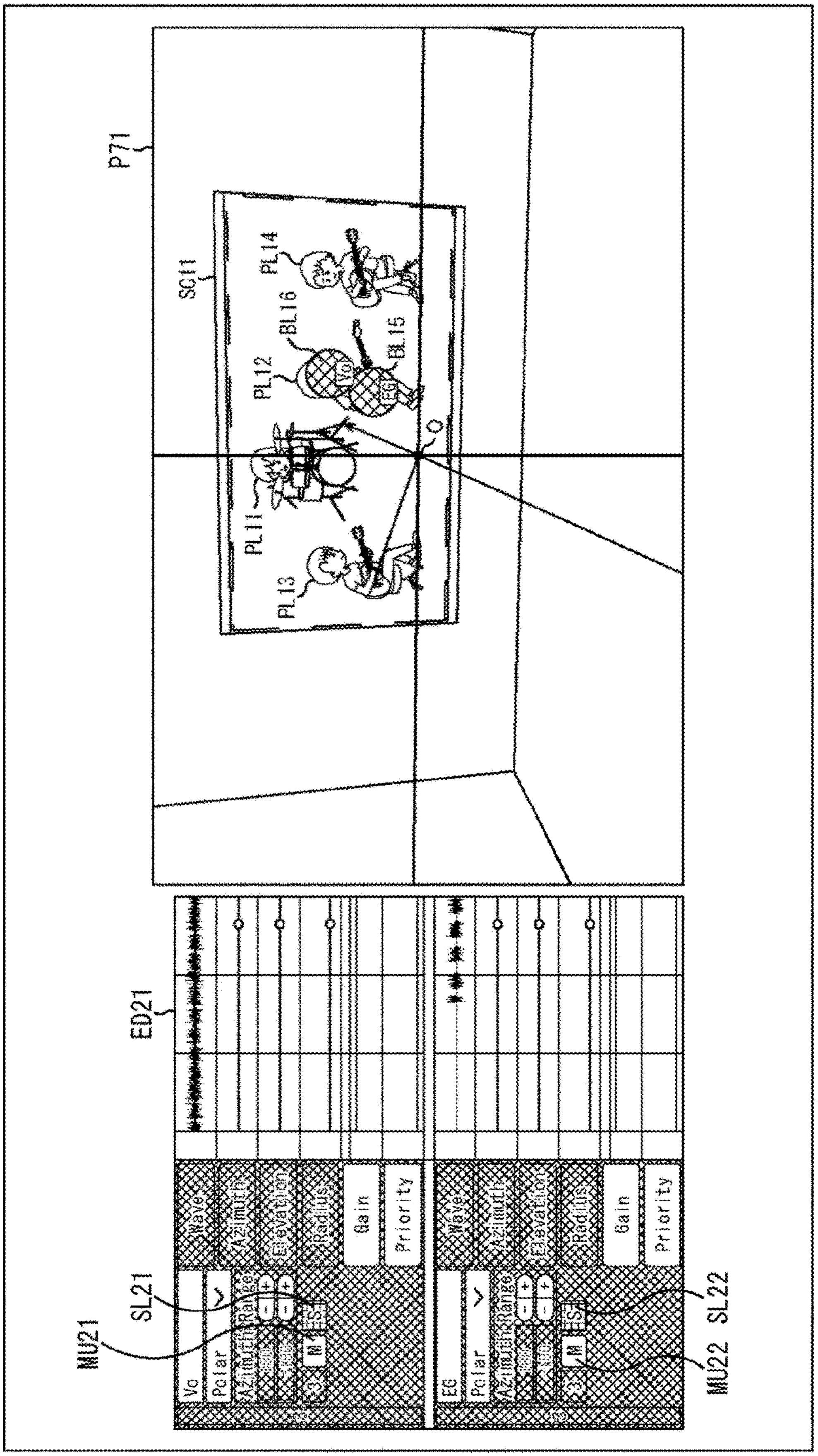
FIG. 27 is a view explaining mute setting and solo setting.

Then, as shown in FIG. 27, for example, the operated solo button SL21 and solo button SL22 are displayed on the edit screen ED21 in a color different from that before the operation.

For example, when the solo setting is performed, the solo button of the object for which the solo setting is not turned on is displayed in the same color as that before the solo setting is performed, and the mute button of the object for which the solo setting is turned on is displayed in a different color from that before the solo setting is performed.

In the example of FIG. 27, the solo settings of the object "Vo" and the object "EG" is turned on, and the solo setting of the other objects is not turned on. Therefore, the display control unit 42 controls the display unit 24 to update the display of the POV image P71 so that the POV image P71 shown on the right side of FIG. 27 is displayed on the display unit 24.

That is, in the example of FIG. 27, in the POV image P71, the solo setting is turned on, and only the object balls BL15 and BL16 corresponding to the objects "EG" and "Vo" in the solo state are displayed.

Therefore, the display of the object balls of other objects that have been displayed but are not in the solo state is erased and in a hidden state. That is, in the POV image P71 of FIG. 27, the object balls BL11 to BL14, the object balls BL17 to BL19, the object ball BL31, and the object ball BL32 are in a state of not being displayed.

By thus bringing the object ball on the POV image into the display state or the hidden state in conjunction with the mute setting and the solo setting, the user can visually and easily understand which object the track corresponding to is in the mute state or the solo state.

This can improve the usability.

<Explanation of Setting Processing>

Figure 28:
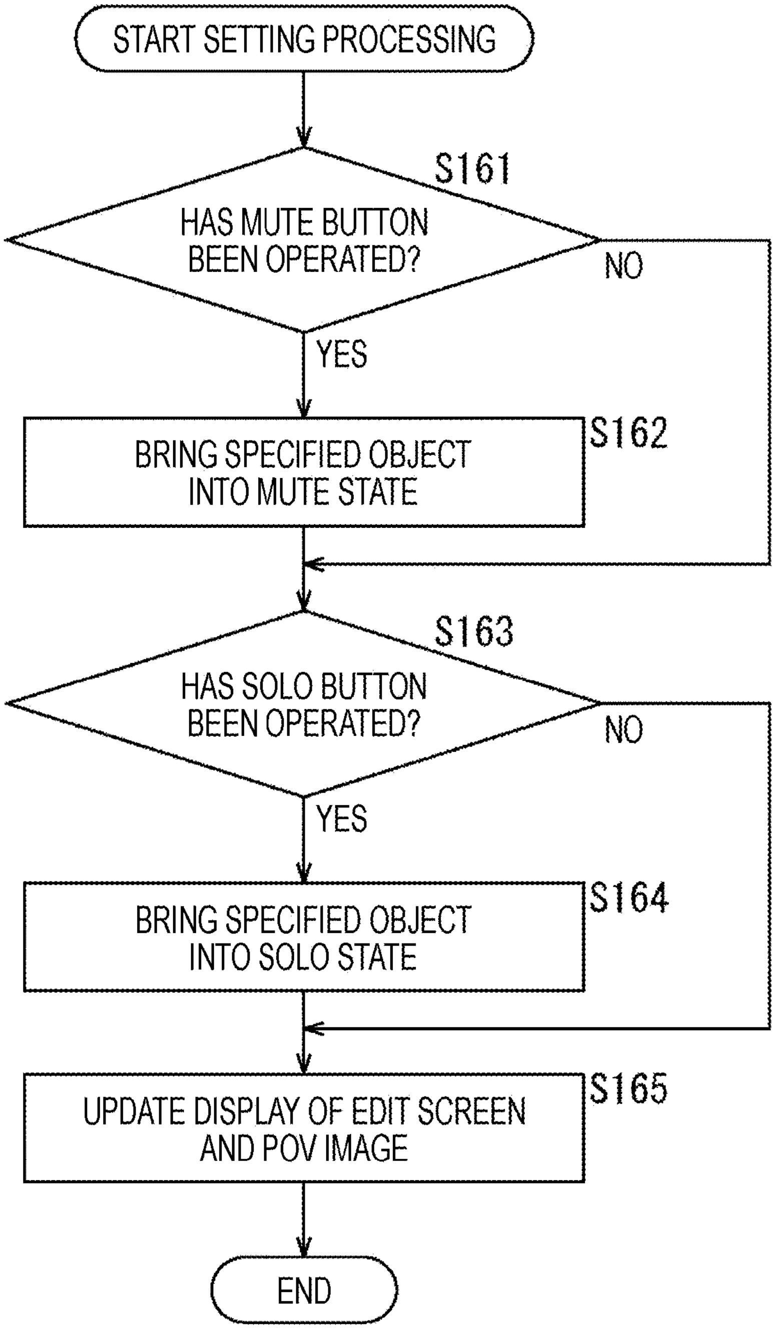
FIG. 28 is a flowchart explaining setting processing.

Next, the operation of the information processing apparatus 11 when the user performs mute setting or solo setting will be described. That is, the setting processing performed by the information processing apparatus 11 will be described below with reference to the flowchart of FIG. 28. It is to be noted that when this setting processing is started, the edit screen is displayed on the display unit 24.

In step S161, the control unit 23 determines whether or not the mute button on the edit screen has been operated, on the basis of the signal supplied from the input unit 21.

For example, in a case where an operation such as clicking has been operated for the mute button MU21 or the mute button MU22 shown in FIG. 25, the control unit 23 determines that the mute button has been operated.

In a case where it is determined in step S161 that the mute button has not been operated, the processing of step S162 is not performed, and then the processing proceeds to step S163.

On the other hand, in a case where it is determined in step S161 that the mute button has been operated, the control unit 23 in step S162 brings into the mute state the object (track) specified by the user operation on the mute button.

Specifically, in a case where the mute button MU21 is operated in a state where the object "Vo" is not in the mute state as shown in FIG. 25, for example, the control unit 23 brings the object "Vo" into the mute state. It is to be noted that in a case where the mute button MU21 is operated when the object "Vo" is in the mute state, for example, the control unit 23 cancels the mute state of the object "Vo".

After the mute setting in accordance with the operation on the mute button is performed in this manner, the processing proceeds to step S163.

When it is determined in step S161 that the mute button has not been operated, or when the processing of step S162 is performed, the processing of step S163 is performed.

In step S163, the control unit 23 determines whether or not the solo button on the edit screen has been operated, on the basis of the signal supplied from the input unit 21. For example, in a case where an operation such as clicking has been operated for the solo button SL21 or the solo button SL22 shown in FIG. 25, the control unit 23 determines that the solo button has been operated.

In a case where it is determined in step S163 that the solo button has not been operated, the processing of step S164 is not performed, and then the processing proceeds to step S165.

On the other hand, in a case where it is determined in step S163 that the solo button has been operated, the control unit 23 in step S164 brings into the solo state the object (track) specified by the user operation on the solo button.

Specifically, in a case where the solo button SL21 is operated in a state where the object "Vo" is not in the solo state as shown in FIG. 25 for example, the control unit 23 brings the object "Vo" into the solo state. It is to be noted that in a case where the solo button SL21 is operated when the object "Vo" is in the solo state, for example, the control unit 23 cancels the solo state of the object "Vo".

After the solo setting in accordance with the operation on the solo button is performed in this manner, the processing proceeds to step S165.

It is to be noted that in a case where the object to be in the mute state or the solo state belongs to the group, the control unit 23 may also bring all other objects belonging to the same group as that of the object into the mute state or the solo state. In this case, the control unit 23 specifies whether or not the object of the processing target belongs to the group by referring to the group information, and determines which of units of object and units of group to perform the mute setting or the solo setting in accordance with the specification result.

When it is determined in step S163 that the solo button has not been operated, or when the processing of step S164 is performed, in step S165, the display control unit 42 controls the display unit 24 in accordance with the mute setting or the solo setting by the control unit 23, and updates the display of the edit screen and the POV image.

Specifically, it is assumed that the object is brought into the mute state by the operation on the mute button, for example. In such a case, the display control unit 42 changes the display format of the mute button in the track area of the object in the mute state on the edit screen, and hides the object ball of the object in the mute state on the POV image.

When the mute setting or the solo setting is reflected on the display of the edit screen and the POV image in this manner, the setting processing ends.

As described above, the information processing apparatus 11 performs the mute setting and the solo setting in accordance with the operation on the mute button and the solo button, and reflects the setting content onto the display of the edit screen and the POV image. This allows the user to easily grasp which object (track) is in the mute state or the solo state, and allows the usability to be improved.

<Regarding Import of Track>

By the way, the information processing apparatus 11 can import (take in) a file of any audio signal, i.e., any audio file as object data or channel audio data constituting audio content.

For example, the audio file of the import target may be an audio file recorded in the recording unit 22, an audio file received by the communication unit 25, an audio file read from an external removable recording medium, or the like.

Figure 29:
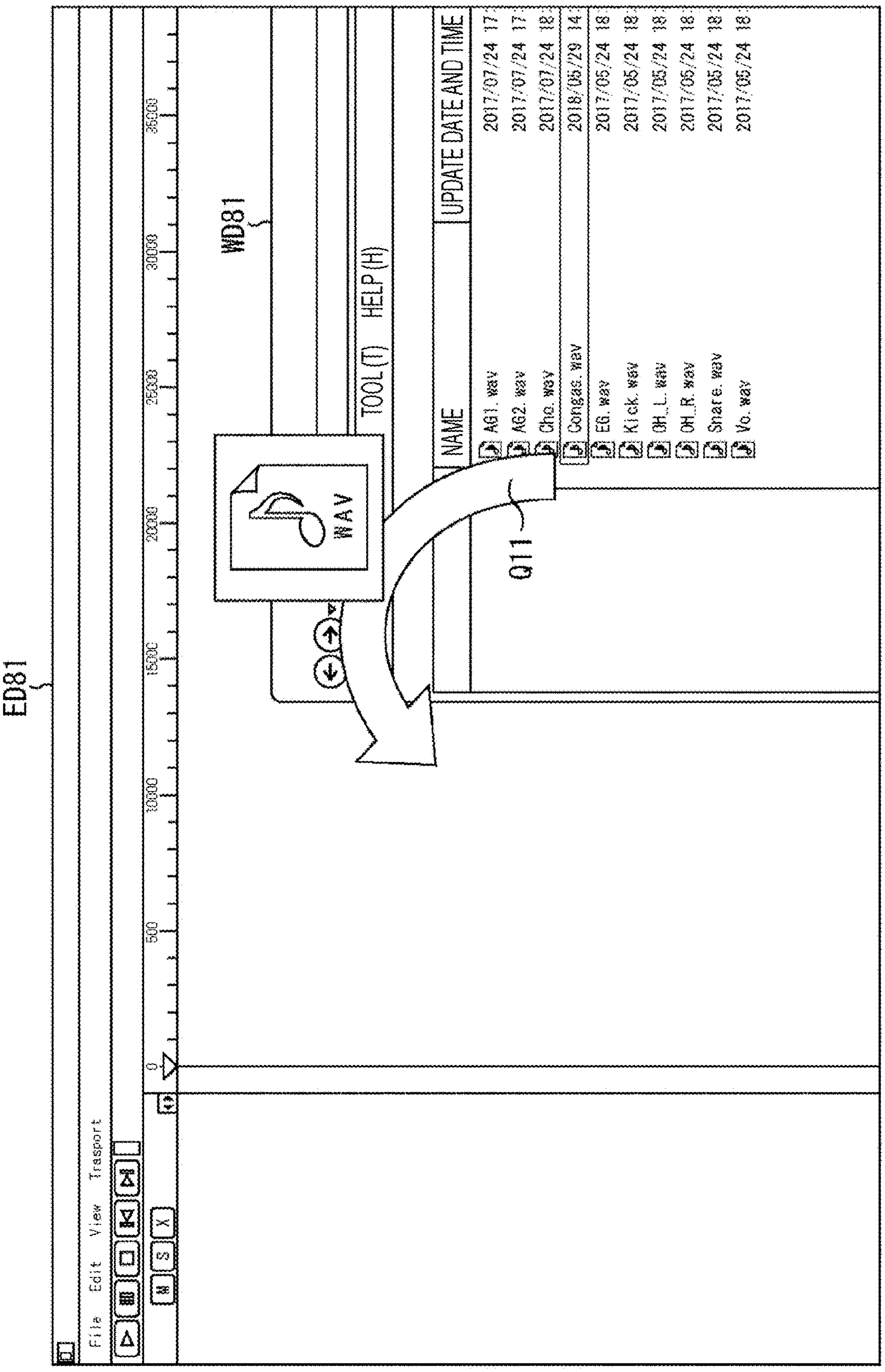
FIG. 29 is a view explaining import of an audio file.

Specifically, for example, in a case where an audio file recorded in the recording unit 22 is imported as data constituting audio content, the import can be executed by a drag-and-drop operation or the like as shown in FIG. 29.

In the example shown in FIG. 29, the display unit 24 displays an edit screen ED81 and a window WD81 on which a list of audio files recorded in the recording unit 22 is displayed.

For example, the user can instruct import of an audio file by operating the input unit 21 to drag any audio file in the window WD81 as shown by an arrow Q11 and drop the audio file onto the edit screen ED81. It is to be noted that the operation for specifying the audio file to be imported and instructing the import is not limited to a drag-and-drop operation, but may be any other operation such as selecting (specifying) a desired audio file from the file menu.

When such a drag-and-drop operation is performed, the control unit 23 acquires an audio file specified by the user from the recording unit 22, and takes in the acquired audio file as data constituting the audio content being edited.

In this example, an audio file in the WAV format whose file name is "Congas.wav" is taken in as data of the audio content.

In a case where the specified audio file is a file of a monaural audio signal, i.e., a one-channel audio signal, for example, the control unit 23 is only required to expand the audio file on the edit screen ED81 as an audio signal constituting the object data. That is, the control unit 23 is only required to add the audio file to the data of the audio content as the audio signal of the object data.

However, the specified audio file can be a file of a plurality of channels, i.e., a multi-channel file such as a two-channel audio signal. In such a case, it is necessary to specify whether to import the specified audio file as many object data as the number of channels or to import the specified audio file as channel audio data.

Figure 30:
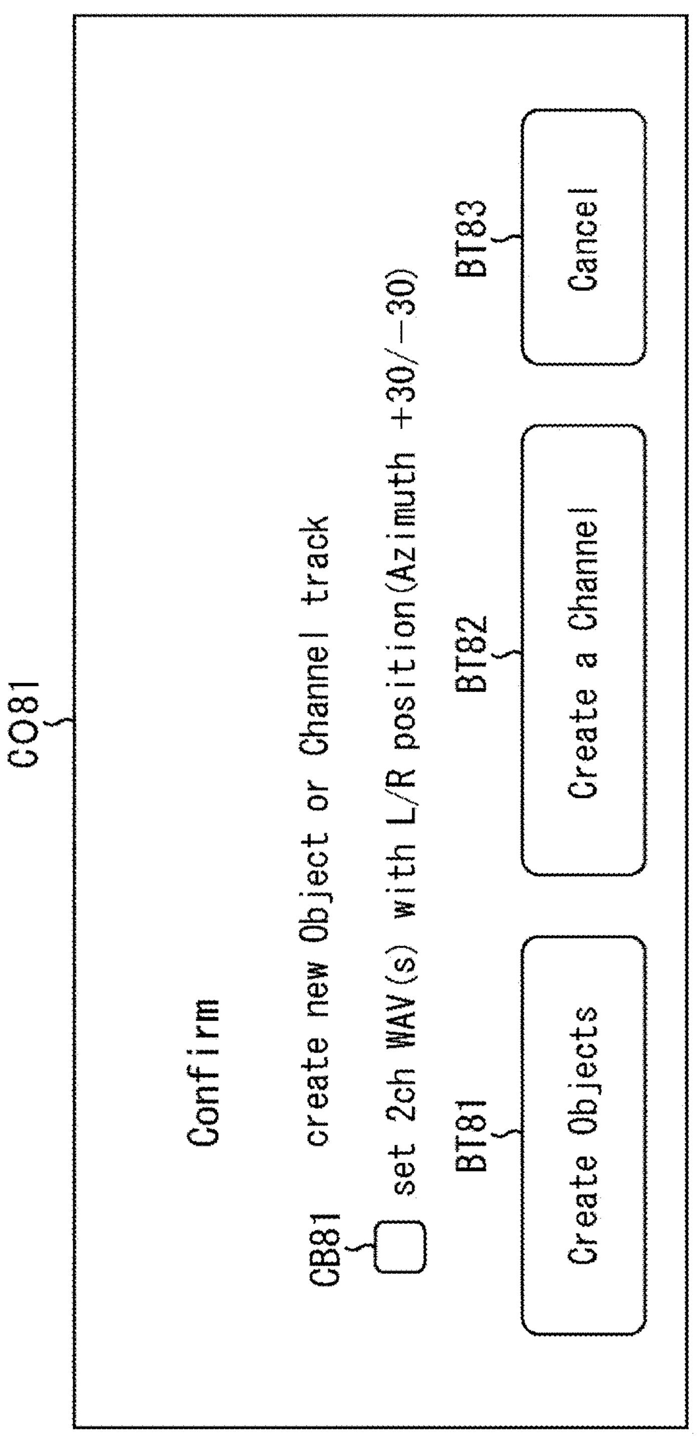
FIG. 30 is a view showing an example of a track type selection screen.

Therefore, in a case where the specified audio file is a multi-channel file, the display control unit 42 controls the display unit 24 to cause the display unit 24 to display a track type selection screen CO81 shown in FIG. 30, for example.

In the example shown in FIG. 30, the track type selection screen CO81 is provided with three buttons BT81 to BT83.

The button BT81 is a button to be operated when the specified audio file is imported as object data, i.e., an object track.

The button BT82 is a button to be operated when the specified audio file is imported as channel audio data, i.e., a channel track. In addition, the button BT83 is a button to be operated when the import of the specified audio file is canceled.

Furthermore, in a case where the specified audio file is imported as object data, a check box CB81 to be operated when the object position information indicating a specific position is given and imported is also displayed in the track type selection screen CO81.

In this example, since the specified multi-channel file is a file of a two-channel audio signal, a character message "set 2ch WAV(s) with L/R position (Azimuth+30/−30)" is displayed on the right side of the figure of the check box CB81. The "L/R position (Azimuth+30/−30)" in this character message indicates that the horizontal angles "30" and "−30" are given as the object position information. By viewing such a display, the user can easily grasp what object position information is given to the object newly added by the import.

Other than that, for example, a check box or the like that can specify whether or not to import a specified audio file, i.e., audio signals of a plurality of channels constituting a multi-channel file, as object data of a plurality of objects belonging to the same group may be displayed on the track type selection screen CO81.

In addition, for example, in a case where the specified audio file is a multi-channel file including two-channel audio signals, a check box that can specify whether or not to import those two-channel audio signals as object data of the L/R pair may also be displayed on the track type selection screen CO81.

For example, it is assumed that the user operates the input unit 21 to operate (select) the button BT81 on the track type selection screen CO81 in a state where the check mark is not displayed in the check box CB81.

Then, the control unit 23 expands the audio file as tracks of a plurality of objects in accordance with the number of channels of the specified audio file.

Specifically, on the basis of the signal supplied from the input unit 21, the control unit 23 reads the audio signal of each channel constituting the specified multi-channel file from the recording unit 22 or the like, and takes in the audio signal as the object data of each object. That is, the respective audio signals of the plurality of channels are regarded as the respective audio signals of the plurality of objects. As a result, as many new objects as the number of channels of the multi-channel file are generated.

When the audio file is imported in this manner, the display control unit 42 controls the display unit 24 in accordance with the execution of the import, and updates the display of the edit screen and the POV image.

Figure 31:
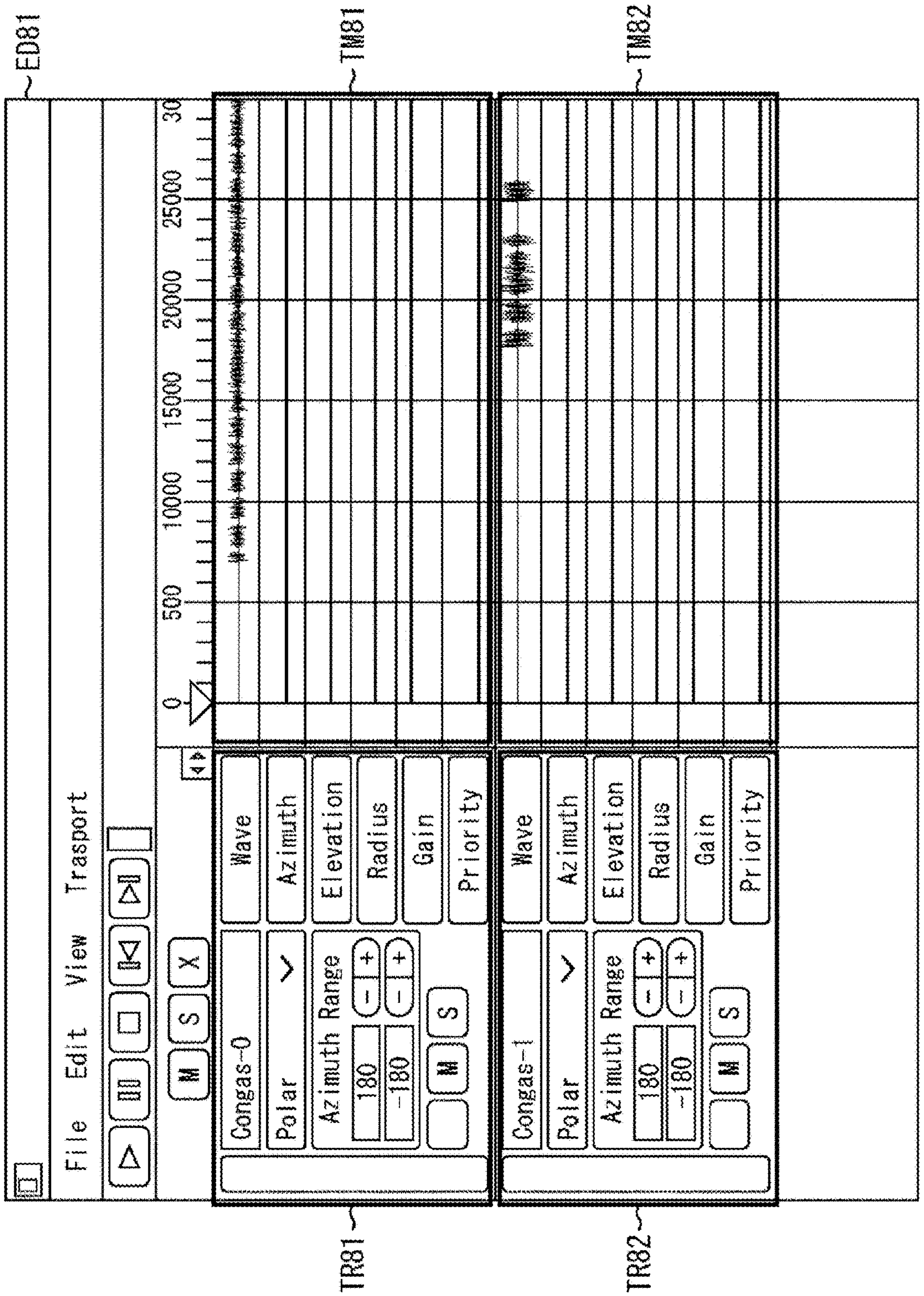
FIG. 31 is a view showing an example of an edit screen.

In the examples shown in FIGS. 29 and 30, when the button BT81 is operated to import the two-channel audio file, the updated edit screen ED81 becomes as shown in FIG. 31, for example. It is to be noted that in FIG. 31, parts corresponding to those in FIG. 29 are given the same reference numerals, and description thereof will be omitted as appropriate.

Here, the audio file whose file name is "Congas.wav" for which the import is instructed is a two-channel file, and hence two objects of the object "Congas-0" and the object "Congas-1" are generated by the import in the control unit 23.

Then, the display of the edit screen ED81 is updated so that a track area and a timeline area are provided for each track corresponding to those objects.

That is, in the example shown in FIG. 31, an area TR81 and an area TM81 of the edit screen ED81 are the track area and the timeline area of the track of the object "Congas-0". Similarly, an area TR82 and an area TM82 are the track area and the timeline area of the track of the object "Congas-1".

It is to be noted that in a case where the specified audio file includes position information such as the sound image localization position, meta information of the object is only required to be generated using the position information as object position information.

On the other hand, in a case where the specified audio file does not have position information, i.e., a position in the reproduction space, a position defined in advance such as a position in front of the listening position O can be given as a position in the reproduction space of the object. In this case, the same object position information is given to each of the plurality of objects.

In addition, the specified audio file is sometimes a multi-channel file with a specific number of channels such as two channels, six channels, or eight channels.

In such a case, when the specified audio file is expanded as tracks of a plurality of objects, time and effort for edit may be saved by giving a specific position as an initial value to each of the plurality of objects.

For example, in a case where the audio file is a two-channel file, generally, the two-channel audio signals constituting the audio file are often the audio signals of the left and right channels, i.e., the L-channel audio signal and the R-channel audio signal.

Therefore, coordinates (azimuth, elevation, radius)=(30, 0, 1) and (−30, 0, 1), which are positions of general left and right (LR) channel arrangement may be given as object position information indicating a position in the reproduction space to the objects corresponding to these two channels. The position indicated by the coordinates (30, 0, 1) and the position indicated by the coordinates (−30, 0, 1) are positions symmetrical with respect to the above-described reference plane in the reproduction space.

By giving a specific position in this manner, the user does not have to input the object position information of each time point to the object newly added by the import.

It is to be noted that an example in which positions indicated by the respective coordinates (30, 0, 1) and (−30, 0, 1) are given to the two objects added by the import of the two-channel audio file will be described here, but any other positions may be given.

In addition, similarly to the case of two channels, when the audio file has six channels, it is considered that for example, the coordinates (azimuth, elevation, radius)=(30, 0, 1), (−30, 0, 1), (0, 0, 1), (0, −30, 0), (110, 0, 1), and (−110, 0, 1) are given as object position information of the six objects corresponding to those channels.

Furthermore, when the audio file has eight channels, it is considered that for example, the coordinates (30, 0, 1), (−30, 0, 1), (0, 0, 1), (0, −30, 0), (110, 0, 1), (−110, 0, 1), (30, 30, 1), and (−30, 30, 1) are given as object position information of the eight objects corresponding to those channels.

The track type selection screen CO81 is provided with the check box CB81 so that object position information indicating a specific position in the reproduction space can be given as an initial value to an object newly added by the import in this manner.

Figure 32:
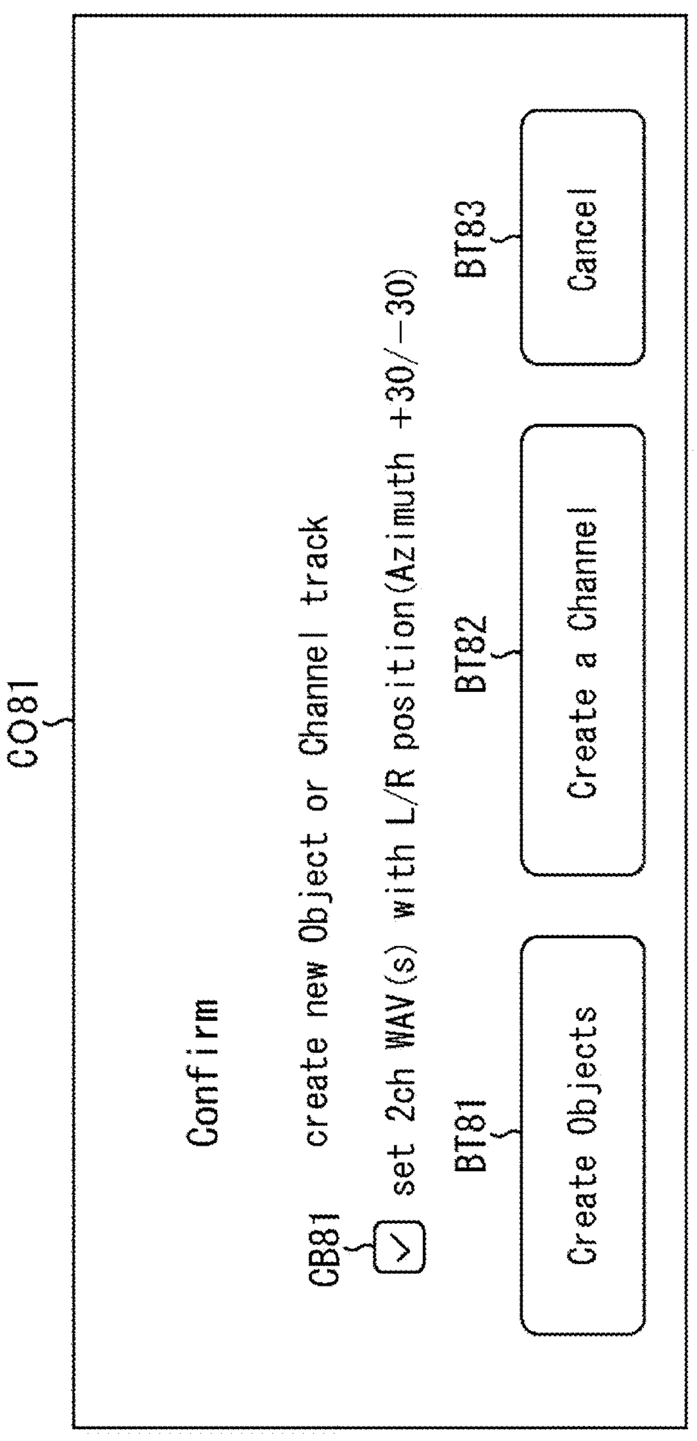
FIG. 32 is a view showing an example of a track type selection screen.

It is assumed that an operation of importing a two-channel audio file whose file name is "Congas.wav" has been performed as shown in FIG. 29, for example. Then, it is assumed that when the track type selection screen CO81 is displayed on the display unit 24 in response to the operation, the user has operated the input unit 21 and has operated (selected) the button BT81 after causing a check mark to be displayed on the check box CB81 as shown in FIG. 32. It is to be noted that in FIG. 32, parts corresponding to those in FIG. 30 are given the same reference numerals, and description thereof will be omitted as appropriate.

When the button BT81 is operated after the check mark is displayed in the check box CB81 as shown in FIG. 32, the control unit 23 expands the specified audio file as tracks of a plurality of objects in accordance with the number of channels of the audio file.

That is, similarly to the case where the check mark is not displayed in the check box CB81 described above, the control unit 23 takes in, as the audio signal of each object to be newly added, the audio signal of each channel constituting the specified two-channel audio file.

Furthermore, the position determination unit 41 gives the coordinates (30, 0, 1) as object position information to the object corresponding to the L channel of the two newly added objects. Similarly, the position determination unit 41 gives the coordinates (−30, 0, 1) as object position information to the object corresponding to the R channel of the two newly added objects.

When the audio file is imported in this manner, the display control unit 42 controls the display unit 24 in accordance with the execution of the import, and updates the display of the edit screen and the POV image.

Figure 33:
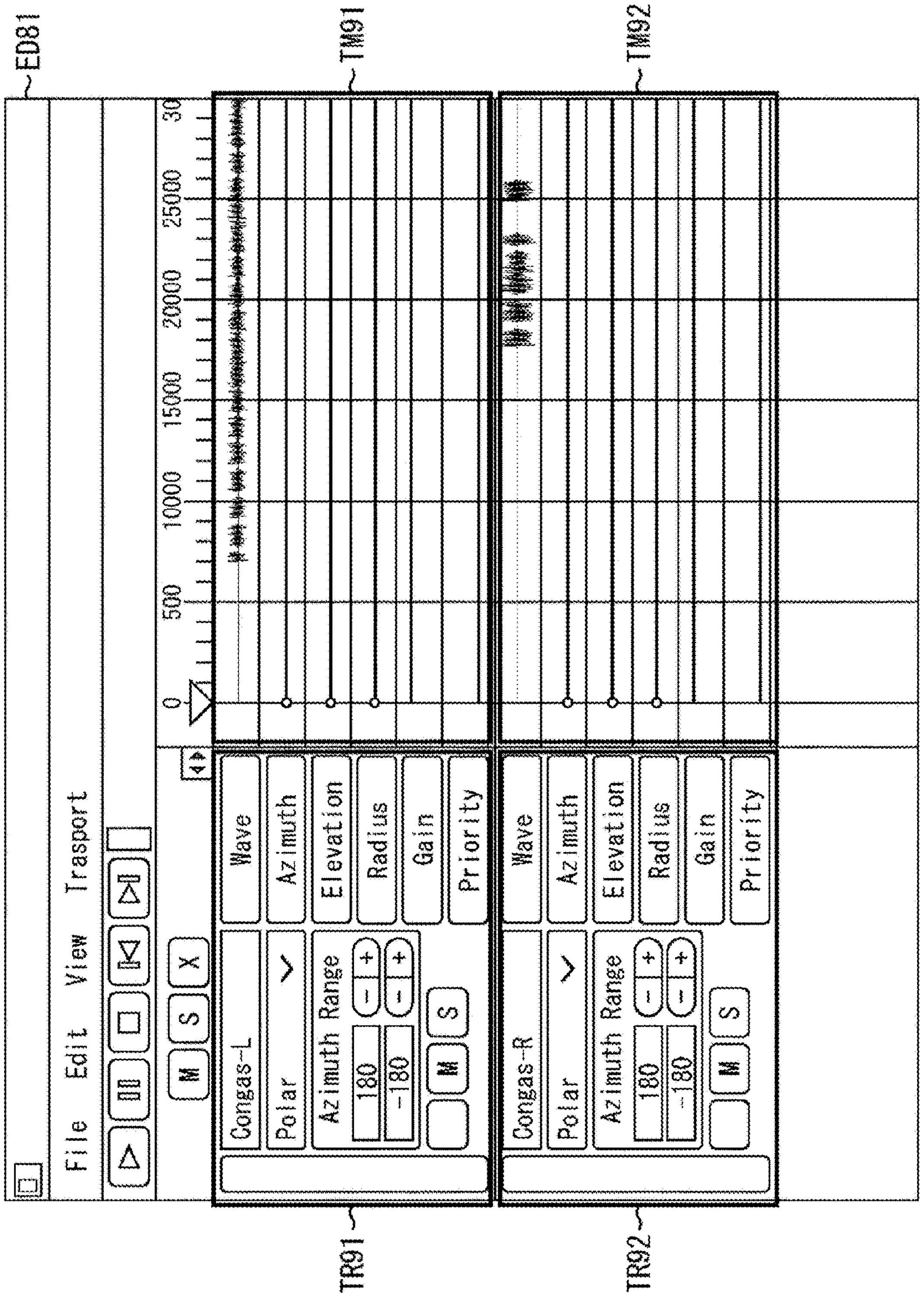
FIG. 33 is a view showing an example of an edit screen.
Figure 34:
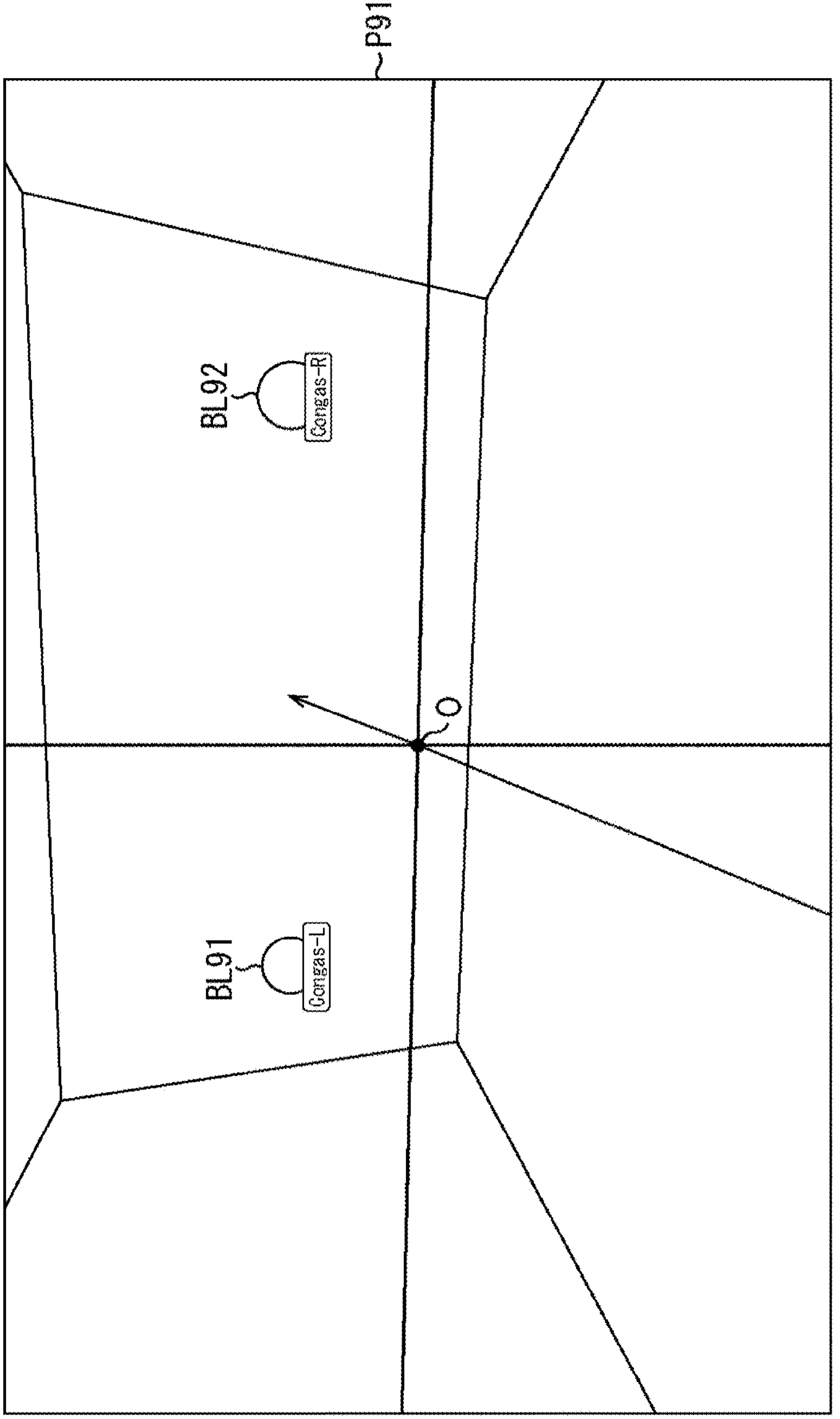
FIG. 34 is a view showing an example of a POV image.

In the examples shown in FIGS. 29 and 32, when the button BT81 is operated to import the two-channel audio file, the updated edit screen and POV image become as shown in, for example, FIGS. 33 and 34, respectively. It is to be noted that in FIG. 33, parts corresponding to those in FIG. 29 are given the same reference numerals, and description thereof will be omitted as appropriate.

In FIG. 33, the audio file whose file name is "Congas-.wav" for which the import is instructed is a two-channel file, and hence two objects of the object "Congas-L" and the object "Congas-R" are generated by the import in the control unit 23.

Then, the display of the edit screen ED81 is updated so that a track area and a timeline area are provided for each track corresponding to those objects.

That is, in FIG. 33, an area TR91 and an area TM91 of the edit screen ED81 are the track area and the timeline area of the track of the object "Congas-L", and in particular, the object position information at each time point of the object "Congas-L" is the coordinates (30, 0, 1).

Similarly, an area TR92 and an area TM92 are the track area and the timeline area of the track of the object "Congas-R", and in particular, the object position information at each time point of the object "Congas-R" is the coordinates (−30, 0, 1).

Furthermore, the display control unit 42 causes the display unit 24 to display a POV image P91 shown in FIG. 34 as the POV image corresponding to the edit screen ED81 shown in FIG. 33.

In FIG. 34, an object ball BL91 indicating the position of the object "Congas-L" is arranged on the front left side in the figure as viewed from the listening position O, and an object ball BL92 indicating the position of the object "Congas-R" is arranged on the front right side in the figure as viewed from the listening position O.

In a case where the audio file to be imported is a file with a specific number of channels, if a specific position is given as an initial value to an object to be newly added by the import in accordance with an instruction by the user, it is possible to reduce the time and effort of the input work of the object position information by the user. This allows edit to be performed more efficiently and easily.

It is to be noted that as described above, at the time point of importing an audio file, objects may be grouped or may be brought in an L/R pair.

<Explanation of Import Processing>

Subsequently, the operation of the information processing apparatus 11 when importing a desired audio file as described above, in particular, importing an audio file including an audio signal not having a position in the reproduction space, will be described.

Figure 35:
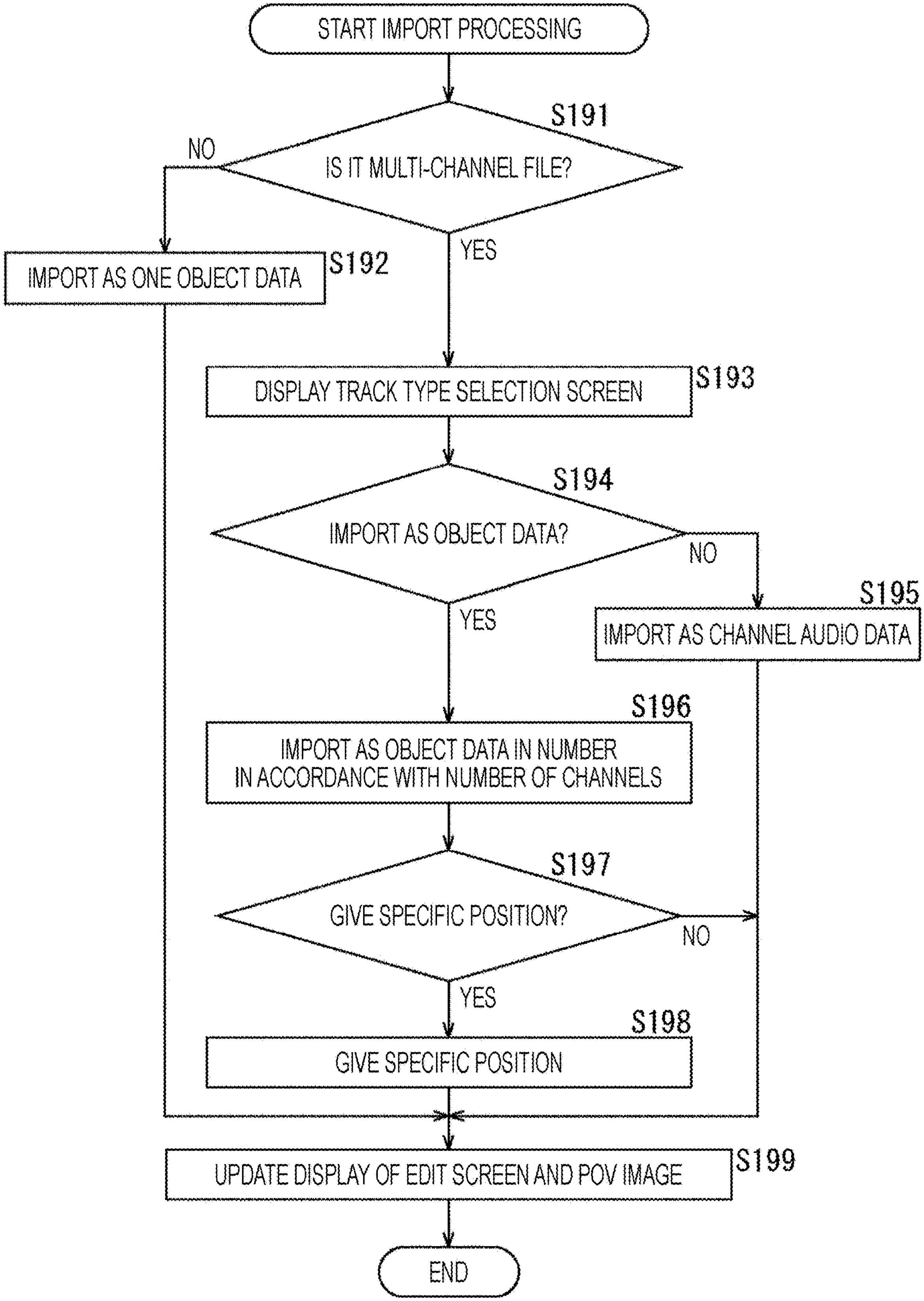
FIG. 35 is a flowchart explaining import processing.

That is, the import processing by the information processing apparatus 11 will be described below with reference to the flowchart of FIG. 35. This import processing is started when import is instructed by an operation such as drag and drop on a desired audio file as shown in FIG. 29, for example.

In step S191, the control unit 23 determines whether or not the audio file instructed to be imported is a multi-channel file, on the basis of the signal supplied from the input unit 21.

In a case where it is determined in step S191 that the audio file is not a multi-channel file, i.e., in a case where import of a monaural audio file is instructed, the processing of step S192 is performed.

In step S192, the control unit 23 imports the specified audio file as one object data.

For example, as object data of one object to be newly added, i.e., an audio signal of the object, the control unit 23 takes in one audio signal constituting the monaural audio file for which import is instructed. At this time, the control unit 23 appropriately gives the object position information of a predetermined position defined in advance, the gain information, the priority information, and the like to the audio signal to provide meta information, and generates object data including the meta information and the audio signal.

After the object data is added in this manner, the processing proceeds to step S199.

On the other hand, in a case where it is determined in step S191 that the audio file is a multi-channel file, the display control unit 42 in step S193 causes the display unit 24 to display the track type selection screen.

Thus, the track type selection screen CO81 shown in FIG. 30, for example, is displayed. Then, by operating the input unit 21, the user appropriately performs an operation on, for example, the check box CB81 and the button BT81 in the track type selection screen CO81.

In step S194, the control unit 23 determines whether or not to import the audio file as object data on the basis of the signal supplied from the input unit 21 in response to the user operation on the track type selection screen.

For example, in a case where the button BT81 of the track type selection screen CO81 shown in FIG. 30 is operated, the control unit 23 determines to import the audio file as object data in step S194.

In a case where it is determined not to import the audio file as object data in step S194, i.e., in a case where the user instructs import of the audio file as channel audio data, the processing proceeds to step S195.

In step S195, the control unit 23 imports the specified audio file as one channel audio data. In this case, the audio signal of each of the plurality of channels is taken in as one channel audio data, i.e., data of one track. After the channel audio data is added in this manner, the processing proceeds to step S199.

On the other hand, in a case where it is determined to import the audio file as object data in step S194, the processing of step S196 is performed.

In step S196, the control unit 23 imports the specified audio file as object data of objects in the number corresponding to the number of channels of the audio file.

For example, the control unit 23 takes in audio signals of a plurality of channels constituting an audio file for which import is instructed, as audio signals constituting object data of a plurality of objects corresponding to those channels. That is, as many objects as the number of channels of the audio files are generated, and those objects are added to the audio content.

In step S197, the position determination unit 41 determines whether or not to give a specific position in the reproduction space to the object generated in step S196.

For example, as shown in FIG. 32, in a case where the button BT81 is operated in a state where the check mark is displayed in the check box CB81 of the track type selection screen CO81, it is determined to give a specific position in step S197.

In a case where it is determined in step S197 that a specific position is not given, the processing of step S198 is not performed, and then the processing proceeds to step S199.

In this case, the position determination unit 41 gives a position defined in advance such as a front position in the reproduction space to the object newly added in the processing of step S196.

That is, the position determination unit 41 generates meta information including the object position information indicating a position defined in advance for each of the plurality of newly added objects, and provides object data including the meta information and the audio signal. In particular, in this case, the same position is given to all of the plurality of newly added objects.

On the other hand, in a case where it is determined in step S197 that a specific position is to be given, the position determination unit 41 in step S198 gives a specific position in the reproduction space for each of those objects newly added in the processing of step S196.

That is, for example, the position determination unit 41 generates meta information including the object position information indicating a specific position different for each of the plurality of newly added objects, and provides object data including the meta information and the audio signal.

Specifically, for example, in a case where the number of newly added objects is two, a position indicated by the coordinates (30, 0, 1) is given to one of the objects, and a position indicated by the coordinates (−30, 0, 1) is given to the other of the objects, as in the above example. In particular, here, a different position is given to each object, such as symmetrical positions. The specific position given to each object is a position defined for each channel of the audio file for which import is instructed. That is, a specific position in accordance with the number of channels of the audio file to be imported is given to the object.

By giving the specific position in this manner, the user does not have to input the object position information of the newly added objects one by one, and hence the setting of the object position information becomes easy. That is, the edit efficiency can be improved.

It is to be noted that in a case where new objects are added by import, the control unit 23 may group those objects. In this case, grouping may be performed in accordance with a user instruction, or when a plurality of new objects are added simultaneously even without a user instruction in particular, those objects may be unconditionally grouped. Furthermore, in a case where the number of newly added objects is two, those two objects may be in an L/R pair in accordance with a user instruction or the like.

It can also be said that in the case where grouping is performed, the control unit 23 performs processing of grouping a plurality of objects not having a position in the reproduction space and giving a position in the reproduction space to the plurality of grouped objects.

In particular, in a case where the number of objects to be grouped is two, the position in the reproduction space can be given to those two objects so that the two objects have a positional relationship symmetrical with respect to the predetermined reference plane in the reproduction space.

After a specific position is given to the object in step S198, the processing proceeds to step S199.

In a case where the processing of step S192, step S195, or step S198 has been performed, or it is determined in step S197 that a specific position is not given, the processing of step S199 is performed.

In step S199, the display control unit 42 controls the display unit 24 in accordance with the import of the audio file, and updates the display of the edit screen and the POV image displayed on the display unit 24, and the import processing ends.

For example, in step S199, the display of the edit screen and the POV image are updated as shown in FIGS. 31, 33, and 34.

As described above, the information processing apparatus 11 imports the audio file in accordance with the number of channels of the audio file and the user operation on the track type selection screen, and adds new object data or the like.

By appropriately performing import in accordance with the number of channels of the audio file and the user operation, it becomes possible to reduce time and effort of input of object position information, for example, by the user and perform edit more efficiently and easily.

<Configuration Example of Computer>

By the way, the series of processing described above can be executed by hardware or can be executed by software. In a case where the series of processing is executed by software, a program constituting the software is installed into a computer. Here, the computer includes a computer incorporated in dedicated hardware and, for example, a general-purpose personal computer capable of executing various functions by installing various programs.

Figure 36:
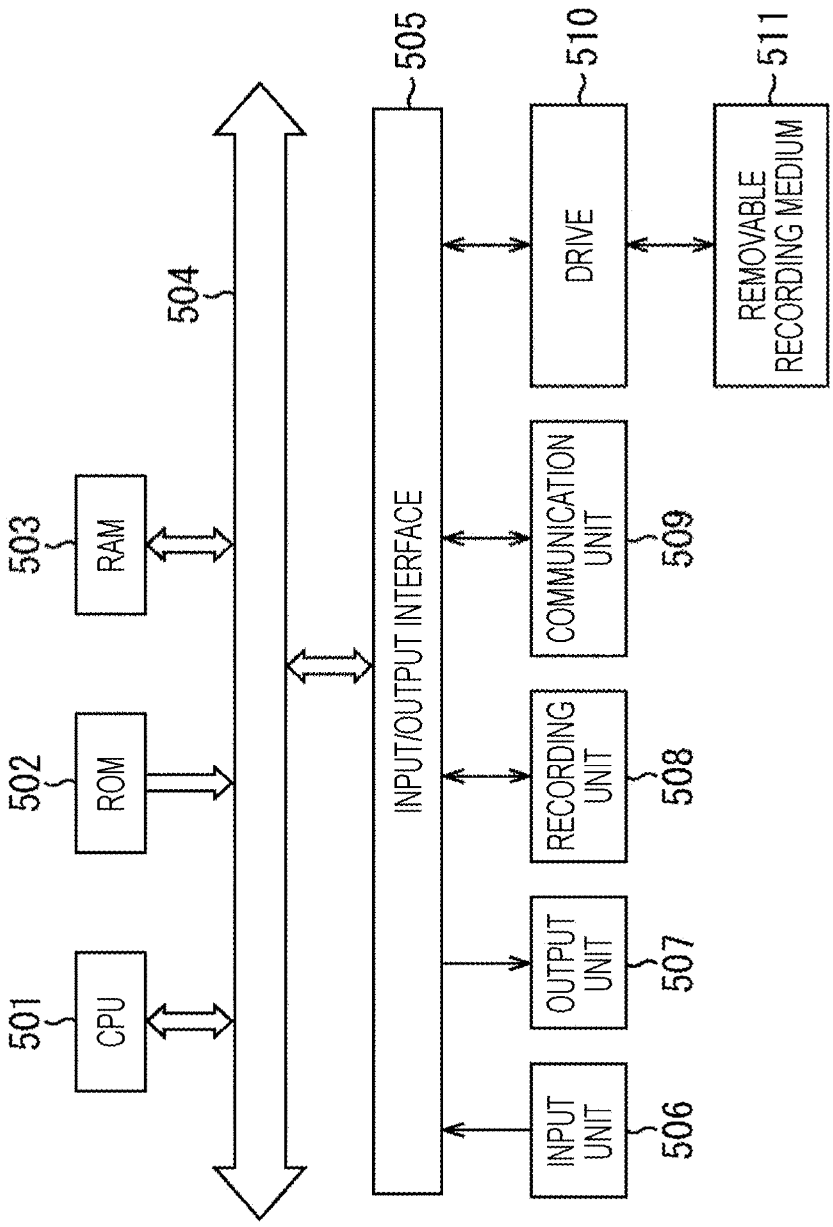
FIG. 36 is a diagram showing a configuration example of a computer.

FIG. 36 is a block diagram showing a configuration example of hardware of a computer that executes the series of processing described above by a program.

In the computer, a central processing unit (CPU) 501, a read only memory (ROM) 502, and a random access memory (RAM) 503 are interconnected by a bus 504.

An input/output interface 505 is further connected to the bus 504. An input unit 506, an output unit 507, a recording unit 508, a communication unit 509, and a drive 510 are connected to the input/output interface 505.

The input unit 506 includes a keyboard, a mouse, a microphone, an imaging element, and the like. The output unit 507 includes a display, a speaker, and the like. The recording unit 508 includes a hard disk, a nonvolatile memory, and the like. The communication unit 509 includes a network interface and the like. The drive 510 drives a removable recording medium 511 such as a magnetic disk, an optical disk, a magneto-optical disk, or a semiconductor memory.

By the CPU 501 loading a program recorded in the recording unit 508 into the RAM 503 via the input/output interface 505 and the bus 504 and executes the program, for example, the computer configured as described above performs the series of processing described above.

The program executed by the computer (CPU 501) can be provided by being recorded in the removable recording medium 511 such as a package medium, for example. In addition, the program can be provided via a wired or wireless transmission medium such as a local area network, the Internet, or digital satellite broadcasting.

In the computer, the program can be installed into the recording unit 508 via the input/output interface 505 by mounting the removable recording medium 511 to the drive 510. In addition, the program can be received by the communication unit 509 via a wired or wireless transmission medium, and installed in the recording unit 508. Other than that, the program can be installed in advance in the ROM 502 or the recording unit 508.

It is to be noted that the program executed by the computer may be a program in which processing is performed in time series along the order described in the present description, or may be a program in which processing is performed in parallel or at a necessary timing such as when a call is made.

It is to be noted that the embodiment of the present technology is not limited to the embodiment described above, and various modifications can be made in a scope without departing from the spirit of the present technology.

For example, the present technology can take be configured as cloud computing, in which one function is shared by a plurality of apparatuses via a network and is processed in cooperation.

In addition, each step described in the above-described flowcharts can be executed by one apparatus or executed by a plurality of apparatuses in a shared manner.

Furthermore, in a case where one step includes a plurality of processing, the plurality of processing included in the one step can be executed by one apparatus or executed by a plurality of apparatuses in a shared manner.

Furthermore, the present technology can have the following configuration.

(1)

An information processing apparatus including a control unit that selects and groups a plurality of objects existing in a predetermined space, and changes positions of the plurality of the objects while maintaining a relative positional relationship of the plurality of the grouped objects in the space.

(2)

The information processing apparatus according to (1), in which the control unit groups a plurality of the objects not having positions in the space, and gives positions to the plurality of the grouped objects in the space.

(3)

The information processing apparatus according to (1), in which in a case where two of the objects are grouped, the control unit changes positions of the two of the objects while maintaining a relationship in which the two of the objects are symmetrical with respect to a predetermined plane in the space.

(4)

The information processing apparatus according to (1), in which the control unit groups two of the objects not having positions in the space, and gives positions to the two of the objects in the space so that the two of the grouped objects have a positional relationship symmetrical with respect to a predetermined plane in the space.

(5)

The information processing apparatus according to (1), in which the control unit groups a plurality of the objects having positions in the space.

(6)

The information processing apparatus according to any one of (1) to (5), in which on the basis of a position of the object at a predetermined time point and a position of the object at another time point different from the predetermined time point, the control unit obtains, by interpolation processing, a position of the object at a time point between the predetermined time point and the another time point.

(7)

The information processing apparatus according to (6), in which the control unit performs the interpolation processing by an interpolation method selected from among a plurality of interpolation methods.

(8)

The information processing apparatus according to any one of (1) to (7), in which in a case where positions of a plurality of time points different from each other of the object are selected and change of positions is instructed, the control unit simultaneously changes selected positions of the plurality of time points by a specified change amount.

(9)

The information processing apparatus according to any one of (1) to (8), further including a display control unit that controls display of an image of the space in which the object is arranged with a predetermined position in the space as a viewpoint position.

(10)

The information processing apparatus according to (9), in which the display control unit causes the object belonging to a same group to be displayed in a same color on the image.

(11)

The information processing apparatus according to (9), in which the display control unit causes the object to be displayed on the image in a color selected for an audio track corresponding to the object.

(12)

The information processing apparatus according to (9), in which the display control unit causes the object to be displayed on the image in a color selected for an audio track corresponding to the object and a color defined for a group to which the object belongs.

(13)

The information processing apparatus according to any one of (9) to (12), in which the display control unit causes only the specified object among the plurality of the objects existing in the space to be displayed on the image.

(14)

The information processing apparatus according to any one of (1) to (13), in which the object is an audio object.

(15)

An information processing method, including by an information processing apparatus, selecting and grouping a plurality of objects existing in a predetermined space, and changing positions of the plurality of the objects while maintaining a relative positional relationship of the plurality of the grouped objects in the space.

(16)

A program that causes a computer to execute processing including a step of selecting and grouping a plurality of objects existing in a predetermined space, and changing positions of the plurality of the objects while maintaining a relative positional relationship of the plurality of the grouped objects in the space.

REFERENCE SIGNS LIST

11 Information processing apparatus
21 Input unit
23 Control unit
24 Display unit
41 Position determination unit
42 Display control unit

The invention claimed is:

1. An information processing apparatus comprising:

circuitry comprising:

a control unit configured to perform one or more mute settings, or one or more solo settings for one or more sound sources according to one or more user specifications; and a display control unit configured to set a display state of at least one of the sound sources to a first display state or a second display state, such that in a case wherein at least one of the mute settings is performed, the display state of at least one of the sound sources is set to the second display state, and in another case wherein at least one of the solo settings is performed for the at least one of the sound sources, the display state of another of the sound sources is set to the second display state, wherein the at least one of the sound sources is different from the another of the sound sources.

2. The information processing apparatus as in claim 1 wherein in the case wherein at least one of the mute settings is performed, the display state of a first one of the sound sources that was in a muted state is set to the second display state and the display state of a second one of the sound sources that was not in the muted state is set to the second display state.

3. The information processing apparatus as in claim 1 wherein the control unit puts at least one of the source sources identified in the one or more user specifications into a muted state.

4. The information processing apparatus as in claim 1 wherein in the another case wherein at least one of the solo settings is performed, the display state of a first one of the sound sources that was in a solo state is set to the first display state and the display state of a second one of the sound sources that was not in the solo state is set to the first display state.

5. The information processing apparatus as in claim 1 wherein the control unit puts at least one of the source sources identified in the one or more user specifications into a solo state.

6. The information processing apparatus as in claim 1 wherein the first display state for the at least one of the sound sources is the display state in which the at least one of the sound sources is displayed, and the second display state for the at least one of the sound sources is the display state in which the at least one of the sound sources is hidden.

7. The information processing apparatus as in claim 1 wherein that at least one of the sound sources is an object.

8. The information processing apparatus as in claim 1 wherein the at least one of the sound sources is an audio object.

9. The information processing apparatus as in claim 1 wherein the control unit mutes the at least one of the sound sources that is in a muted state or prevents data from being output as content data from the at least one of the sound sources that is in the muted state.

10. The information processing apparatus as in claim 1 wherein the control unit reproduces sound only from the at least one of the sound sources that is in a solo state or outputs data as content data only from the at least one of the sound sources that is in the solo state.

11. The information processing apparatus as in claim 1 such that in the case wherein at least one of the sound sources is identified in the user specifications to be put into a mute state and the at least one of the sound sources is a member of a group of the one or more sound sources, the control unit puts all other of the sound sources that are members of the group in either the mute state or a solo state.

12. A method for controlling one or more sound sources comprising:

performing one or more mute settings or one or more solo settings for one or more sound sources according to one or more user specifications;

displaying a state of at least one of the sound sources as a first display state or a second display state, such that in a case wherein at least one of the mute settings is performed, the display state of at least one of the sound sources is set to the second display state, and in another case wherein at least one of the solo settings is performed for the at least one of the sound sources, the display state of another of the sound sources is set to the second display state, wherein the at least one of the sound sources is different from the another of the sound sources.

13. A computer executable software code stored on a non-transitory computer readable medium, the code for controlling one or more sound sources, the code comprising:

code to perform one or more mute settings or one or more solo settings for one or more sound sources according to one or more user specifications;

code to display a state of at least one of the sound sources as a first display state or a second display state, such that in a case wherein at least one of the mute settings is performed, the display state of at least one of the sound sources is set to the second display state, and in another case wherein at least one of the solo settings is performed for the at least one of the sound sources, the display state of another of the sound sources is set to the second display state, wherein the at least one of the sound sources is different from the another of the sound sources.

14. An information processing apparatus comprising:

circuitry configured to:

control a reception of operation information regarding a user's operation of one or more sound sources;

generate a setting control signal for controlling a mute setting or a solo setting for the one or more sound sources according to the operation information; and change a display state of the one or more sound sources to a first display state according to the mute setting or the solo setting, or generate a display control signal that causes a second display state to be set; and a control unit configured to:

control transmission of the setting control signal and the display control signal, such that in a case wherein at least one of the mute settings is performed, the display state of at least one of the sound sources is set to the second display state, and in another case wherein at least one of the solo settings is performed for the at least one of the sound sources, the display state of another of the sound sources is set to the second display state, wherein the at least one of the sound sources is different from the another of the sound sources.

15. A method for controlling one or more sound sources comprising:

controlling a reception of operation information regarding a user's operation of one or more sound sources;

generating a setting control signal for controlling a mute setting or a solo setting for the one or more sound sources according to the operation information; and changing a display state of the one or more sound sources to a first display state according to the mute setting or the solo setting, or generate a display control signal that causes a second display state to be set; and a control unit configured to:
controlling transmission of the setting control signal and the display control signal,
such that in a case wherein at least one of the mute settings is performed, the display state of at least one of the sound sources is set to the second display state, and
in another case wherein at least one of the solo settings is performed for the at least one of the sound sources, the display state of another of the sound sources is set to the second display state, wherein the at least one of the sound sources is different from the another of the sound sources.

16. An information processing apparatus comprising:
circuitry configured to:
control transmission of operation information related to the operation of one or more sound sources by a user, and
control reception of a setting control signal and a display control signal transmitted in response to the transmission of the operation information,
a control unit configured to:
perform mute setting or solo setting for the one or more sound sources; and
a display control unit configured to:
set a display state of the one or more sound sources to a first display state or a second display state according to the display control signal,
wherein when the mute setting is performed, the display state of at least one of the one or more sound sources that is muted by the mute setting is set to the second display state,
wherein when the solo setting is performed, the display state of another of the one or more sound sources that is in a solo state is set to the second display state.

17. An information processing apparatus comprising:
circuitry configured to:
transmit operation information regarding a user's operation of one or more sound sources;
receive a setting control signal and a display control signal transmitted in response to a transmission of the operation information;
perform mute settings or display settings for the one or more sound sources according to the setting control signal;
set a display state of the one or more sound sources to a first display state or a second display state according to the display control signal,
wherein when the mute setting is performed, the display state of at least one of the one or more sound sources that is muted by the mute setting is set to the second display state,
wherein when a solo setting is performed, the display state of another of the one or more sound sources that is in a solo state is set to the second display state.

18. An information processing system comprising a first information processing device and a second information processing device, the first information processing device comprising:
a setting control signal that controls a transmission of operation information related to a user's operation of one or more sound sources to the second information processing device, and is transmitted from the second information processing device in response to the transmission of the operation information; and
a first control unit configured to control reception of a display control signal and to perform mute setting or solo setting for the one or more sound sources according to the setting control signal; and
a display control unit configured to set a display state of the one or more sound sources to a first display state or a second display state according to the display control signal;
wherein when the mute setting is performed, the display state of at least one of the one or more sound sources that is muted by the mute setting is set to the second display state,
wherein when the solo setting is performed, the display state of another of the one or more sound sources that is in a solo state is set to the second display state; and
wherein the second information processing device is configured to:
control reception of the operation information transmitted from the first information processing device;
generate the setting control signal according to the operation information; and
generate the display control signal according to the mute setting or the solo setting;
wherein the second information processing device comprises a second control unit configured to:
control transmission of the setting control signal and the display control signal to the first information processing device.

* * * * *